US008487742B1

(12) United States Patent
Russell et al.

(10) Patent No.: US 8,487,742 B1
(45) Date of Patent: Jul. 16, 2013

(54) ELECTRONIC TOKEN AND LOCK

(75) Inventors: Roger Keith Russell, Indianapolis, IN (US); James Edmond Beylotte, Indianapolis, IN (US); Ralph P. Palmer, Indianapolis, IN (US)

(73) Assignee: Stanley Security Solutions, Inc., Indianapolis, IN (US)

( * ) Notice: Subject to any disclaimer, the term of this patent is extended or adjusted under 35 U.S.C. 154(b) by 30 days.

(21) Appl. No.: 11/970,998

(22) Filed: Jan. 8, 2008

Related U.S. Application Data

(63) Continuation of application No. 11/032,745, filed on Jan. 11, 2005, now Pat. No. 7,316,140, which is a continuation of application No. 10/688,536, filed on Oct. 17, 2003, now Pat. No. 6,840,072, which is a continuation of application No. 10/115,749, filed on Apr. 3, 2002, now Pat. No. 6,668,606, which is a continuation of application No. 09/287,981, filed on Apr. 7, 1999, now Pat. No. 6,442,986.

(60) Provisional application No. 60/080,974, filed on Apr. 7, 1998.

(51) Int. Cl.
*G06K 5/00* (2006.01)

(52) U.S. Cl.
USPC .............................. 340/5.6; 340/5.2; 340/5.23

(58) Field of Classification Search
USPC .................. 340/5.6, 5.64, 5.73, 5.7, 5.5, 5.1, 340/5.2; 70/278.1, 278.2, 278.3
See application file for complete search history.

(56) References Cited

U.S. PATENT DOCUMENTS

| | | | | | |
|---|---|---|---|---|---|
| 4,845,490 | A | * | 7/1989 | Ward et al. | 340/5.27 |
| 5,204,663 | A | * | 4/1993 | Lee | 340/5.28 |
| 5,245,329 | A | * | 9/1993 | Gokcebay | 340/5.33 |
| 5,245,652 | A | * | 9/1993 | Larson et al. | 379/102.06 |
| 5,826,450 | A | * | 10/1998 | Lerchner et al. | 70/278.3 |

* cited by examiner

*Primary Examiner* — Nabil Syed
(74) *Attorney, Agent, or Firm* — Faegre Baker Daniels LLP

(57) ABSTRACT

A lock system is provided including a plurality of locksets and at least one token. The token is configured to communicate information between locksets.

15 Claims, 39 Drawing Sheets

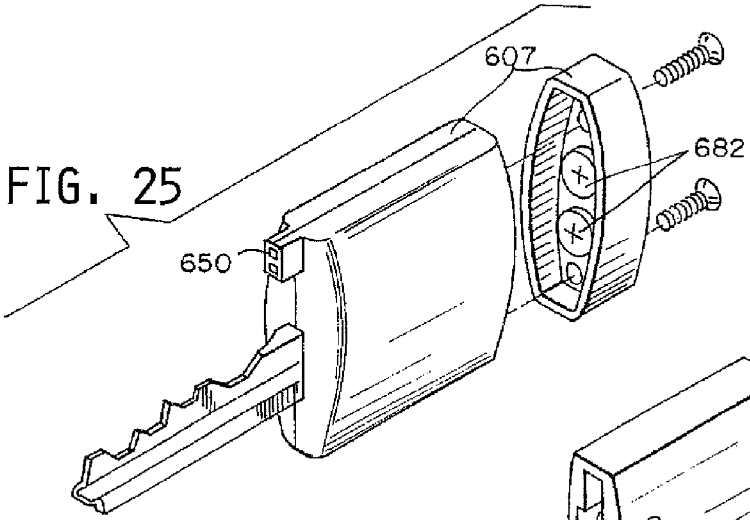
FIG. 25
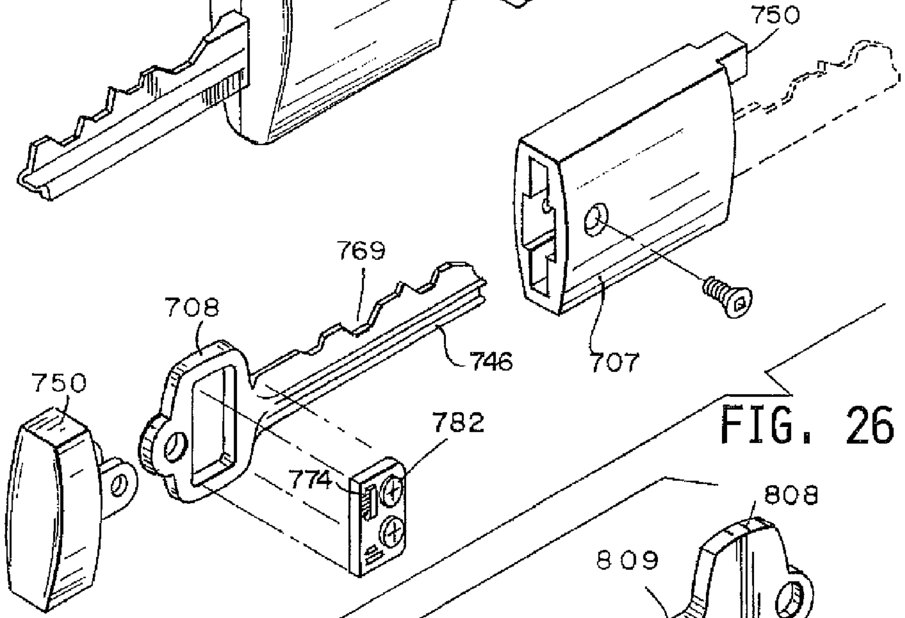
FIG. 26
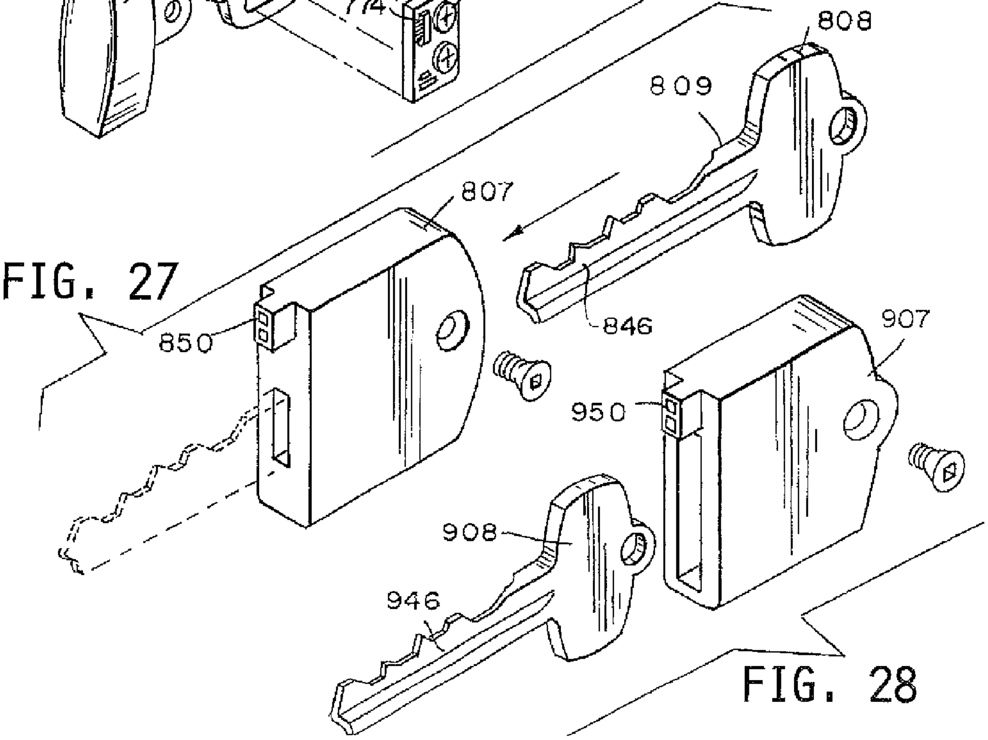
FIG. 27
FIG. 28

ELECTRONIC TOKEN AND LOCK

CROSS-REFERENCE TO RELATED APPLICATIONS

This application is a continuation of U.S. patent application Ser. No. 11/032,745, now U.S. Pat. No. 7,316,140, filed Jan. 11, 2005, which is a continuation of U.S. patent application Ser. No. 10/688,536, now U.S. Pat. No. 6,840,072, filed Oct. 17, 2003, which is a continuation of U.S. patent application Ser. No. 10/115,749, now U.S. Pat. No. 6,668,606, filed on Apr. 3, 2002, which is a continuation of U.S. patent application Ser. No. 09/287,981, filed on Apr. 7, 1999, now U.S. Pat. No. 6,442,986, which claimed the benefit of U.S. Provisional Patent Application Ser. No. 60/080,974, filed on Apr. 7, 1998, the disclosures of which are hereby incorporated by reference herein in their entirety.

BACKGROUND AND SUMMARY OF THE INVENTION

The present invention relates to electronic tokens and locks that cooperate to determine if access should be granted to the user of the token. More particularly, the present invention relates to tokens that communicate information from one lock to another.

Conventional locksets include a lock cylinder, a lock core that fits within the lock cylinder, and a token that cooperates with the lock core. The lock cylinder can take many forms. For example, the lock cylinder may be a padlock or part of a mortise lockset or cylindrical lockset. No matter what form the lock cylinder takes, the lock cylinder includes an opening that receives the lock core. Traditionally, the lock cores have included mechanical features that cooperated with a mechanical token to determine if the user of the token is granted or denied access through the lockset. See, for example, U.S. Pat. Nos. 4,424,693, 4,444,034, and 4,386,510.

Electronic access control systems interrogate a token having stored codes therein and compare the token codes with valid access codes before providing access to an area. See, for example, U.S. Pat. No. 5,351,042. If the token being interrogated has a valid access code, the electronic access control system interacts with portions of a lockset to permit the user of the token to gain access to the area protected by the lockset.

Access control systems may include mechanical and electrical access components to require that a token include both a valid "mechanical code", for example, an appropriately configured bitted blade to properly position mechanical tumblers, and the valid electronic access code before the user of the token is granted access. See, for example, U.S. Pat. Nos. 5,826,450, 5,768,925, and 5,685,182. Many of these electromechanical access control systems use power sources and access code validation systems which are not situated in the lock core and token and are thus connected by separate circuitry to the lock core.

According to one aspect of the present invention, a lock system is provided that includes a core body, a lock actuator, a return spring, a solenoid, and a token. The lock actuator is coupled to the core body for rotation about an axis. The blocking body is movable between a first position blocking rotation of the lock actuator about the axis and a second position permitting rotation of the lock actuator about the axis. The return spring biases the blocking body toward the first position. The solenoid has a shaft that is movable between a first position in which the blocking body is locked to prevent rotation of the lock actuator about the axis and a second position in which the blocking body is unlocked to allow rotation of the lock actuator about the axis. Movement of the shaft of the solenoid permits biasing of the return spring. The token is couplable to the lock actuator and the solenoid moves the shaft from the first position to the second position after the token is coupled to the lock actuator.

According to another aspect of the present invention, a lock system is provided that includes a core body, a lock actuator, a blocking body, a solenoid, and a token. The lock actuator is coupled to the core body for rotation about an axis. The blocking body is movable between a first position blocking rotation of the lock actuator about the axis and a second position permitting rotation of the lock actuator about the axis. The solenoid has a shaft movable between a first position in which the blocking body is locked to prevent rotation of the lock actuator about the axis and a second position in which the blocking body is unlocked to allow rotation of the lock actuator about the axis. The token is couplable to the lock actuator to control movement of the shaft between the first and second positions. Mechanical energy is transmitted through the token that urges the blocking body to the second position after the solenoid moves the shaft to the second position.

According to another aspect of the present disclosure, a lock system is provided that includes a core body, lock actuator, blocking body, return spring, solenoid, and token. The lock actuator is coupled to the core body for rotation about an axis. The blocking body is movable between a first position blocking rotation of the lock actuator about the axis and a second position permitting rotation of the lock actuator about the axis. The blocking body has a longitudinal axis. The return spring is positioned along the longitudinal axis of the blocking body that biases the blocking body toward the first position. The solenoid has a shaft movable between a first position in which the blocking body is locked to prevent rotation of the lock actuator about the axis and a second position in which the blocking body is unlocked to allow rotation of the lock actuator about the axis. The token is couplable to the lock actuator to control movement of the shaft between the first and second positions.

Additional features of the present invention will become apparent to those skilled in the art upon consideration of the following detailed description of preferred embodiments exemplifying the best mode of carrying out the invention as presently perceived.

BRIEF DESCRIPTION OF THE DRAWINGS

FIG. 25 is a partially exploded view of another preferred embodiment of a bow cover for a token;

FIG. 26 is a partially exploded view of yet another preferred embodiment of a bow cover;

FIG. 27 is a partially exploded view of yet another preferred embodiment of a bow cover;

FIG. 28 is a partially exploded view of yet another preferred embodiment of a bow cover;

DETAILED DESCRIPTION OF THE DRAWINGS

Figure 1:
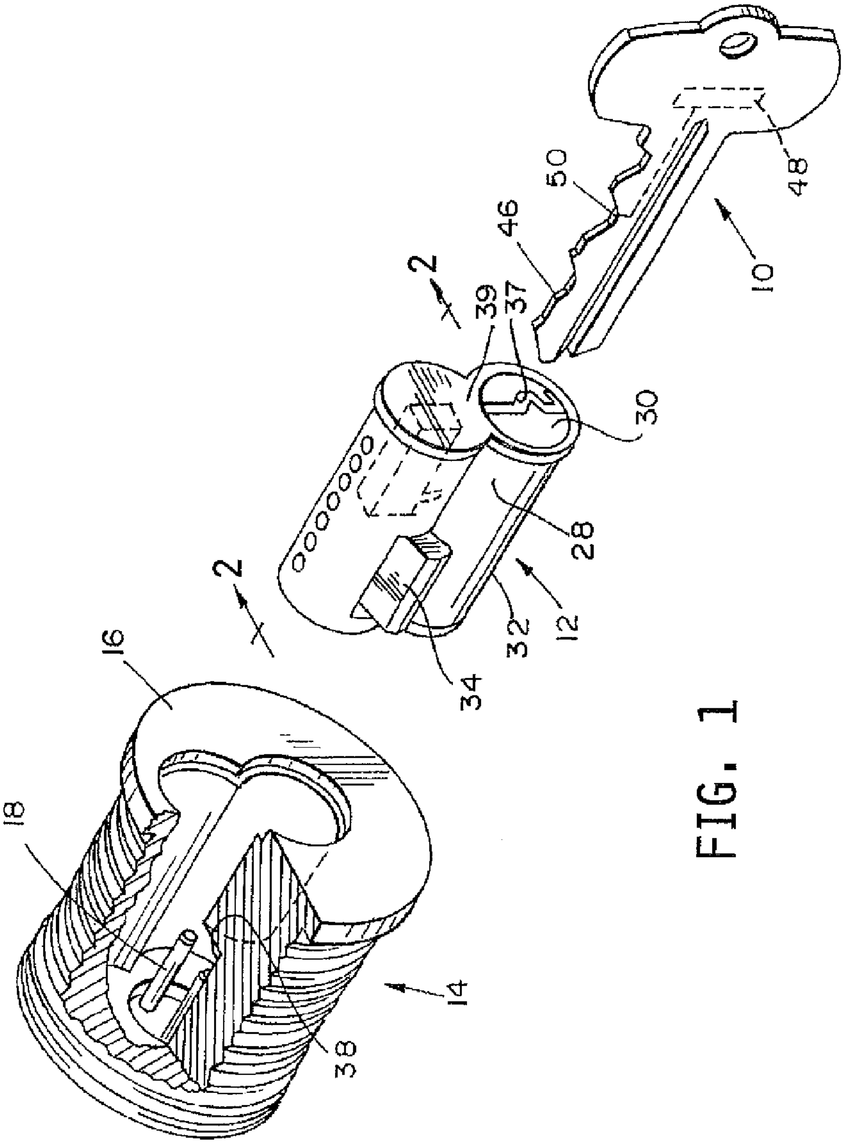
FIG. 1 is a perspective view of a token, a lock core, and a lock cylinder, the lock cylinder being formed to include an aperture to receive the lock core, and the lock core being formed to include a passageway to receive the token.

An electronic token 10 and lock core 12 in accordance with the present invention are shown in FIG. 1. The electronic token 10 and lock core 12 are components of a lockset that is installed in an entryway to restrict access through the entryway to valid individuals. The electronic token 10 and core 12 may include mechanical, electrical, and/or electrical/mechanical features that are used to grant or deny access to the user of the token 10. The electronic lock core 12 is interchangeable with a conventional lock core as shown, for example, in U.S. Pat. Nos. 4,444,034, 4,386,510, and 4,424,693. Thus, to change from a conventional mechanical lock core to the electronic lock core 12, a user must simply remove the mechanical lock core from the lock cylinder 14 and insert the electronic lock core 12 in the same lock cylinder 14.

Additional lockset components shown in FIG. 1 include a conventional lock cylinder 14 having a lock core-receiving aperture 16 and a throw member 18. In alternative embodiments of the present invention, the cylinder may be replaced by a padlock or any other type of closure or housing that accepts lock cores 12. Throw member 18 is a conventional lockset component and functions to transfer rotation or any type of movement induced by a token from lock core 12 to the rest of a lockset. In alternative embodiments, the throw member 18 may be replaced with any type of mechanism that performs the function of transferring rotation from the lock core 12 to the rest of the lockset.

The electronic lock core 12 and token 10 operate as a standalone unit and thus lock core 12 does not need to be hard-wired into an electrical system. All power required by lock core 12 and token 10 come from lock core 12 and token 10. In addition, any other features of the locking system such as access tracking, recombination, clock, display feedback, etc. must be contained within the token 10 and/or lock core 12.

Figure 2:
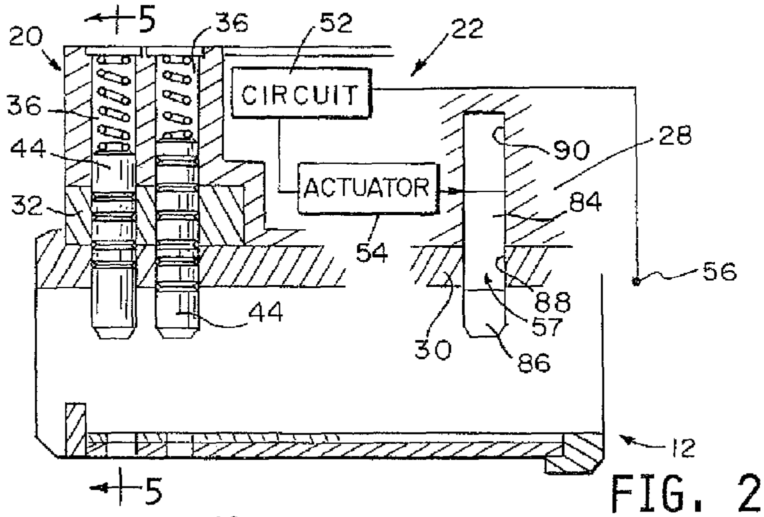
FIG. 2 is a sectional view, taken along line 2-2 of FIG. 1, showing the lock core including a mechanical portion having two tumbler pin barrels on the left side of the lock core and an electrical portion having a circuit, actuator, and mechanical linkage.
Figure 3:
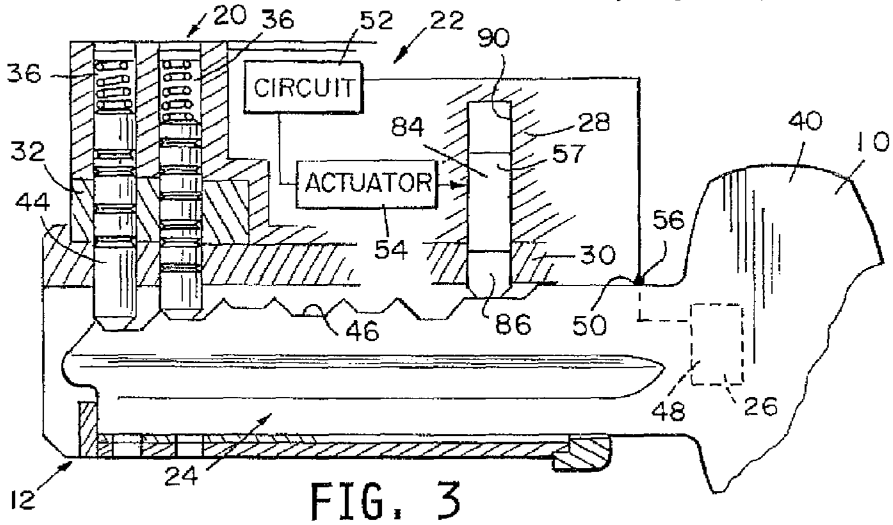
FIG. 3 is a sectional view similar to FIG. 2 showing the token positioned to lie in the passageway formed in the lock core, the token including a mechanical portion (bitted blade) and an electrical portion (phantom lines), the mechanical portion of the token interacting with the mechanical portion of the lock core, and the token engaging the mechanical linkage of the electrical portion of the lock core.
Figure 4:
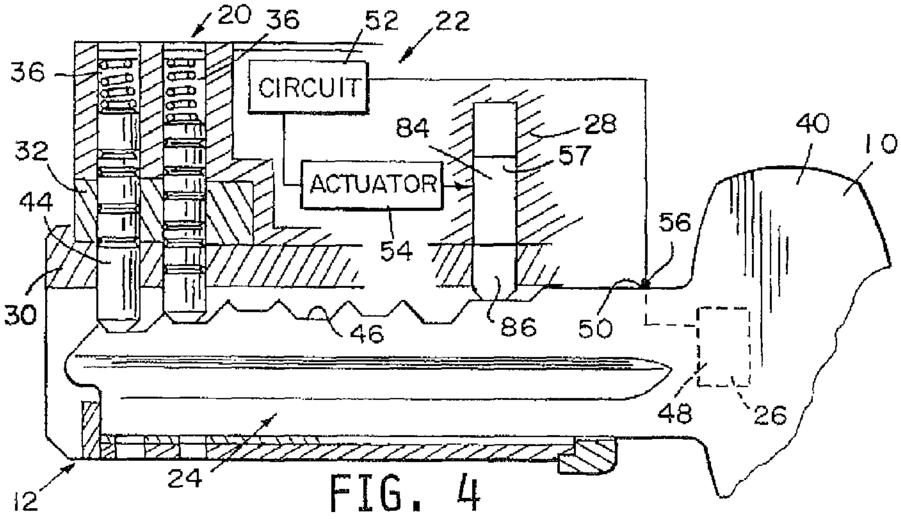
FIG. 4 is a sectional view similar to FIGS. 2 and 3 showing the circuit and actuator moving the mechanical linkage to permit the token to operate the lock core.

The lock core 12 includes a mechanical portion 20 and an electrical portion 22 that must be satisfied to permit an individual access through the entryway restricted by lock core 12 as shown in FIGS. 2-4. The token 10 also includes a mechanical portion 24 and an electrical portion 26 that cooperate with the mechanical and electrical portions 20, 22 of the lock core 12 to determine if the user of token 10 is permitted to operate the lockset.

Lock core 12 includes a core body 28, a key plug or lock actuator 30 positioned to lie in core body 28, a control sleeve 32 positioned to lie in core body 28, a control lug 34 coupled to control sleeve 32, pin tumbler barrels 36 positioned to lie partially in core body 28 and partially in the key plug 30, and a face plate 39 as shown, for example, in FIGS. 1-7. The pin tumbler barrels 36 comprise the mechanical portion 20 of lock core 12.

Figure 6:
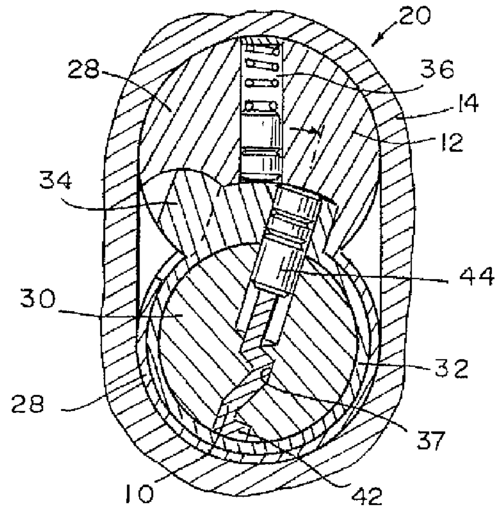
FIG. 6 is a sectional view similar to FIG. 5 showing a control token inserted into the lock core and biasing the tumbler pins so that rotation of the control token rotates the control sleeve and key plug relative to the core body.
Figure 7:
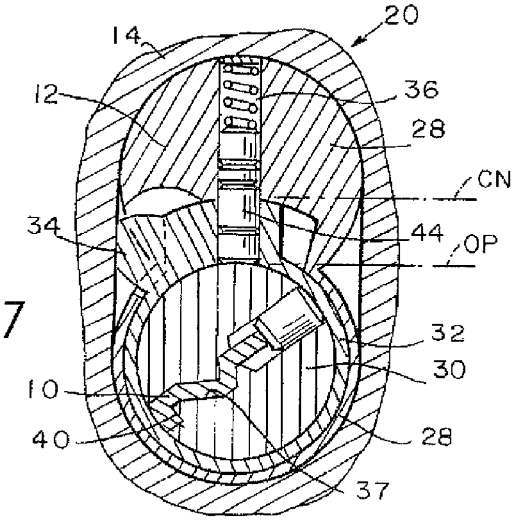
FIG. 7 is a sectional view similar to FIG. 6 showing an operating token inserted into lock core and biasing the tumbler pins so that rotation of the operating token rotates the key plug relative to the control sleeve and core body.

Key plug 30 is formed to include a keyway 37 that receives token 10. Keyway 37 is in communication with pin tumbler barrels 36. Key plug 30, control sleeve 32, and control lug 34 are rotatable relative to core body 28 by a token 10 as shown in FIGS. 6 and 7. The key plug 30 can be rotated by itself as shown in FIG. 7 and the key plug 30, control sleeve 32, and control lug 34 can be rotated together relative to core body 28 as shown in FIG. 6. When key plug 30 is rotated by itself, token 10 is permitted to rotate throw member 18 and thus cause the lockset to lock or unlock as desired.

Key plug 30 is one type of lock actuator that transfers movement induced by a token to move a door latch or other component of a lockset. In alternative embodiments of the present invention, key plug 30 may be linearly movable with respect to core body 28 to move a door latch or other component of the lockset.

Figure 5:
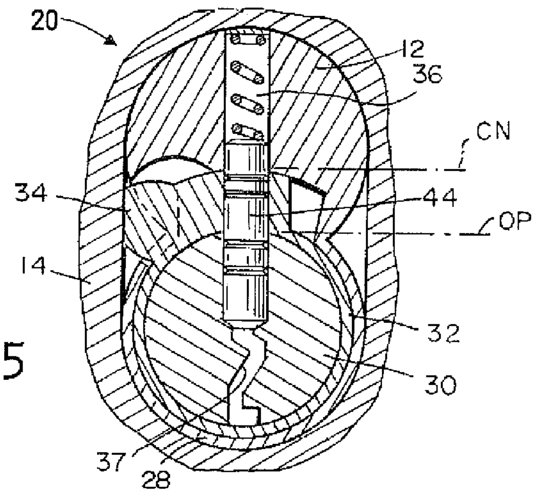
FIG. 5 is a sectional view taken along line 5-5 of FIG. 2 showing the lock core including a core body, a key plug positioned to lie within the core body and formed to include the passageway to receive the token, a control sleeve positioned to lie between the core body and key plug, a control lug appended to the control sleeve, and tumbler pins coupling the core body, control sleeve, and key plug together.

When control sleeve 32 and control lug 34 are rotated with key plug 30, control lug 34 is moved in and out of a recess 38 formed in lock cylinder 14 as shown in FIGS. 1 and 5-7. When control lug 34 is positioned to lie in recess 38 as shown in FIGS. 5 and 7, lock core 12 is securely held within lock cylinder 14. When control lug 34 is positioned to lie out of recess 38 as shown in FIG. 6, lock core 12 may be slid out of lock cylinder 14.

To rotate key plug 30 alone and, alternatively, control sleeve 32, control lug 34, and key plug 30 together, two different tokens are used with lock core 12. One of the tokens is referred to as an operating token 40 and is used when a user wants to rotate key plug 30 alone to cause the lockset to lock and unlock. The second token is referred to as a control token 42 and is used when a user wants to rotate key plug 30, control sleeve 32, and control lug 34 to move control lug 34 in and out of recess 38 formed in lock cylinder 14. The operating and control tokens 40, 42 cooperate with tumbler pins 44 positioned to lie in pin tumbler barrels 36 to determine if key plug 30 is rotated alone or together with control sleeve 32 and control lug 34.

Before a token 40, 42 is inserted into keyway 37 of key plug 30, tumbler pins 44 couple key plug 30 and control sleeve 32 to core body 28 as shown, for example, in FIGS. 2 and 5. When tumbler pins 44 are aligned in this manner, key plug 30 and control sleeve 32 are prevented from rotating relative to core body 28.

The operating token 40 engages tumbler pins 44 to align the faces of tumbler pins 44, as shown in FIGS. 2, 3, and 7, so that control sleeve 32 is coupled to core body 28 through tumbler pins 44 and key plug 30 is not coupled to core body 28 or control sleeve 32. This alignment of tumbler pins 44 by operating token 40 permits key plug 30 to rotate alone if all other locking systems of lock core 12 such as electrical portion 22 of lock core 12 are satisfied by operating token 40.

The control token 42 engages tumbler pins 44 to align the faces of tumbler pins 44 as shown in FIG. 6 so that control sleeve 32 is coupled to key plug 30 through tumbler pins 44 and neither key plug 30 nor control sleeve 32 is coupled to core body 28. This alignment of tumbler pins 44 by control token 42 permits key plug 30, control sleeve 32, and control lug 34 to rotate together if all other locking systems of lock core 12 such as electrical portion 22 of lock core 12 are satisfied by control token 42.

Figure 8:
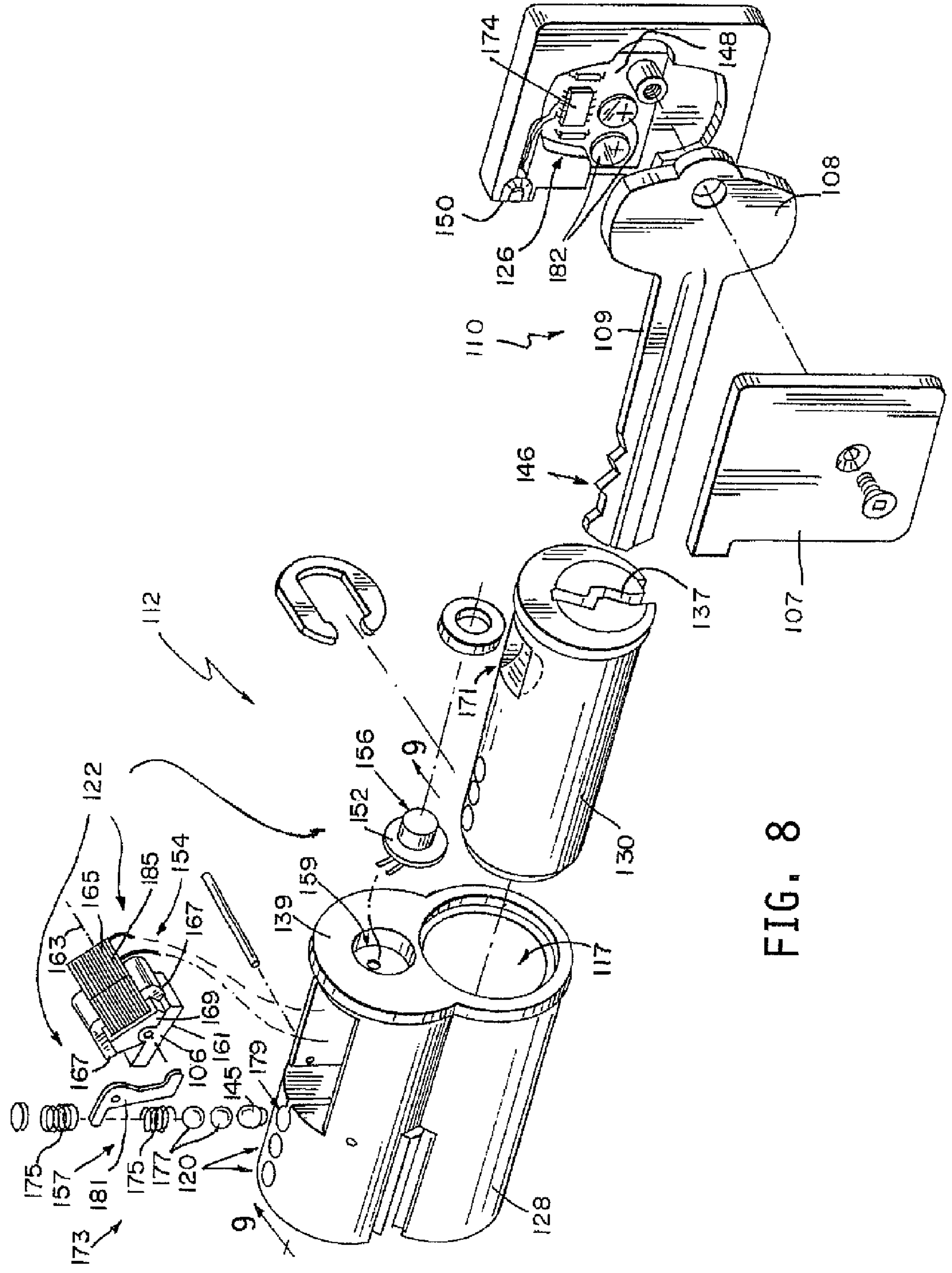
FIG. 8 is an exploded view of a preferred embodiment of an electronic token and lock core showing the lock core including a core body, a mechanical linkage having an energy storage system comprised of springs, bearings, and a cantilevered arm for insertion into the core body, an electromagnetic actuator having a blocker armature for mounting within the core body, a signal-receiving element to be located in a cavity formed in the front face of the core body, and a key plug having a blocker-receiving cavity and a keyway for insertion in the core body and showing the token including a bow and a bitted blade for receipt in the keyway, a casing for attachment to the bow, and a power supply and code storage elements lying in the casing.

The lock core 12 shown in FIG. 1 is a "figure-8 shaped" lock core 12. In alternative embodiments of the present invention, lock cores of other shapes, sizes, and configurations may incorporate the features disclosed in the present invention. For example, many European lock cores have a shape referred to as a Euro-core design. Additional details relating to lock cores 12 that can be used with the present invention are found, for example, in U.S. Pat. Nos. 4,444,034, 4,424,693, and 4,386,510 and are incorporated herein by reference.

The mechanical portion 24 of token 10 includes a bitted blade 46 and the electrical portion 26 includes a circuit 48 and contact or coupling 50. The mechanical portion 20 of lock core 12 includes pin tumbler barrels 36 and tumbler pins 44 that cooperate with bitted blade 46 of token 10. The operation of pin tumbler barrels 36 and tumbler pins 44 are discussed in detail in U.S. Pat. Nos. 4,444,034, 4,424,693, and 4,386,510 and are incorporated herein by reference. In alternative embodiments, the mechanical portion 24 of the lock core 12 and token 10 may include any type of mechanism in the lock core that the token must actuate before a user is granted access.

The electrical portion 22 of lock core 12 includes a circuit 52, an actuator 54, a contact and coupling 56, and a mechanical linkage 57. The circuit 52 of lock core 12 and circuit 48 of token 10 communicate through contacts 50, 56. Many types of contacts 50, 56 can be used and placed in many different locations on lock core 12 and token 10. These contacts 50, 56 include ohmic and inductive contacts as discussed in provisional patent application Ser. No. 60/080,974 filed Apr. 7, 1998 that is expressly incorporated by reference herein.

The circuit 52 of lock core 12 may include various combinations of a token identification reader or token communicator, a lock operator, a recombination system, a token access history, a clock, a power source, a power conditioner, and a power distributor. The circuit 48 of token 10 may include various combinations of token identification information or access code 74, token access history, clock, and power source 82. Various lock core 12 and token 10 configurations having different combinations of the above-mentioned features are illustrated and described in U.S. provisional patent application Ser. No. 60/080,974 filed Apr. 7, 1998 that is expressly incorporated by reference herein.

Before a token 10 is inserted into lock core 12, mechanical linkage 57 couples key plug 30 and core body 28 as shown in FIG. 3. The engagement between token 10 and mechanical linkage 57 provides energy to mechanical linkage 57 to later assist in moving mechanical linkage 57 if acutator 54 permits mechanical linkage 57 to move. The energy supplied to mechanical linkage 57 by token 10 can be stored by a spring, piezoelectric material/capacitor, elastic material, or other suitable device. In alternative embodiments, the mechanical linkage does not contact the token to receive energy.

After circuit 52 verifies that token 10 should be granted access, actuator 54 moves mechanical linkage 57 to a position shown in FIG. 4 to permit key plug 30 to rotate relative to core body 28 if the mechanical portion 20 of lock core 12 is also satisfied by token 10. In the illustrated embodiment, the mechanical linkage 57 includes first and second portions 84, 86 that can be separated. When circuit 52 verifies that token 10 should be granted access, actuator 54 positions mechanical linkage 57 so that the abutting faces of portions 84, 86 are positioned to lie at the intersection of core body 28 and key plug 30 and key plug 30 can rotate relative to core body 28. In alternative embodiments, when circuit 52 verifies that the token should be granted access, actuator 54 removes the entire mechanical linkage from the key plug to permit the key plug to rotate relative to the core body.

Because lock core 12 includes pin tumbler barrels 36, token 10 cannot be removed until the token is returned to the same position at which it was inserted as shown in FIG. 3. When token 10 is returned to this position, mechanical linkage 57 moves through chambers 88, 90 without assistance from actuator 54 to couple key plug 30 and core body 28 to prevent key plug 30 from rotating.

Referring specifically to FIGS. 8-11, a first embodiment of lock core 112 and token 110 are illustrated. Electronic lock core 112 includes a core body 128 having an aperture 117, a key plug or lock actuator 130 sized to be received in the aperture 117 and formed to include a keyway 137, a mechanical portion 120, and an electrical portion 122. Mechanical portion 120 includes two pin tumbler barrels 136 each containing tumbler pins 144 partially extending into keyway 137 and blocking rotation of key plug 130 relative to core body 128, as shown, for example, in FIG. 9, unless a token 110 containing an appropriately bitted blade 146 is inserted in keyway 137, as shown, for example in FIGS. 10-11.

Electrical portion 122 of lock core 112 includes a mechanical linkage 157, an electromagnetic actuator 154, a token communicator or coupling 156, and a circuit 152. Coupling 156 and circuit 152 are received in a cavity 159 formed in face plate 139 of core body 128. Electromagnetic actuator 154 includes an armature 161 pivotally supported for movement between first and second angularly displaced positions about a pivot axis 163 extending though center of mass 106 of armature 161, an electromagnet 165 having a pair of opposed pole members 167 extending toward the ends of armature 161 on either side of pivot axis 163, and a three pole permanent magnet 169 extending between pole members 167 of electromagnet 165. Armature 161 is received in a blocker-receiving channel 171 of key plug 130 to block rotation of key plug 130 relative to core body 128 when in the first position. Permanent magnet 169 biases armature 161 in the first position. When armature 161 is in the second position, it is not received in the blocker-receiving channel 171 and key plug 130 is permitted to rotate relative to core body 128.

Mechanical linkage 157 includes an energy storage system 173 having a spring 175, a semi-spherical tumbler pin 145 having a first end 104 extending into key way 137 and a spaced apart second end 105 and spherical tumbler pins 177 each including a downwardly facing semi-spherical surface for insertion into a barrel 179 partially formed in core body 128 and partially formed in key plug 130, and a cantilevered arm 181 for insertion into a cavity 183 in core body 128 in communication with barrel 179. Semi-spherical tumbler pin 145 includes a first end 104 extending into key way 137 and a spaced apart second end 105 engaging one of spherical tumbler pins 177. Each spherical tumbler pin 177 includes a downwardly facing semi-spherical surface.

Semi-spherical tumbler pin 145 and spherical tumbler pins 177 are utilized so that tumbler alignment in mechanical linkage 157 does not have to be as precise as the alignment of tumbler pins 144 in mechanical portion 120 in permitting key plug 130 rotation. So long as the downwardly facing semi-spherical surface of one of spherical pins 177 is located at the interface of core body 128 and key plug 130, rotation of key plug 130 will urge that spherical pin 177 upwardly until it is completely positioned within the portion of barrel formed in core body 128. Thus, the location of armature 161 with respect to blocker-receiving channel 171, and not the location of semi-spherical tumbler pin 145 and spherical tumbler pins 177, determines whether electrical portion 122 inhibits rotation of key plug 130 relative to core body 128. In alternative embodiments, the electrical portion includes tumbler pins similar to tumbler pins 144 instead of pins 145, 177 so that both the location of the armature 161 and the pins determine whether the requirements of the electrical portion are satisfied. Similar barrels 279, 379, 479, and 579, pins 245, 277, 345, 377, 445, 477, 545 and 577 are found in the lock core embodiments 212, 312, 412, and 512 described hereinafter to serve similar functions.

While FIG. 1 illustrates circuitry 48 and contact 50 integrally formed into the bow of electronic token 10, a presently preferred embodiment of electronic token 110 includes a standard mechanical token 109 having a bitted blade 146 and a bow 108 and a case 107 designed to encase bow 108, as shown, for example, in FIG. 8. Case 107 contains the electrical portion 126 of token 110. Standard token 109 is designed so bitted blade 146 may be received in keyway 137 of key plug 130. Illustratively electrical portion 126 includes a power supply 182, a coupling 150, incorporated previously by reference, and token identification information 174. Alternative forms of cases 607, 707, 807 and 907 for attachment to standard token bows are shown, for example, in FIGS. 25-28, respectively.

Figure 9:
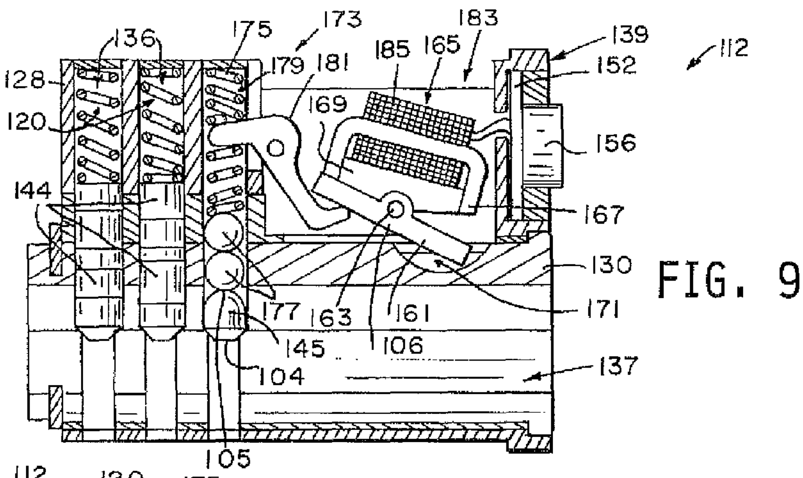
FIG. 9 is a sectional view taken along line 9-9 of FIG. 8 showing the lock core including a mechanical portion having two tumbler pin barrels each containing tumbler pins partially extending into the keyway and blocking rotation of the key plug relative to the core body and an electrical portion including the blocker of the electromagnetic actuator received in the blocker-receiving channel of the key plug to block rotation of the key plug relative to the core body.

Prior to token 110 insertion, tumbler pins 144 partially extend into keyway 137 and block rotation of the key plug 130 relative to core body 128 as shown in FIG. 9. Rotation of key plug 130 relative to core body 128 is also blocked by armature 161 of electromagnetic actuator 154 which is received in blocker-receiving channel 171 of key plug 130, as shown, for example, in FIG. 9. Armature 161 is inhibited from pivoting out of blocker-receiving channel 171 by cantilevered arm 181, as well as by permanent magnet 169.

Figure 10:
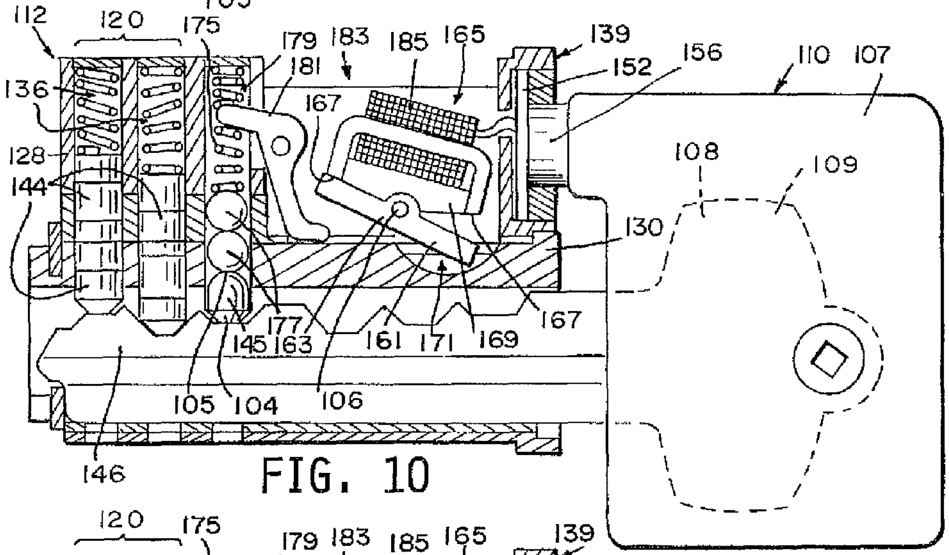
FIG. 10 is a sectional view similar to FIG. 9 with a token of FIG. 8 inserted into the keyway showing the bitted blade of the token aligning the tumbler pins of the mechanical portion of the lock core so that the tumbler pins no longer inhibit rotation of the key plug within the core body and compressing the springs and rotating the cantilevered arm of the electrical portion of the lock core to store energy within the springs and showing the blocker armature of the electromagnetic actuator still being received in the blocker receiving cavity but being free to rotate out of the blocker receiving cavity upon receipt of an authorized access signal by the electromagnetic actuator from the circuit after interrogating identification information on the token.
Figure 11:
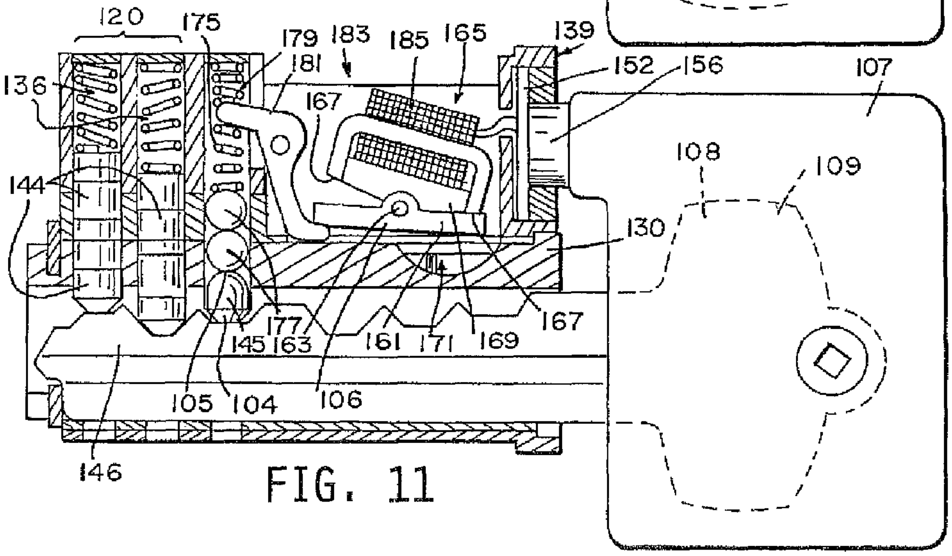
FIG. 11 is a sectional view similar to FIG. 10 showing the blocker armature of the electromagnetic actuator rotated out of the blocker receiving cavity after receipt of an appropriate code from the token allowing the key plug to rotate freely within core body.

When token 110 is inserted into keyway 137 bitted blade 146 of token 110 aligns tumbler pins 144 of the mechanical portion 120 so that they no longer inhibit rotation of key plug 130 with respect to core body 128 as shown in FIG. 10. Bitted blade 146 also urges semi-spherical tumbler pin 145 upwardly compressing spring 175 and causing rotation of arm 181 out of engagement with armature 161 freeing armature 161 to move if electromagnet 165 is energized in response to a valid authorization code. Thus, immediately after insertion of token 110, armature 161 of electromagnetic actuator 154 is still received in blocker-receiving cavity 171 but is free to rotate out of blocker-receiving cavity 171 upon lock core 112 receiving an authorized access signal from token 110, as shown, for example, in FIG. 10.

Compressed spring 175 stores energy which is used to urge arm 181 back into its initial position upon removal of token 110 from keyway 137, as shown in FIG. 9. This stored energy facilitates the return of armature 161 of electromagnetic actuator 154 to its blocking position in blocker-receiving slot 171.

If token 110 contains token identification information 174 which is authorized to open lock, coil 185 of electromagnet 165 is energized causing armature 161 of electromagnetic actuator 154 to be rotated out of the blocker-receiving cavity 171. Electromagnetic actuator 154 requires only a short energy pulse or trigger pulse to pivot armature 161 to the non-blocking position of FIG. 11. Once pivoted to the non-blocking position, armature 161 remains in that position without continued coil 185 energization. As a result, energy consumption of electronic lock core 112 is minimized extending the life of batteries used as a power source 182. Operation of a similar electromagnetic actuator 154 is described in depth in Ono et al. U.S. Pat. No. 4,703,293, the disclosure of which is incorporated herein by reference.

After the lockset has been configured to grant access to the authorized user, user removes token 110 from keyway 137 allowing the energy stored in compressed spring 175 to rotate arm 181 which pivots armature 161 of electromagnetic actuator 154 into its blocking position shown in FIG. 10. No electrical energy is required to return armature 161 to its blocking condition further extending the battery life of power source 182.

Figure 12:
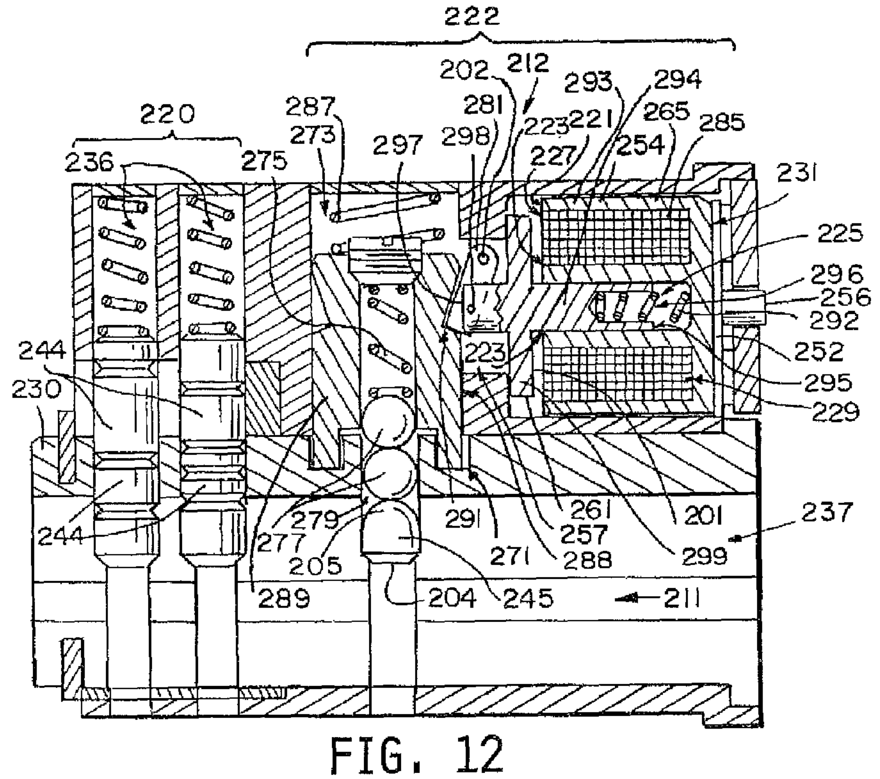
FIG. 12 is a sectional view of another preferred embodiment of a lock core showing the lock core including a core body, a key plug having a keyway therethrough, a mechanical portion having two tumbler pin barrels each containing tumbler pins extending into the keyway and positioned to prohibit rotation of the key plug relative to the core body, and an electrical portion having a mechanical energy storage mechanism comprised of a tumbler ball bearing, springs, a blocking body having a step formed therein, a latch engaging the step of the blocking body, and an electromagnetic actuator controlling movement of the latch.
Figure 13:
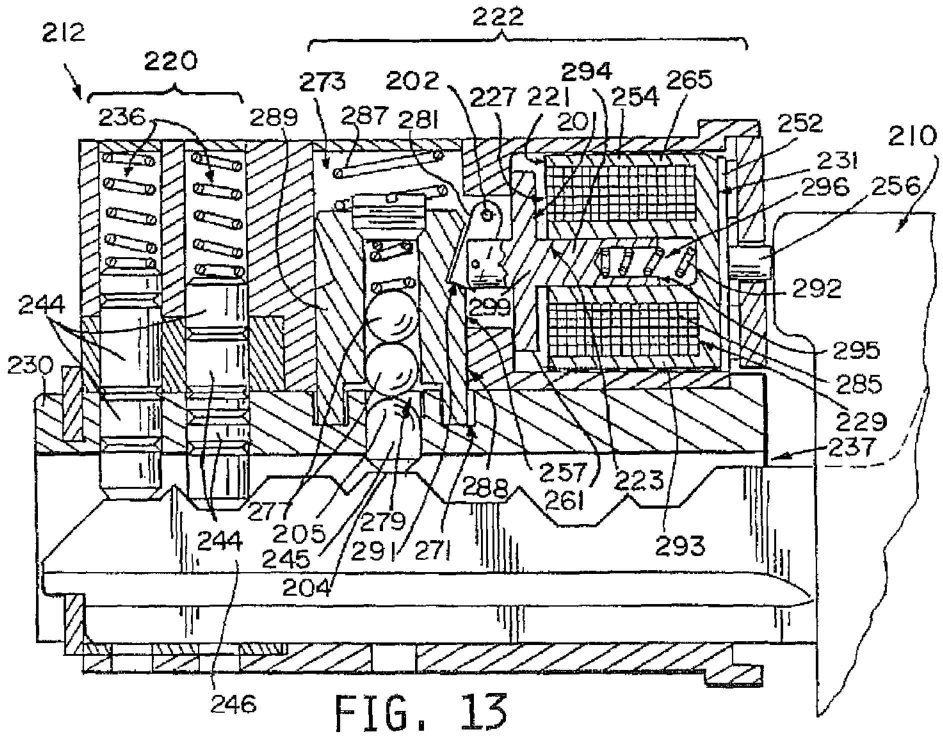
FIG. 13 is a sectional view similar to FIG. 12 with the token of FIG. 8 inserted in the keyway of the key plug so that the bitted blade has positioned the tumbler pins of the mechanical portion in a position which does not inhibit rotation of the key plug relative to the core body and stored energy in the spring of the electrical portion.
Figure 14:
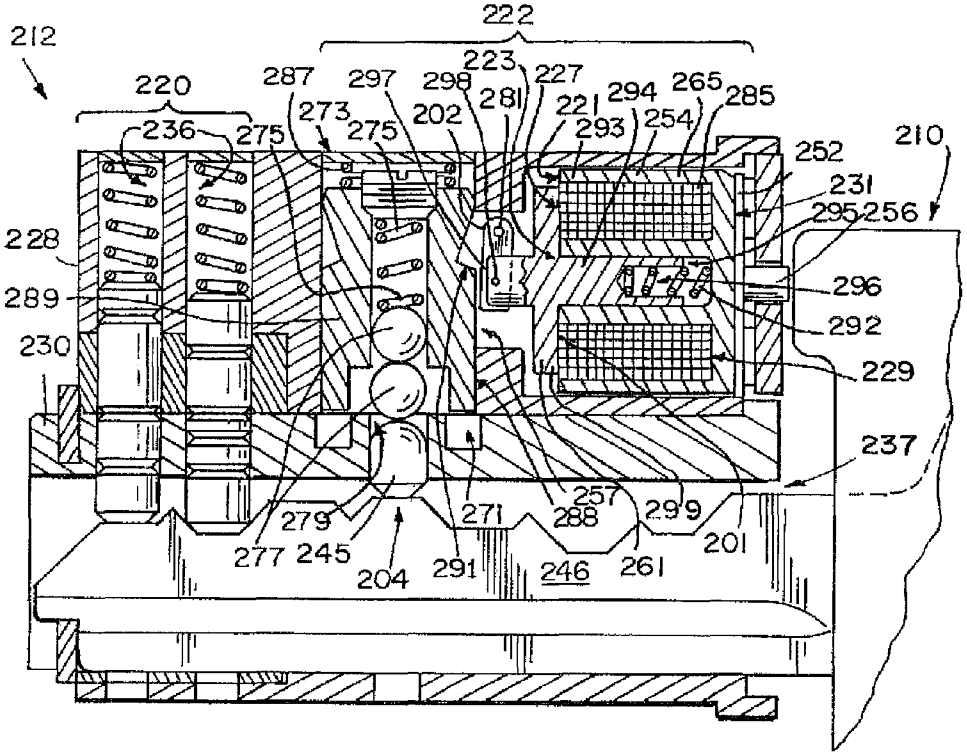
FIG. 14 is a sectional view similar to FIG. 13 after the electromagnetic actuator has been energized in response to the receipt of a valid access code from the token and has disengaged the latch from the step formed in the blocking body to allow energy stored in the lower spring to urge the blocking body into a position in which it no longer inhibits rotation of key plug with respect to core body.
Figure 15:
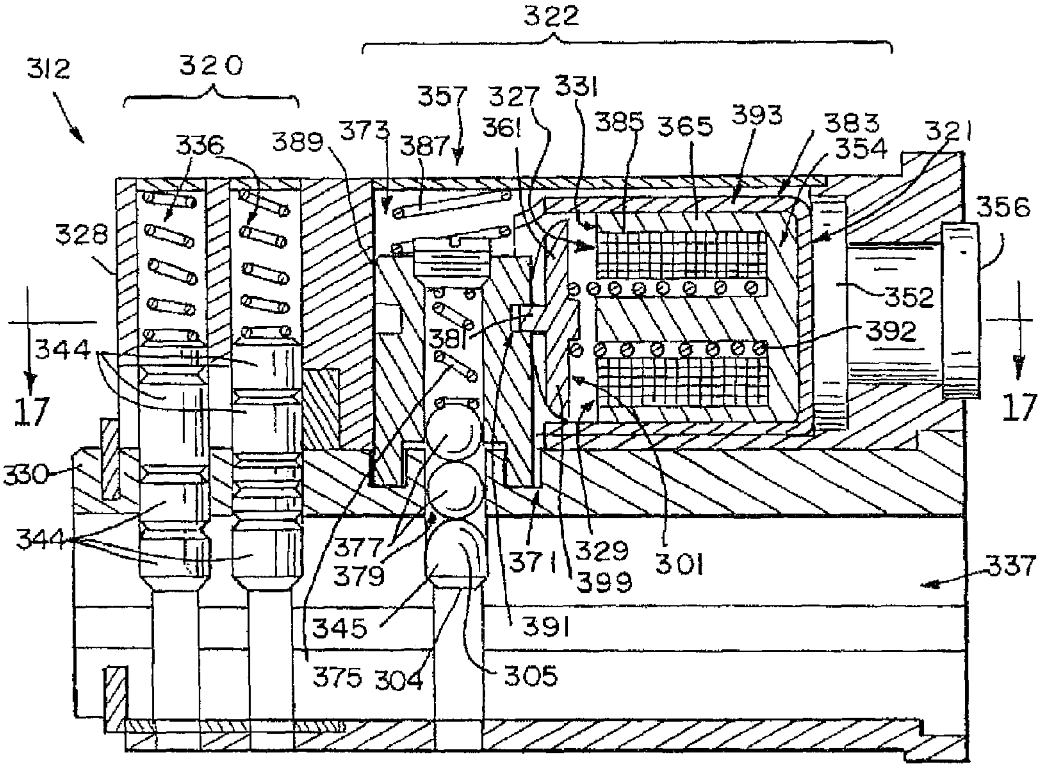
FIG. 15 is a sectional view of yet another preferred embodiment of an electronic lock core including a mechanical portion having two tumbler pin barrels each containing tumbler pins partially extending into the keyway and blocking rotation of the key plug relative to the core body and an electrical portion including a flange coupled to a disk that is pivotally attached to an electromagnet extending into a channel to hold the blocker body in a blocker-receiving cavity of the key plug and block rotation of the key plug relative to the core body.
Figure 16:
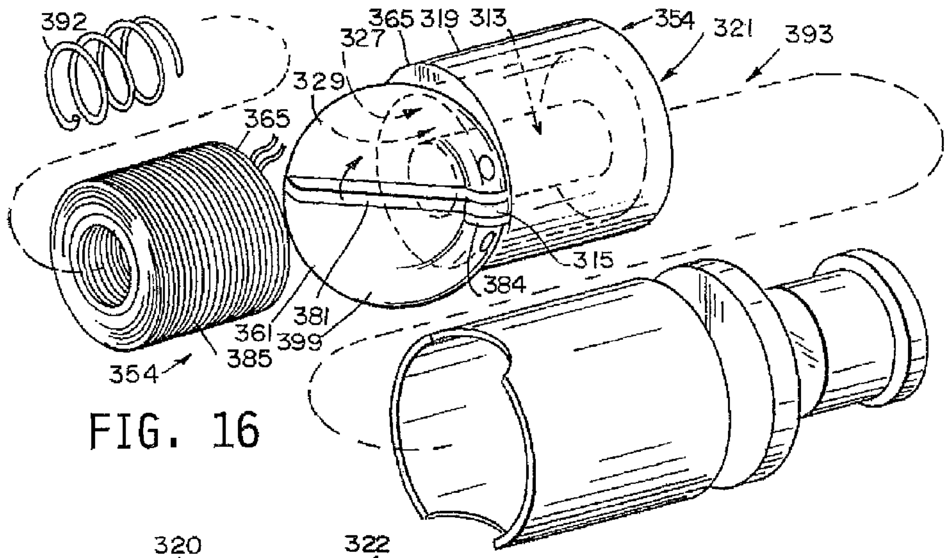
FIG. 16 is an exploded view of the electromagnetic actuator of FIG. 15 showing a core of an electromagnet into which a coil is inserted and a ferrous disk having the flange for receipt in the indentation in the blocker body that is pivotally mounted to the electromagnet.
Figure 17:
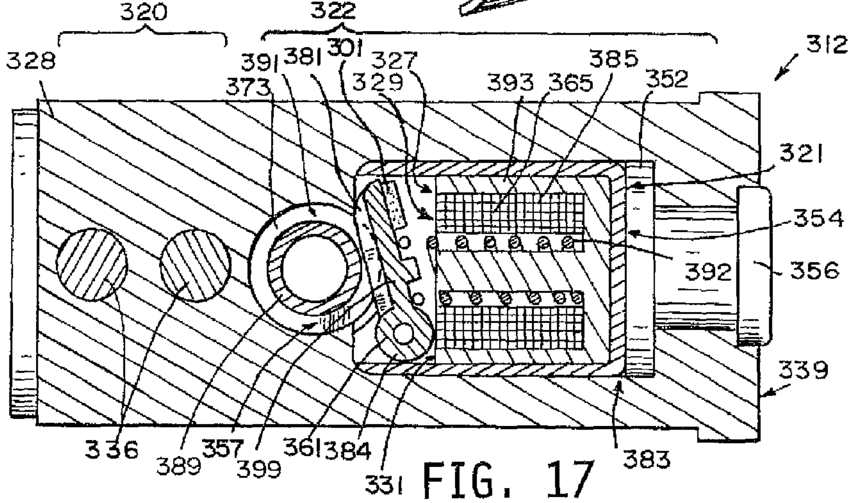
FIG. 17 is a sectional view taken along line 17-17 of FIG. 15 showing the flange of the ferrous disk received in the indentation in the blocker to prevent movement of the blocker and also showing a mechanical portion similar to that shown in FIGS. 9-11.
Figure 18:
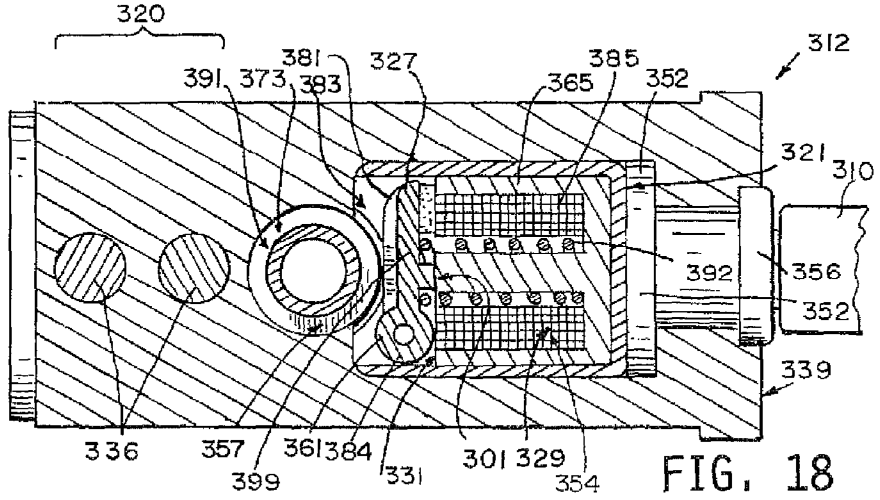
FIG. 18 is a sectional view similar to FIG. 17 with a token as shown in FIG. 8 inserted in the keyway showing the electromagnet energized in response to an authorized code to pivot the flange to a position allowing movement of energy storage mechanism.

Referring to FIGS. 12-14, a second embodiment of the lock core 212 in accordance with the present invention is illustrated. Lock core 212 includes core body 228, a key plug or lock actuator 230 having a keyway 237 therethrough, and a mechanical portion 220 including two tumbler pin barrels 236 each containing tumblers pins 244 extending into keyway 237 and blocking rotation of the key plug 230 relative to core body 228. Lock core 212 also includes electrical portion 222 having a coupling or token communicator 256, a circuit 252, an electromagnetic actuator 254, and a mechanical linkage 257. Mechanical linkage 257 includes a mechanical energy storage system 273 having a semi-spherical tumbler pin 245, spherical tumbler pins 277, a lower spring 275, an upper spring 287, a blocking body 289 having a step 291 formed therein, a latch 281, and blocking body-receiving cavity 271 formed in key plug 230. Electromagnetic actuator 254 is coupled to latch 281 to control the movement of latch 281 between a position lying in step 291 of blocker body 289 and a position away from step 291.

When token 210 is inserted into keyway 237 of key plug 230, bitted blade 246 positions tumbler pins 244 of mechanical portion 220 so they do not inhibit rotation of the key plug 230 relative to the core body 228 as shown in FIG. 13. Bitted blade 246 also engages semi-spherical tumbler pin 245 and urges it, and spherical tumbler pins 277, upwardly to compress lower spring 275. After token 210 insertion, but prior to receiving an authorized code, latch 281 is positioned in step 291 preventing blocking body 289 from moving out of blocker body-receiving cavity 271. The energy stored in the lower spring 275 after token insertion is used to urge blocking body 289 upwardly out of blocker body-receiving cavity 271 once latch 281 is urged away from step 291.

After electromagnetic actuator 254 has been energized in response to the receipt of a valid access code, latch 281 is momentarily disengaged from step 291 allowing energy stored in lower spring 275 to urge blocking body 289 into a position in which it no longer inhibits rotation of key plug 230 with respect to core body 228 as shown in FIG. 14. The upward movement of blocking body 289 stores mechanical energy in upper spring 287 which is later used to return blocking body 289 to its blocking position upon removal of token 210 as shown in FIG. 12.

Electromagnetic actuator 254 includes a core 293, a movable element 261, and a spring 292 biasing the movable element 261 away from the core 293. Core 293 has a first end 221 having a cross-sectional area (not shown) and formed to include a circular opening 223 therethrough communicating with a cylindrical axial cavity 225 and a ring-shaped opening 227 therethrough communicating with an annular cavity 229, a closed second end 231, and a cylindrical coil 285 received in the annular cavity 229.

Movable element 261 includes a shaft 294 having a first end 295 formed to include a spring receiving cavity 296, a second end 297 having a connector hole 298 extending therethrough, and a disk 299 extending radially from the shaft 294 between the first end 295 and second end 297. Disk 299 has a surface 201 facing first end 221 of electromagnet 265 which has a cross-sectional area substantially similar to cross-sectional area of first end 221 of electromagnet 265. First end 295 of movable element 261 is received in cylindrical axial cavity 225 of core 293. Spring 292 is received in spring-receiving cavity 296 and engages closed second end 231 of core 293 to bias disk 299 away from first end 231 of core 293. Second end 297 of shaft 294 is connected by a fastener to latch 281 which is pivotally mounted about pivot axis 202 to lock core 212. Second end 297 is connected to latch 281 at a point spaced apart from pivot axis 202 to increase mechanical advantage.

When current flows through coil 285 of electromagnet 265 in response to receipt of an authorized code from token 210, a magnetic field is produced which attracts surface 201 of disk 299 toward first end 231 of core 293 causing latch 281 to pivot away from blocking body 289 and to disengage step 291. Blocking body 289 is immediately urged upwardly by compressed spring 275 upon disengagement of latch 281 from step 291 as shown in FIG. 14. Cessation of current flow causes shaft 294 to move in the direction of arrow 211 in FIG. 12 allowing latch 281 to pivot into engagement with sidewall 288 of blocking body 289. Upon token 210 removal upper spring 287 will urge blocking body 289 to its blocking position while allowing latch 281 to be urged into engagement with step 291 as shown in FIG. 12. Thus, current need only flow through coil 285 long enough to disengage latch 281 from step 291 momentarily so that blocking body 289 can be urged upwardly out of blocker-receiving cavity 271. Because continuous current flow through coil 285 is not required to maintain the electrical portion 222 in a state in which key plug 230 rotation with respect to core body 228 is permitted, battery 182 life can be extended.

Referring to FIGS. 15-18, a third embodiment of an electronic lock core 312 is illustrated. Electronic lock core 312 includes a core body 328, a key plug or lock actuator 330 formed to include a keyway 337, a mechanical portion 320, and an electrical portion 322. Mechanical portion 320 includes two tumbler pin barrels 336 each containing tumbler pins 344 partially extending into keyway 337 and blocking rotation of key plug 330 relative to core body 328. Electrical portion 322 includes a coupling or token communicator 356, circuit 352, an electromagnetic actuator 354, and a mechanical linkage 357. Mechanical linkage 357 includes a mechanical energy storage system 373 having a semi-spherical tumbler pin 345, spherical tumbler pins 377, lower spring 375, upper spring 387, a blocking body 389 having a channel 391 formed therein, and a blocker-receiving cavity 371 formed in key plug 330. Electromagnetic actuator 354 includes an electromagnet 365, a movable element 361 attached by a hinge coupling to electromagnet 365, and a spring 392 biasing the unattached portions of movable element 361 away from the electromagnet 365. Electromagnetic actuator 254 includes an electromagnet 365, a movable element 361 attached by a hinge coupling to electromagnet 365, and a spring 392 biasing the unattached portions of movable element 361 away from the electromagnet 365.

Movable element 361 includes a disk-shaped ferrous element 399 having an electromagnet-facing surface 301, an opposite surface having a flange 381 extending therefrom, and a mounting bracket 384 formed at one edge. Electromagnet 365 includes a core 393 and a coil 385. Core 393 includes a closed first end 321, a cylindrical outer shell 319 extending from the first end 321, a central shaft 313 extending axially from the first end 321, and a second end 331 having a mounting ear 315 extending therefrom. The core 393 is formed to include an annular opening 327 communicating with an internal cavity 329 defined by the outer shell 319, closed end 321, and central shaft 317. Mounting bracket of movable element 361 is pivotally connected to mounting ear 315 of core 393, as shown, for example, in FIG. 16 so that electromagnet-facing surface 301 is directed toward second end 331 of core 393. Coil 385 and spring 392 are received in cavity 329, as shown, for example, in FIG. 16.

Electromagnetic actuator 354 is mounted in cavity 383 of lock body 328 so that flange 381 of movable element 361 is biased toward channel 391 of blocking body 389 by spring 392. When current is induced to flow through coil 385, an electromagnetic field is generated which attracts disk 399 of movable element 361 toward second end 331 of electromagnet 365 causing flange 381 to pivot out of channel 391. If a token 310 including an appropriately bitted blade 346 has been inserted into keyway 337, mechanical energy storage system 373 compresses lower spring 375 to store energy which urges blocking body 389 upwardly out of blocker body-receiving channel 371 immediately upon removal of flange 381 from channel 391.

Figure 19:
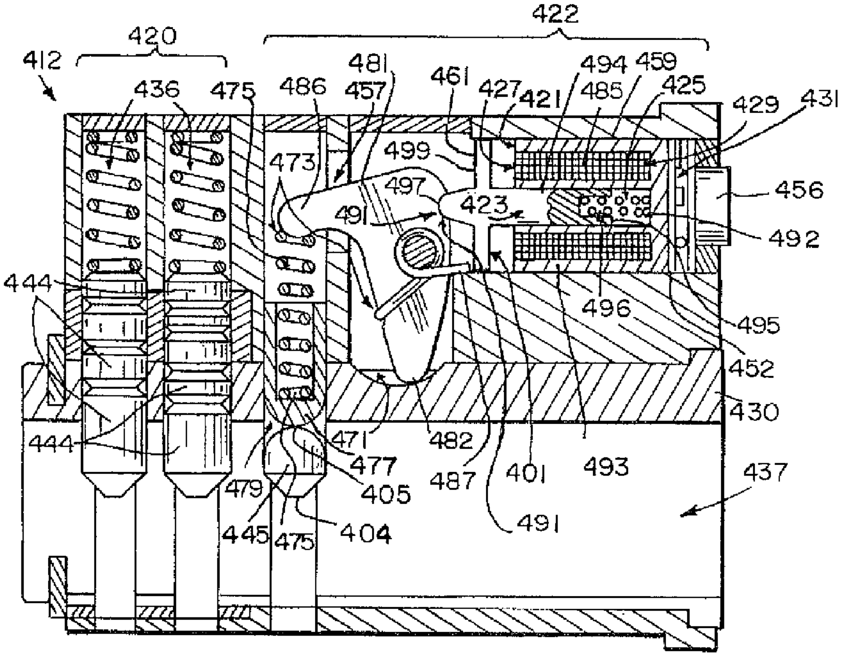
FIG. 19 is a sectional view of yet another preferred embodiment of a lock core according to the present invention, showing the lock core including a mechanical portion having two tumbler pin barrels each containing tumbler pins extending partially into the keyway and blocking the rotation of key plug with respect to core body, a mechanical energy storage device having semi-spherical ended tumblers, a coiled spring, a pivotally mounted latch with a blocker end, a storage end, and an indentation, and a torsion spring, and also showing a latch receiving cavity in the key plug with the blocker end of the latch received therein, a latch blocker having a tip received in the indentation, and an electromagnetic actuator for moving the latch blocker.
Figure 20:
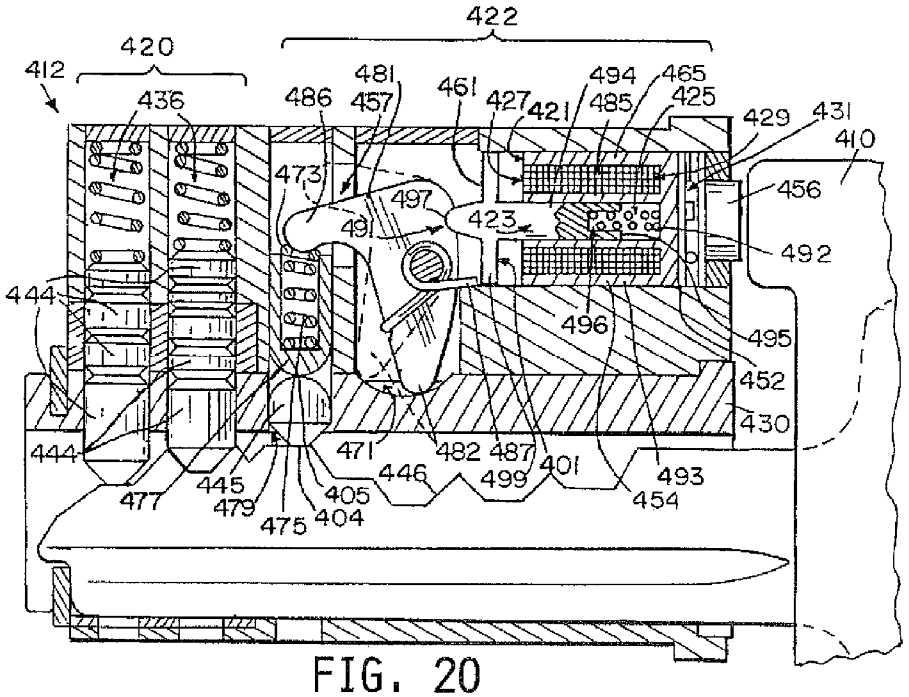
FIG. 20 is a sectional view similar to FIG. 19 with a token of FIG. 8 inserted in the keyway so that the bitted blade has positioned the tumbler pins of the mechanical portion in a position which does not inhibit rotation of the key plug relative to the core body and has urged the semi-spherical tumblers upward to store energy in the spring that may be released to urge the blocker end of latch from its current position in which it continues to inhibit rotation of the key plug with respect to the core body to a second position (shown in phantom lines) in which blocker end of latch is no longer received in the blocker receiving channel.
Figure 21:
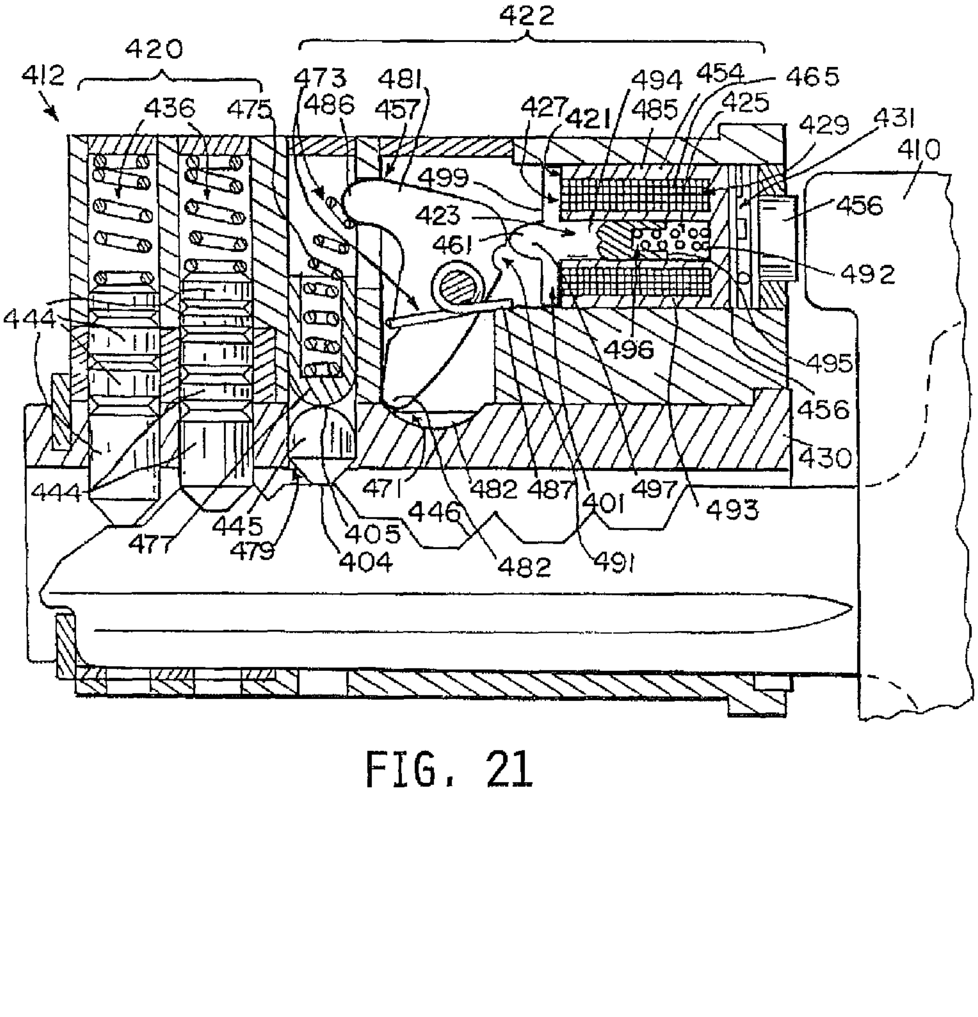
FIG. 21 is a sectional view similar to FIG. 20 showing the blocker end of the latch rotated out of the blocker receiving channel in response to removal of the tip of the latch blocker from the indentation of the latch after the electromagnet has been momentarily energized in response to receiving an authorized code to free the key plug to rotate with respect to the core body.

Referring to FIGS. 19-21 a fourth embodiment of a lock core 412 is illustrated. Lock core 412 includes mechanical portion 420 having two tumbler pin barrels 436 each containing tumbler pins 444 extending partially into the keyway 437 blocking the rotation of key plug or lock actuator 430 with respect to core body 428 and an electrical portion 422. Electrical portion 422 includes a coupling or token communicator 456, circuit 452, an electromagnetic actuator 454, and a mechanical linkage 457. Mechanical linkage 457 includes a mechanical energy storage system 473 having a semi-spherical tumbler 445, a semi-spherical ended tumbler 477, a lower spring 475, a pivotally-mounted latch 481 having a blocker end 482, a storage end 486, and an indentation 491, a torsion spring 487, and a latch-receiving cavity 471 in the key plug 430. Before, token 410 communicates with lock core 412, blocker end 482 of latch 481 is positioned in latch-receiving cavity 471 of key plug 430 to prevent rotation of key plug 430 relative to core body 428.

Electromagnetic actuator 454 includes an electromagnet 465, a movable element 461, and a spring 492. Electromagnet 465 includes a core 493 having a first end 421 formed to include a circular opening 423 therethrough communicating with a cylindrical axial cavity 425 and a ring-shaped opening 427 therethrough communicating with an annular cavity 429, a closed second end 431, and a cylindrical coil 485 received in the annular cavity 429. Movable element 461 includes a shaft 494 having a first end 495 formed to include a spring-receiving cavity 496, a pointed second end 497, and a disk 499 extending radially from the shaft 494 between the first end 495 and second end 497. First end 495 of movable element 461 is received in cylindrical axial cavity 425 of core 493. Spring 492 is received in spring-receiving cavity 496 and engages closed second end 431 of core 493 to bias disk 499 away from first end 431 of core 493. Second end 497 of shaft 494 is biased by spring 492 toward and for receipt into indentation 491 of latch 481 which is pivotally mounted to lock core 412. Coil 485 and spring 492 are received in cavity 427, as shown, for example, in FIGS. 19-21.

When a token 410 is inserted into keyway 437, bitted blade 446 positions tumbler pins 444 of mechanical portion 420 in a position which does not inhibit rotation of the key plug 430 relative to the core body 428. Bitted blade 446 also urges semi-spherical tumbler pin 445 upwardly storing energy in spring 475 that may be later released to urge storage end 486 of pivotally-mounted latch 481 upwardly and pivot blocker end 482 of latch 481 from its blocking position, in which it inhibits rotation of key plug 430 with respect to core body 428, to a second position (shown in phantom lines) in which blocker end 482 of latch 481 is no longer received in the blocker-receiving channel 471.

Blocker end 482 of latch 481 is pivoted out of the blocker-receiving channel 471 in response to removal of tip 497 of movable element 461 from indentation 491 in latch 481 after the electromagnet 465 has been momentarily energized in response to receiving an authorized code freeing the key plug 430 to rotate with respect to the core body 428.

Figure 22:
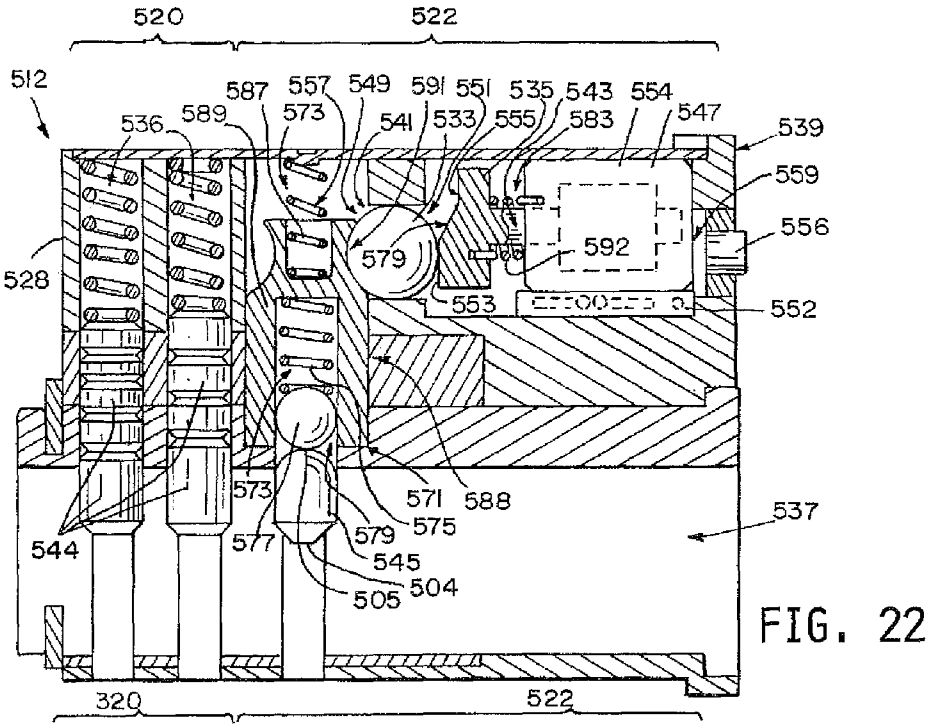
FIG. 22 is a sectional view of yet another preferred embodiment of the electronic lock core of the present invention showing a mechanical portion having two tumbler pin barrels each having tumbler pins partially extending into the keyway and blocking rotation of the key plug relative to the core body and a mechanical energy storage device including tumblers, a lower spring, a blocker body having an annular indentation and an upper spring, and a ball bearing received in a sleeve opening at one end adjacent to the blacker body and, at the other end, adjacent to a cam attached to a rotatable shaft, the ball bearing being received in the indentation to block motion of the blocker body.
Figure 23:
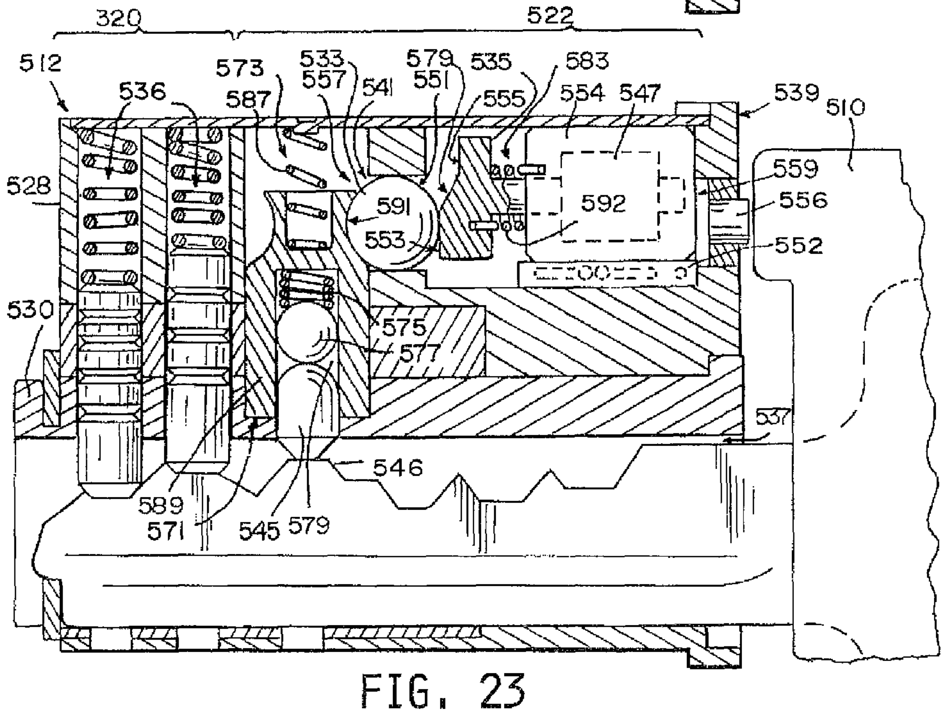
FIG. 23 is a cross-sectional view similar to FIG. 22 with a token of FIG. 8 received in the keyway aligning the tumbler pins of the mechanical portion to permit rotation of the key plug relative to the core body and compressing the lower spring of the mechanical energy storage device to store energy for moving the blocker body upward upon removal of the ball from the indentation of the blocker body.
Figure 24:
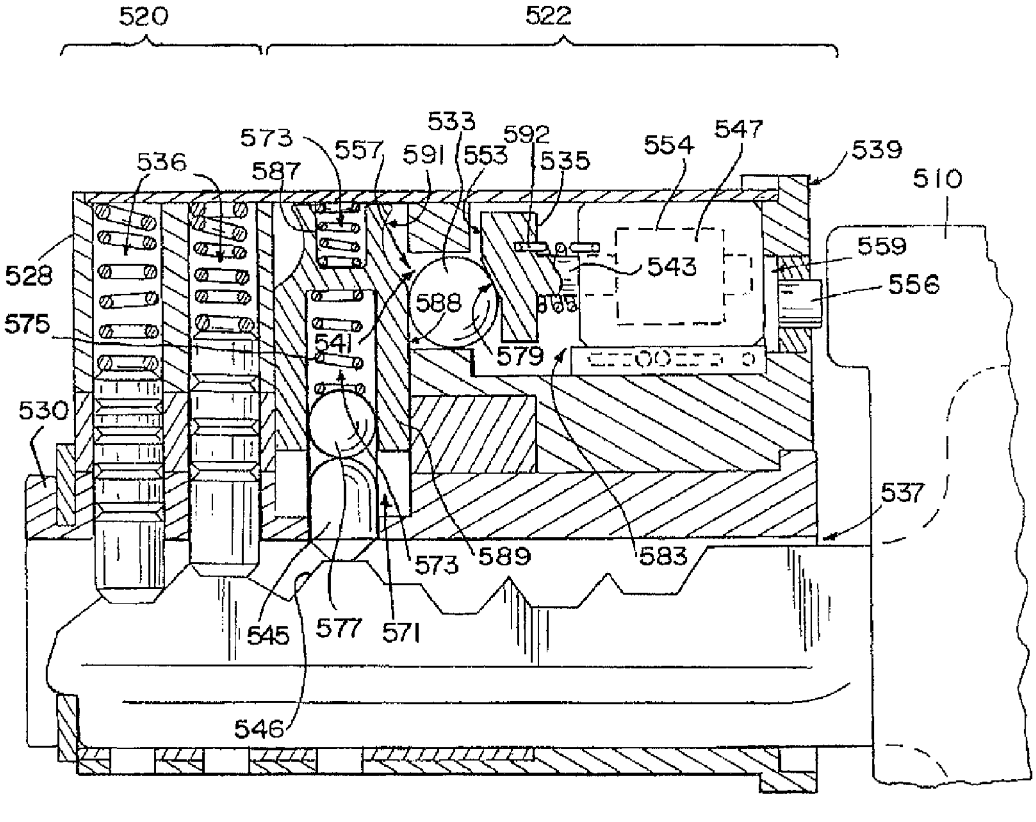
FIG. 24 is a cross-sectional view similar to FIG. 23 showing the cam rotated 180 degrees from the position shown in FIG. 23 by a rotatable solenoid in response to a valid access signal thereby allowing the ball to move out of the indentation of the blocker body which has been urged upward by the energy stored in the lower spring so that the blocker body no longer blocks rotation of the key plug relative to the core body.

Referring to FIGS. 22-24 a fifth embodiment of electronic lock core 512 is illustrated. Lock core 512 includes a mechanical portion 520, electrical portion 522, a key plug or lock actuator 530, and a core body 528. Mechanical portion 520 includes two tumbler pin barrels 536 each containing tumbler pins 544 partially extending into keyway 537 and blocking rotation of key plug 530 relative to core body 528. Electrical portion 522 includes a circuit 552, a electromagnetic actuator 554, a coupling or token communicator 556, and a mechanical linkage 557. As an alternative configuration to previously discussed embodiment of lock core 12, circuit 552 is located within cavity 583 instead of in cavity 559 in face plate 539. Mechanical linkage 557 includes a mechanical energy storage system 573, a ball bearing 533, a cam 535, and a ball bearing-receiving sleeve 541. Mechanical energy storage device 573 includes a semi-spherical ended tumbler 545, a spherical tumbler 577, a lower spring 575, an upper spring 587, and a blocker body 589 having an annular indentation 591. Cam 535 is attached to rotatable element 543 of a rotational solenoid 547. Ball bearing 533 is received in sleeve 541 which opens at one end 549 adjacent to blacker body 589 and at the other end 551 adjacent to a cam 535. Cam 535 has a first surface 553, a second surface 555, and an inclined surface 579 extending between the first and second surfaces 553, 555. Cam 535 is positioned so that when ball bearing 533 engages first surface 553 of cam 535, ball bearing 533 is held securely within indentation 591 in blocking body 589.

When a token 510 is initially inserted into keyway 537, bitted blade 546 aligns tumbler pins 544 of mechanical portion 520 to not inhibit rotation of key plug 530 relative to core body 528. Bitted blade 546 also engages and urges semi-spherical tumbler 545 upwardly compressing lower spring 575 of mechanical energy storage system 573. Compressed lower spring 575 stores energy for moving blocker body 589 upon removal of ball bearing 533 from indentation 591 of blocker body 589. However, until a valid authorization code is received and rotational solenoid 547 is energized, ball bearing 533 is securely held within indentation 591 preventing blocking body 589 from moving upwardly out of blocker-receiving cavity 571 formed in key plug 530. Therefore, electrical portion 522 continues to inhibit rotation of key plug 530 relative to core body 528.

If token 510 sends a valid access code to electronic core 512, rotational solenoid 547 rotates 180 degrees from the position shown in FIGS. 22-23 to the position shown in FIG.

24. During the rotation of rotatable shaft 543 of rotatable solenoid 547, ball bearing 533 is urged out of indentation 591 by upward motion of blocking body 589 so that ball bearing 533 rides along inclined surface 579 to second surface 555 of cam 535. Blocker body 589 is urged upwardly by the energy previously stored in lower spring 575. Upward movement of blocking body 589 causes blocking body 589 to not be received in blocker-receiving cavity 571 and therefore to not block rotation of the key plug 530 relative to the core body 528. Upward movement of blocker body 589 also compresses upper spring 587 to store energy to facilitate return of blocker body 589 to its blocking state upon removal of bitted blade 546 from keyway 537.

Once blocker body 589 has moved upwardly, ball bearing 533 engages sidewall 588 of blocker body 589 and is squeezed between second surface 555 and side wall 588 mechanically preventing cam 535 and movable element 543 of rotational solenoid 547 from returning to their initial orientations. Although rotatable element 543 is spring 592 biased to return to the position shown in FIGS. 22-23 when no current flows through solenoid 547, it is prevented from doing so by the above squeezing action. Thus, rotational solenoid 547 no longer needs to be energized to maintain it in the non-blocking position allowing power consumption of electrical portion 522 of lock core 512 to be reduced.

When bitted blade 546 is removed form keyway 537, upper spring 587 expands and urges blocking body 589 downwardly into blocker-receiving cavity 571. During this downward movement, ball bearing 533 follows side wall 588 of blocking body 589 until it is forced back into indentation 591 of blocking body 589. Thus no electrical power is consumed to restore lock core 512 to a state in which key plug 530 is prohibited from rotating relative to lock core 528.

As previously mentioned, the circuits 48, 52 and contacts or couplings 50, 56 used in each of the five specifically described embodiments may vary as to their configurations and individual components. Various examples of circuit 48, 52 configurations are illustrated and described in provisional application Ser. No. 60/080,974 that is expressly incorporated by reference. Contacts and couplings 50, 56 including metallic contacts, conductive elastic contacts, capacitive couplings, inductive couplings, optical couplings and combinations of the aforementioned are also illustrated and described in the provisional application. Additional examples of circuits 48, 52 and contacts or couplings 50, 56 are described and illustrated in U.S. Pat. Nos. 5,870,915, 5,870,913, 5,841,363, 5,836,187, 5,826,499, and 5,823,027, the disclosures of which are specifically incorporated herein by reference.

As outlined above, token and lock core circuits 48, 52 include many features that can be combined in various ways. In all embodiments of token circuits 48, the token circuit 48 includes token identification information 74 that communicates with the token identification reader 58 of lock core 12 through a token operator 75. The lock operator 60 of lock core circuit 52 considers the information contained in token identification information 74 to determine whether to grant or deny access to the user of token 10.

The recombination system 62 of lock core circuit 52 communicates with lock operator 60 to program lock operator 60 as to which tokens 10 should be granted permission to rotate key plug 30, control sleeve 32, and control lug 34. In conventional mechanical lock cores, the recombination system included changing the number or size of tumbler pins in pin tumbler barrels as disclosed, for example, in U.S. Pat. Nos. 4,424,693, 4,386,510, and 4,444,034. Recombinating the mechanical portion 20 of lock core 12 is accomplished by changing the number and size of tumbler pins as described in these patents.

The electronic recombination of circuit 52 via recombination system 62 may be accomplished by 1) inserting a "recombinating token" into lock core 12 and the recombinating token communicating with recombination system 62 through contact 56 of lock core 12; 2) placing a contact (not shown) on face plate 39 of lock core 12 that can "connect" the recombination system 62 with a user through scanning, infrared, optical, and physical connection techniques; 3) removing lock core 12 using control token 42 to access a contact not positioned on face plate 39 or keyway 37; or 4) any other type of communication technique.

Any of the following components may be used to connect a user and recombination system 62 so that a user can communicate with recombination system 62: metallic contacts; conductive elastic contacts; capacitive coupling; inductive coupling; optical coupling; combination of metallic contacts and either optical, inductive, or capacitive coupling; combination of conductive elastic contacts and either optical, inductive, or capacitive coupling; the above power and communications methods in combination with the Token ID Reader (i.e., through a recombination token).

The lock core circuit 52 may also include a clock 66 that cooperates with lock operator 60 to recombinate lock operator 60 at certain times. By recombinating lock operator 60 in this manner, a first token 10 may be granted access through lock core 12 only for a selected twelve hours of a day and a second token may be granted access through the same lock core 12 only for the other twelve hours of a day. This type of recombination could grant users access only during the time periods when they are to be in a facility.

The lock core circuit 52 and/or token circuit 48 may include a token access history 64, 78 that records the tokens 10 which have communicated with lock core 12. In some embodiments, the lock core circuit 52 and/or token circuit 48 also include a clock 66, 80 communicating with token access history 64, 78 to provide the time when the tokens 10 communicated with lock core 12. A user may communicate with token access history 64, 78 in the same manner and using the same components as described above for recombination system 62.

Any of the following components may be used as clock 66, 80: timekeeping electronic circuit (such as those made by, Dallas Semiconductor, Panasonic); timekeeping algorithm in lock operator 60.

The token access history 64, 78 may include a static random access memory. The static random access memory always requires power and thus a power source 68, 82 must be located in the same circuit 48, 52 as token access history 64, 78 including a static random access memory. When a token 10 is not communicating with lock core 12, the static random access memory does not require much power. The static random access memory requires significantly more power when a token W is communicating with lock core 12.

The token access history 64 may also include an Electrically Erasable Programmable Read-Only Memory ("EEPROM"). The EEPROM does not need external power from a power source 68, 82 because the EEPROM includes a capacitor that discharges over a lifetime of approximately 10 years. In alternative embodiments, the token access history may include any type of device having the ability to store information concerning tokens that communicate with a lock core, download that information, and meet the power and space restrictions imposed by the lock core and token.

Another form of recombination or downloading access history information is through token 10 receiving information from a first lock core 12 and then transmitting that information to a second lock core 12. For example, the security system of facility could include the lock cores on the outer perimeter of the facility hard-wired into a central database and lock cores 12 within the facility that operate as standalone units. As a token 10 is used to enter the outer perimeter of the facility, the central database could download recombinating information onto the token circuit 48. Then, as the token 10 is used in lock cores 12 within the facility, the token circuit 48 would recombinate the lock core circuits 52. While the token 10 is within lock core 12, token access history information from the lock core circuit 52 is downloaded onto the token circuit 48. Later, as the token 10 is used to exit the outer perimeter of the facility, the token history information is downloaded to the central database from token circuit 48.

As discussed above, because lock core 12 is a standalone unit, either token 10, lock core 12, or both token 10 and lock core 12 must include a power source 68, 82 that provides power to lock operator 60, actuator 54, recombination system 62, token access history 64, 78 token identification reader 58, clock 66, 80, token operator 75, and token identification information 74. If power source 82 is located in token 10, the power will be transmitted into lock core circuit 52 through token identification reader 58. The power received from token 10 is then sent to a power conditioner 70 to place the power in a usable form and then to a power distributor 72 which distributes power to all of the power-consuming components of lock core 12. If power source 68 is located in lock core 12, the power will be transmitted into token circuit 48 through token operator 75.

Power conditioner 70 could be any of the following components: 7800 or 7900 type linear power regulator, switching regulator, charge pump, Zener regulator, battery charger and regulator combination circuit.

Power distributor 72 could be any of the following components: wires, circuit board traces, connectors, metallic contacts, conductive elastic contacts.

The power source 68, 82 could be located in both lock core 12 and token 10. This type of power source 68 configuration could, for example, include a power source 68 in lock core circuit 52 that provides continuous power to clock 66 of lock core circuit 52 and a power source 82 in token circuit 48 that provides power to the other power-consuming components of lock core 12 only when token 10 interacts with lock core 12. Compared to a configuration wherein the entire power source 68 is located within lock core circuit 52, this configuration wherein the power source 68, 82 is divided between lock core 12 and token 10 frees up more space in lock core 12 for other mechanisms.

The power source 68, 82 may be any type of device that provides the necessary amount of power to the components requiring power. The power source 68, 82 could be one of the following items: electrochemical battery such as those made by Duracell, re-chargeable electrochemical battery, capacitor, super capacitor such as the P695X series made by Panasonic, magneto current generator, piezoelectric polymer film or piezoelectric ceramic electric generator.

In addition, the power could be generated solely or supplemented by power generated by a user of token 10. This power could be generated by the user gripping the token 10 or rotating or sliding the token 10 in the lock core 12. For example, the lock core could include a slidable flap positioned within the keyway 37 that token 10 would engage and move upon sliding token 10 into and through keyway 37. The flap could be connected to any power source 68, 82 or power conditioner 70 and power distributor 72 mentioned within this application. Further, this flap could be positioned near the front of lock core 12 to provide protection to components contained within lock core 12.

A piezoelectric material that possesses the ability to generate an electrical potential when subjected to a mechanical strain may be used to generate power from the user's movement of token 10. In addition a magneto may be used to generate power from a user operating token 10.

Figure 29:
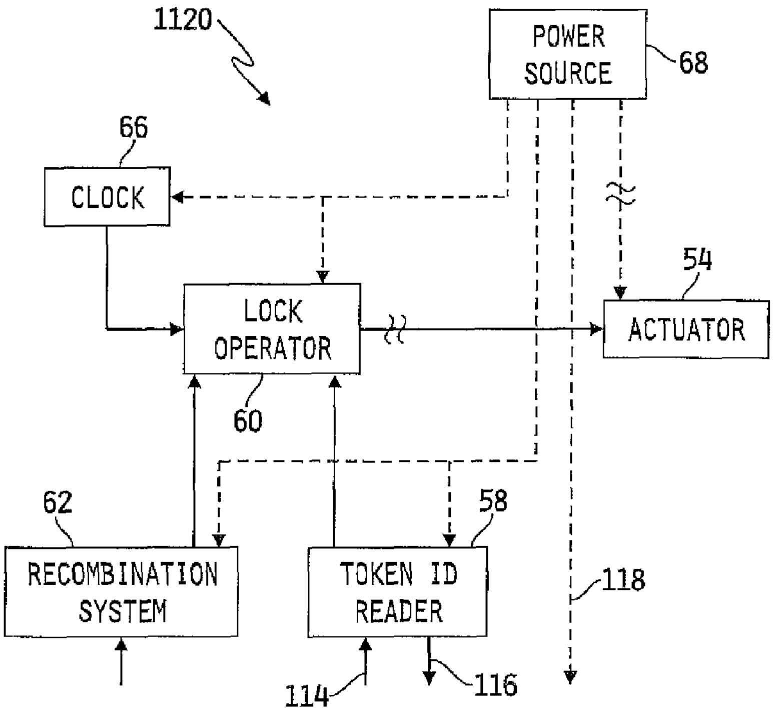
FIGS. 29-44 are flow charts showing the functional operation of several embodiments of the circuit of the electrical portion of the lock core shown in FIGS. 2-4.

Various lock core circuits 1120, 1122, 1124, 1126, 1128, 1130, 1132, 1134, 1136, 1138, 1140, 1142, 1144, 1146, 1148, 1150 having different combinations of the above elements are shown in FIGS. 29-44. Lock core circuit 1120 is shown in FIG. 29 and includes token ID reader 58, lock operator 60, recombination system 62, clock 66, and power source 68. The clock 66, recombination system 62, and token ID reader 58 all feed into lock operator 60 and lock operator 60 processes all the information and determines whether to permit actuator 54 to move mechanical linkage 57 so that key plug 30 can rotate relative to core body 28. The input to lock core circuit 1120 through token identification reader 58 is token identification information 114 and the output from lock core circuit 1120 through token identification reader 58 is token access history information 116. Lock core circuit 120 could be used with a token circuit 48 having token access history 78 that would receive and store token access history information 116. In addition, lock core 1120 provides a power output 118 that can provide power to components of token circuit 48. Token identification information 114, token access history information 116, and power output 118 can flow through the same or separate contacts 50, 56.

Figure 30:
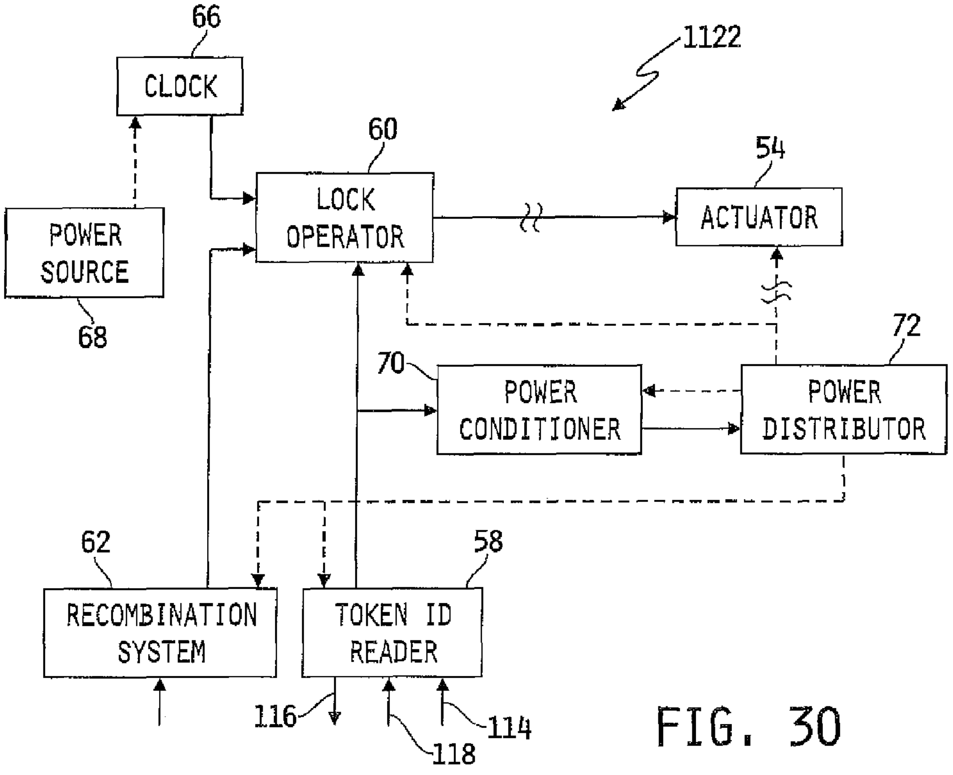

Lock core circuit 1122 is shown in FIG. 30 and is identical to lock core circuit 1120 except that lock core circuit 1122 includes a power source 68 that only provides power to clock 66. The power for the remaining components is provided in the form of power input 118 provided from a power source 82 in a token 10. The power input 118 is input into lock core circuit 1122 through token identification reader 58 and sent through a power conditioner 70 and power distributor 72 before being transmitted to all of lock core circuit 1122 components requiring power.

Figure 31:
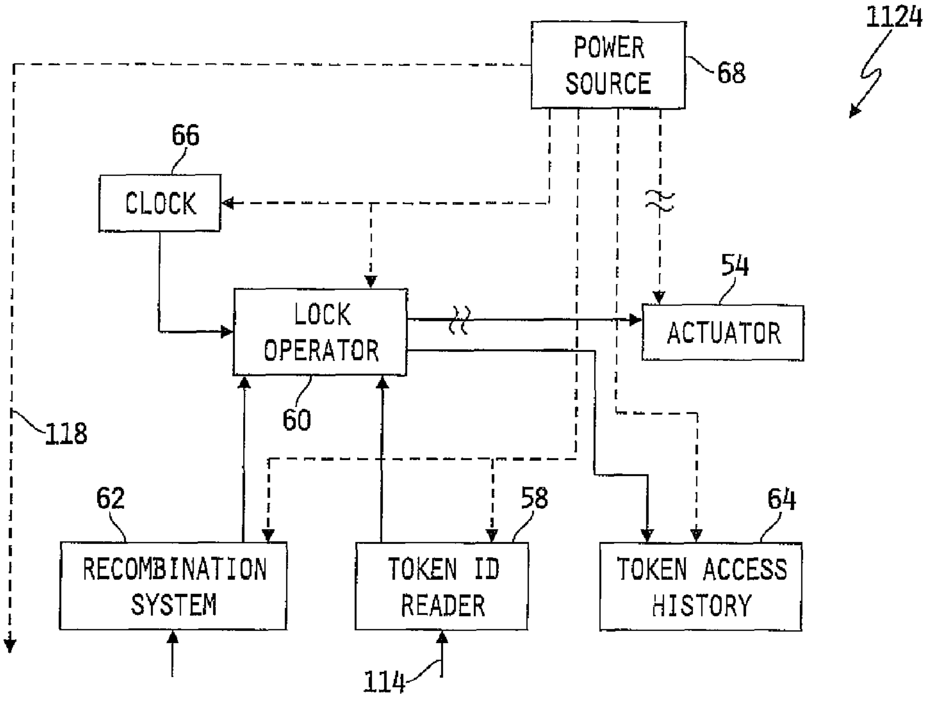

Lock core circuit 1124 is shown in FIG. 31 and is identical to lock core circuit 1120 except that lock core circuit 1124 includes a token access history 64. Token access history 64 receives and stores information from lock operator 60 including, if desired, information from clock 66.

Figure 32:
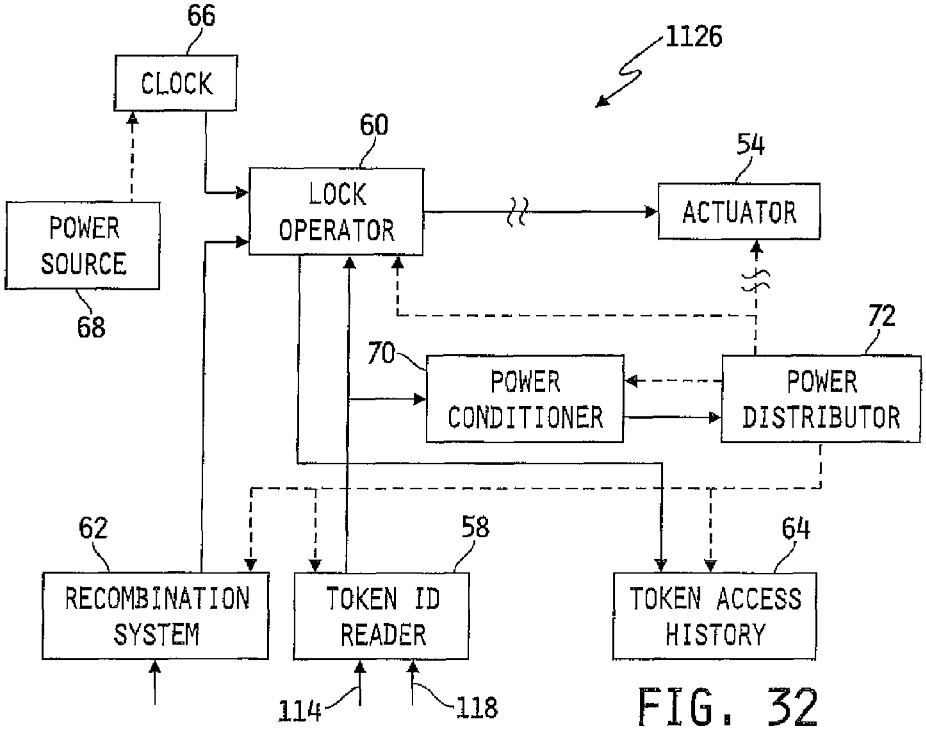

Lock core circuit 1126 is shown in FIG. 32 and is identical to lock core circuit 1124 except that lock core circuit 1126 includes a power source 68 that only provides power to clock 66. The power for the remaining components of lock core circuit 1126 is provided in the form of power input 118 provided from a power source 82 in a token 10.

Figure 33:
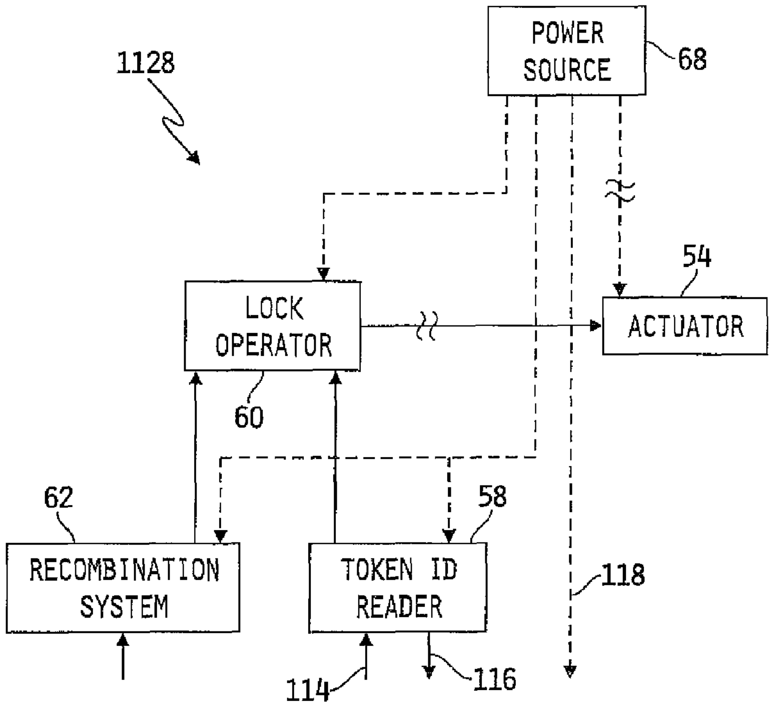

Lock core circuit 1128 is shown in FIG. 33. Lock core circuit 1128 is identical to lock core circuit 1120 except that lock core circuit 1128 does not include a clock 66. Because lock core circuit 1128 does not include either clock 66 or token access history 64, lock core circuit 1128 sends all token access history information 116 to token 10 to be stored by token circuit 48 if token circuit 48 includes token access history 78.

Figure 34:
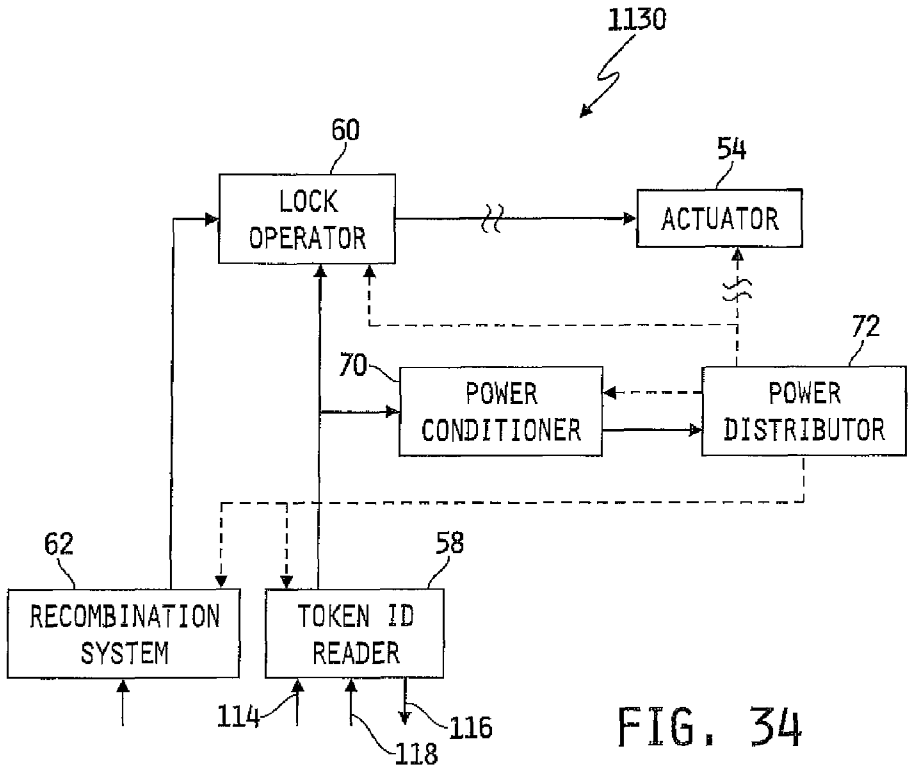

Lock core circuit 1130 is shown in FIG. 34 and is identical to lock core circuit 1128 except that lock core circuit 1130 does not include a power source 68 and thus receives all required power from a power input 118. Power received through power input 118 is generated by a power source 82 located in token circuit 48.

Figure 35:
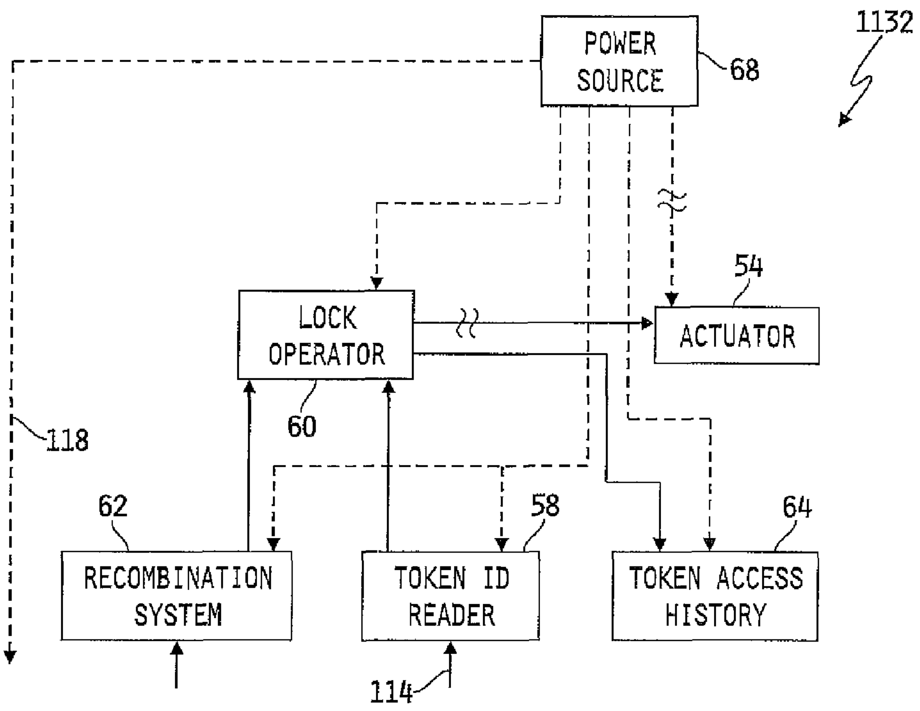

Lock core 1132 is shown in FIG. 35 and is identical to lock core circuit 1128 except that lock core circuit 1132 includes a token access history 64.

Figure 36:
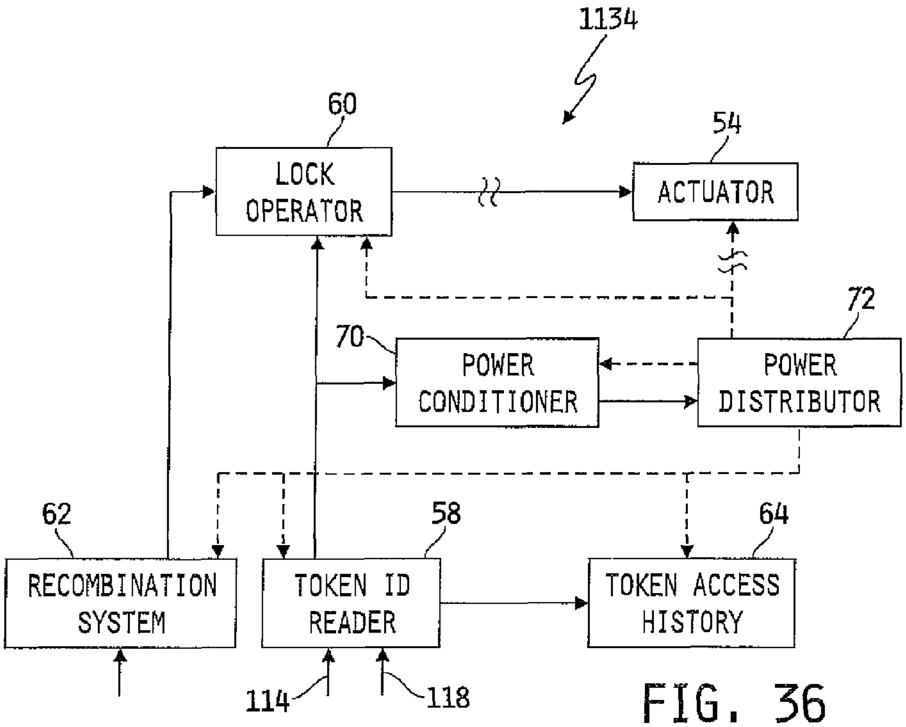
Figure 37:
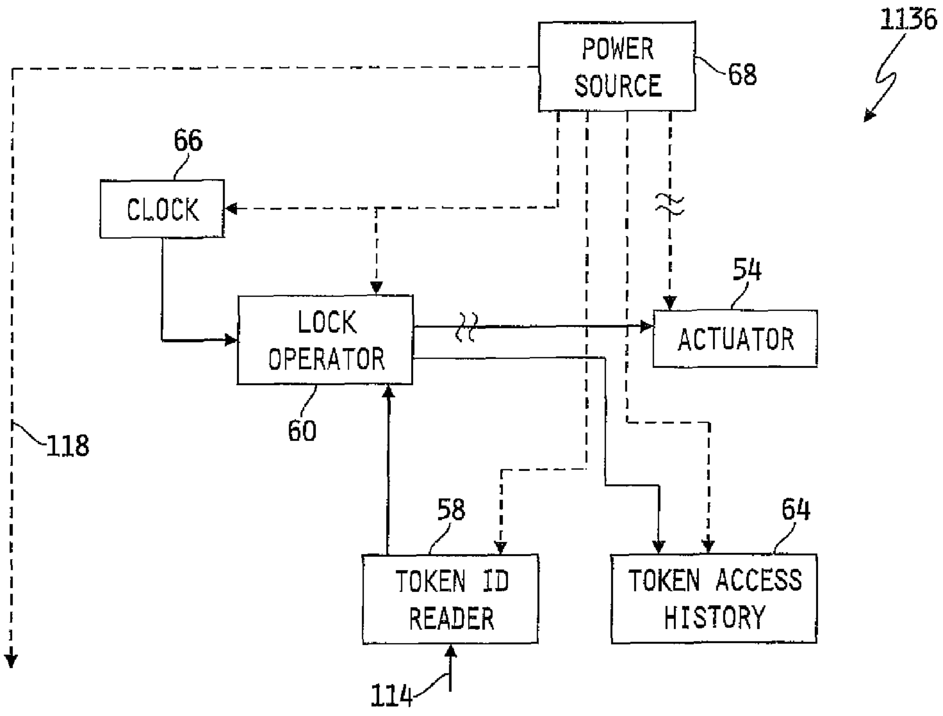
Figure 38:
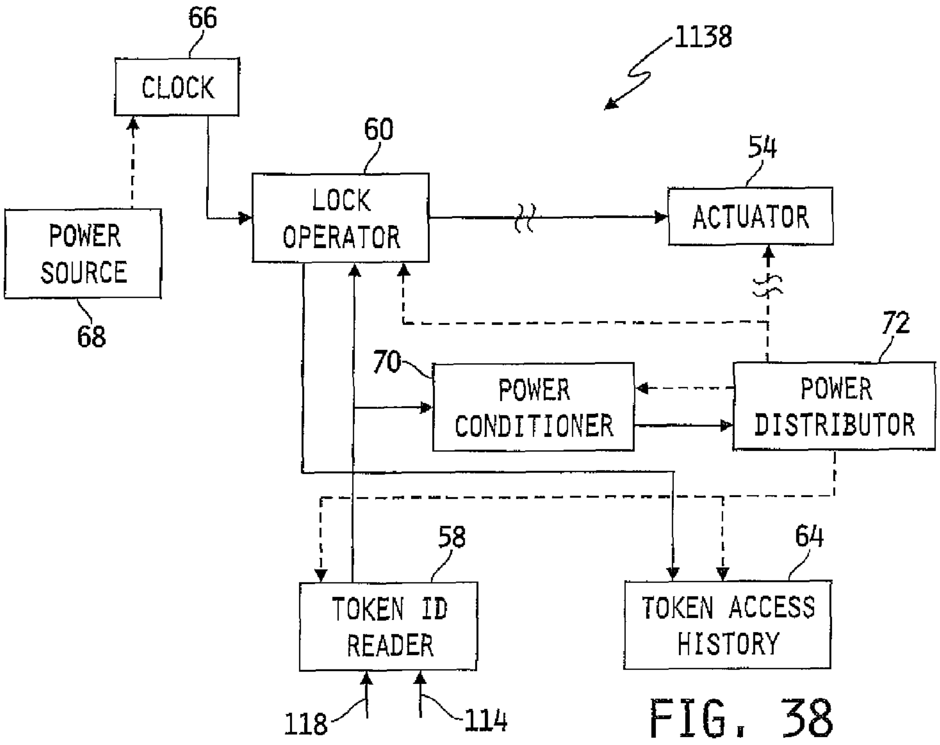
Figure 39:
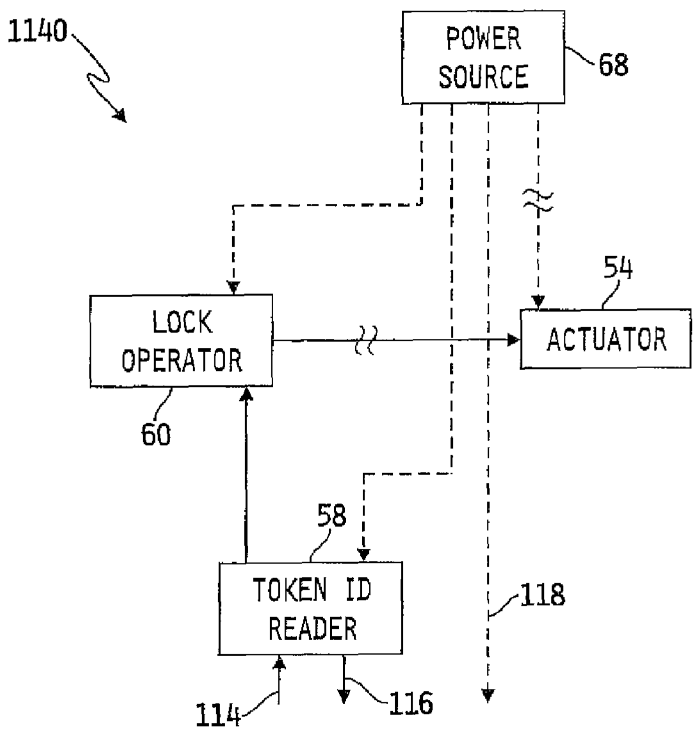
Figure 40:
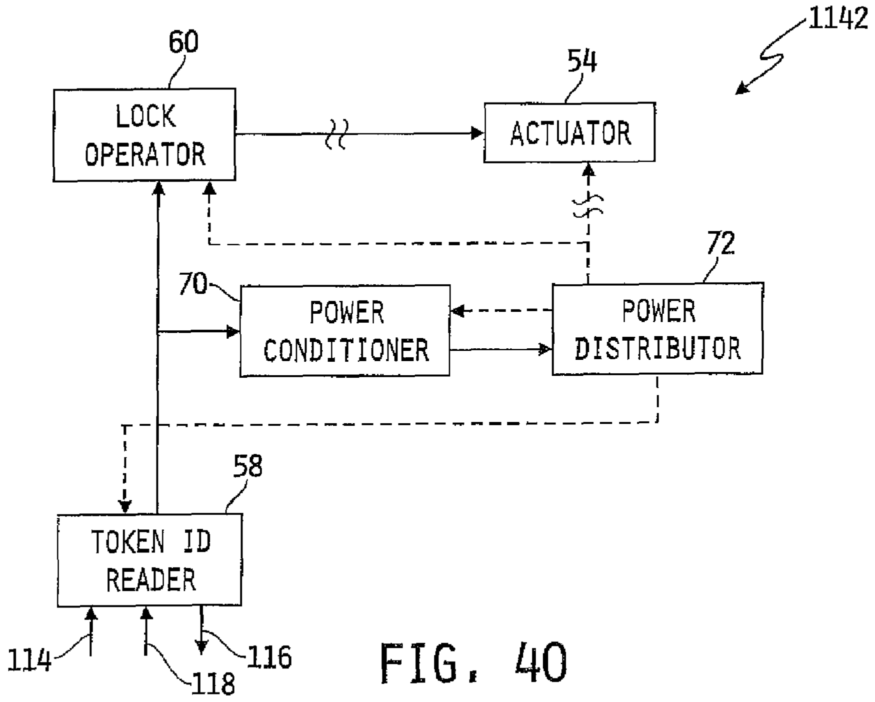
Figure 41:
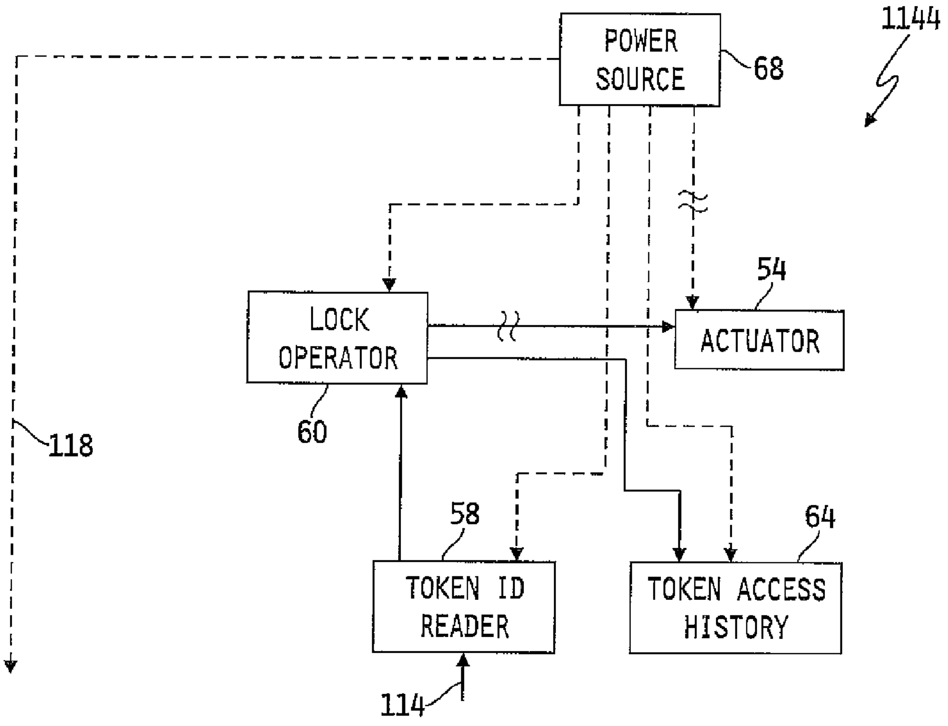
Figure 42:
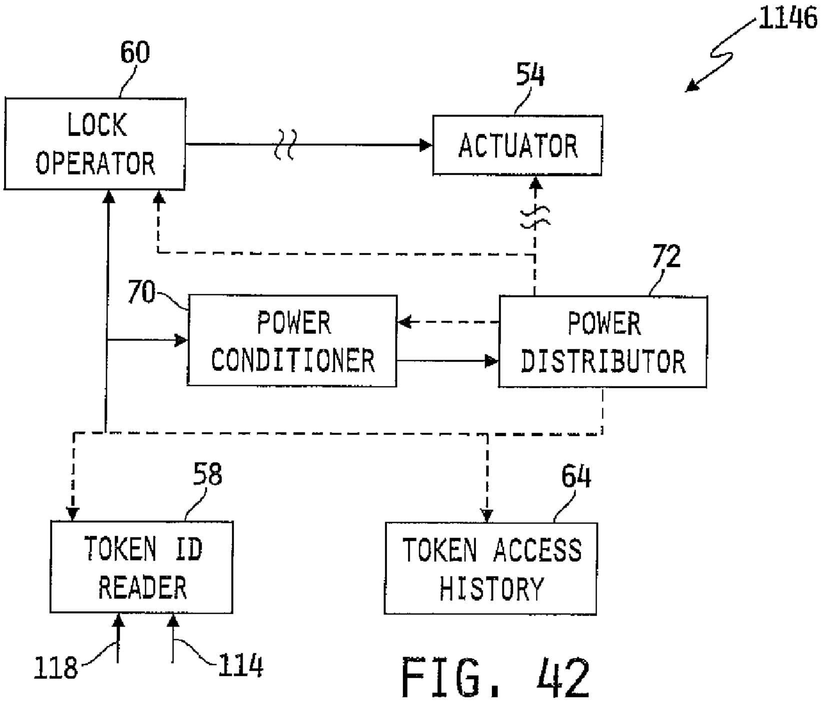
Figure 43:
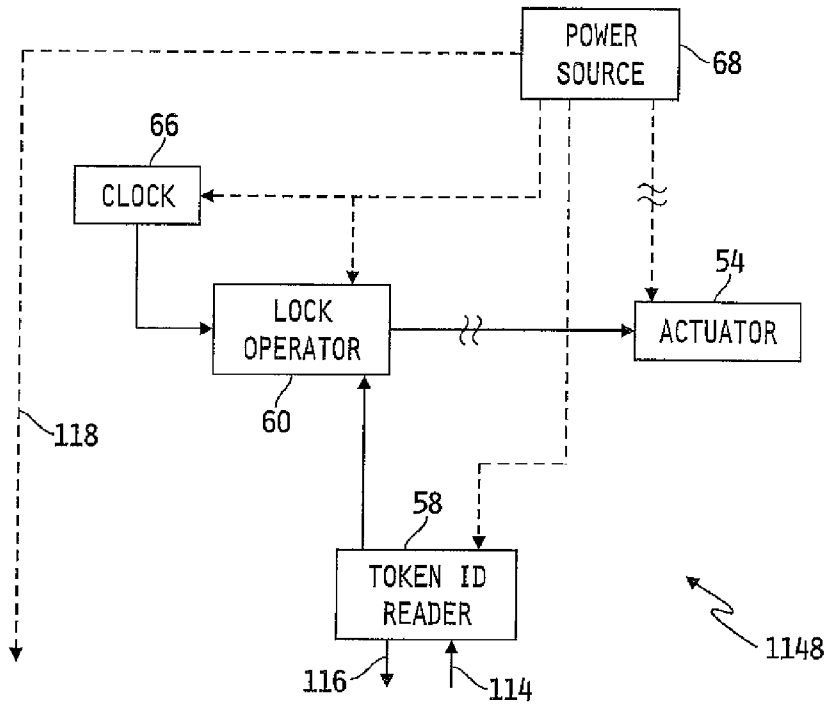
Figure 44:
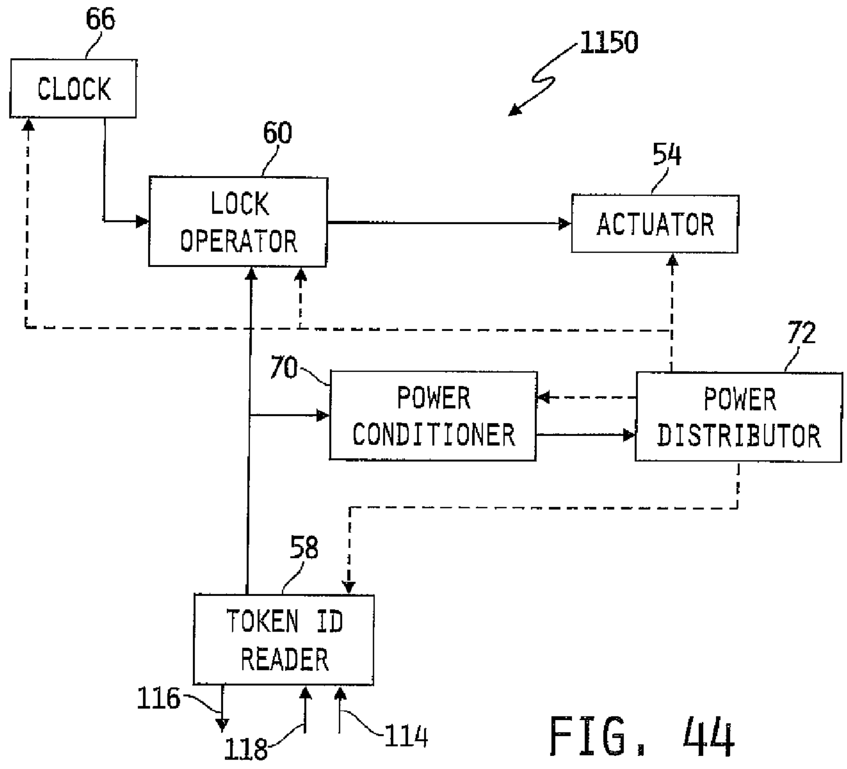

Lock core circuit 1134 shown in FIG. 36 is identical to lock core circuit 1132 except that lock core circuit 1134 does not include a power source 68 and thus receives all required power from power input 118.

Lock core circuits 1136, 1138, 1140, 1142, 1144, 1146, 1148, and 1150 shown in FIGS. 37-44 do not include a recombination system 62 and thus lock operator 60 of these lock core circuits 1136, 1138, 1140, 1142, 1144, 1146, 1148, and 1150 cannot be changed. These lock core circuits 1136, 1138, 1140, 1142, 1144, 1146, 1148, and 1150 are used with tokens 10 having token circuits 48 that include information about which lock cores 12 the tokens 10 are granted access to use. Thus, the token circuits 48 are "recombinated" instead of the lock core circuits 1136, 1138, 1140, 1142, 1144, 1146, 1148, and 1150. The differences between lock core circuits 1136, 1318, 1140, 1142, 1144, 1146, 1148, and 1150 are similar to the differences between lock core circuits 1120, 1122, 1124, 1126, 1128, 1130, 1132, and 1134 shown in FIGS. 29-36. Those differences are basically whether the lock core circuit includes a token access history 64, clock 66, power source 68, or power conditioner and distributor 70, 72.

Figure 45:
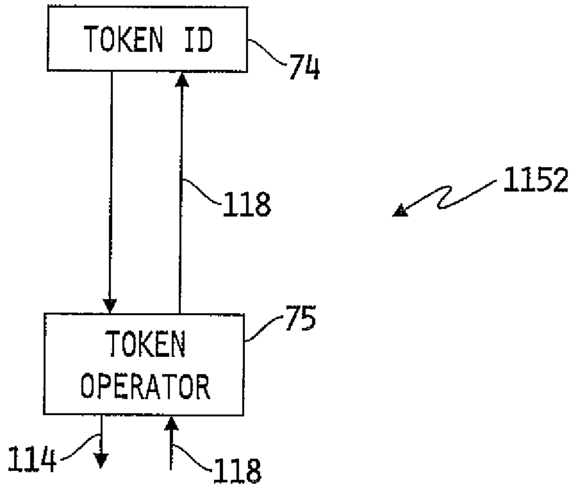
FIGS. 45-50 are flow charts showing the functional operation of several embodiments of the electronic portion of the token shown in FIGS. 2-4.

Various token circuits 1152, 1154, 1156, 1158, 1160, 1162 having various combinations of token access history 78, clock 80, and power source 82 are shown in FIGS. 45-50. Token circuit 1152 is the simplest token circuit and includes only token identification information 74 and token operator 75 as shown in FIG. 45. All power required to operate token circuit 1152 is received from a power source 68 in a lock core circuit 52 through power input 118. The only output of token operator 75 is token identification information 114 that is used by lock operator 60 of lock core circuits 52.

Figure 46:
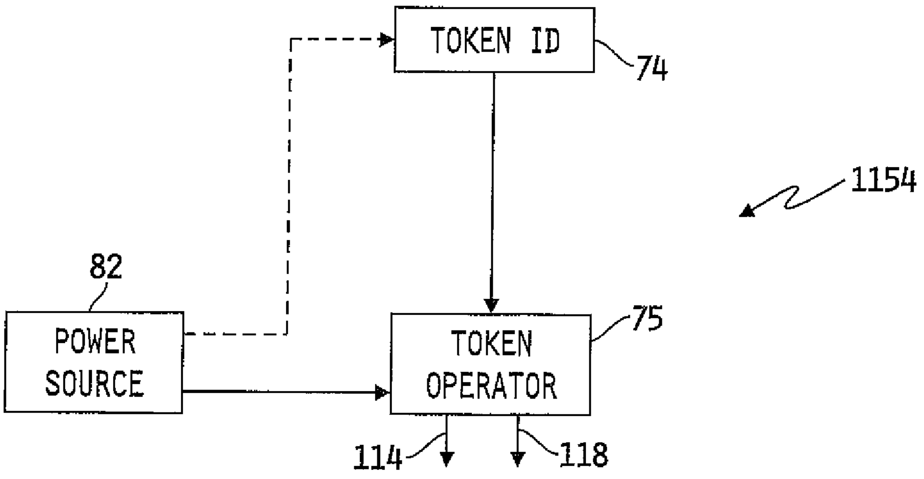

Token circuit 1154 is identical to token circuit 1152 except that token circuit 1514 includes a power source 82 as shown in FIG. 46. Thus, instead of receiving power, token circuit 1154 outputs power 118 to be used by a lock core circuit 52.

Figure 47:
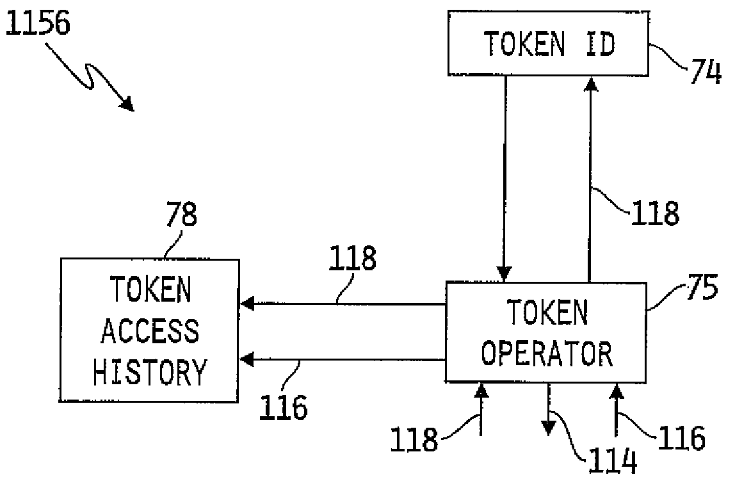

Token circuit 1156 is shown in FIG. 47 and is identical to token circuit 1152 except that token circuit 1156 includes token access history 78. Token circuit 1156 receives token access history information 116 from lock core circuits 52 and stores that information in token access history 78.

Figure 48:
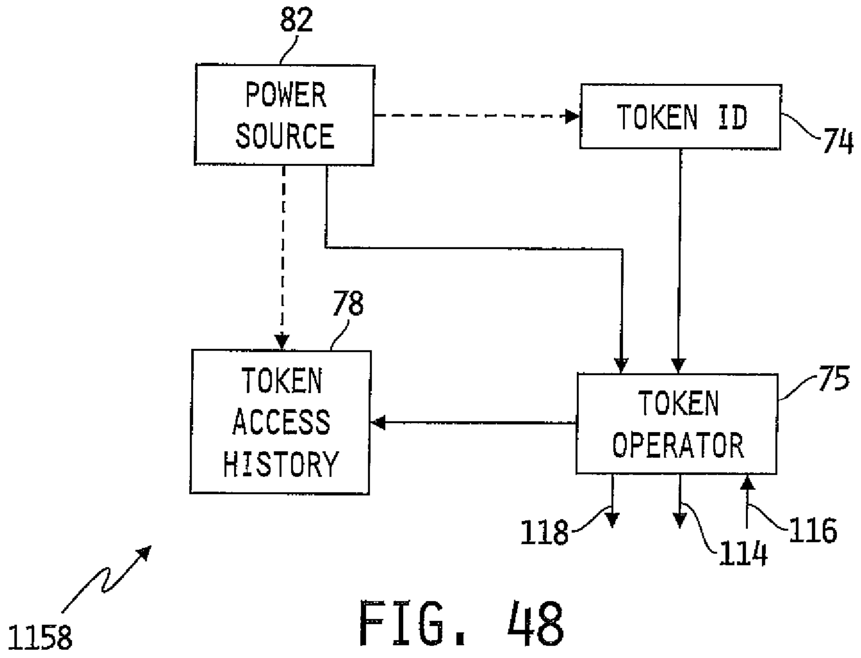
Figure 49:
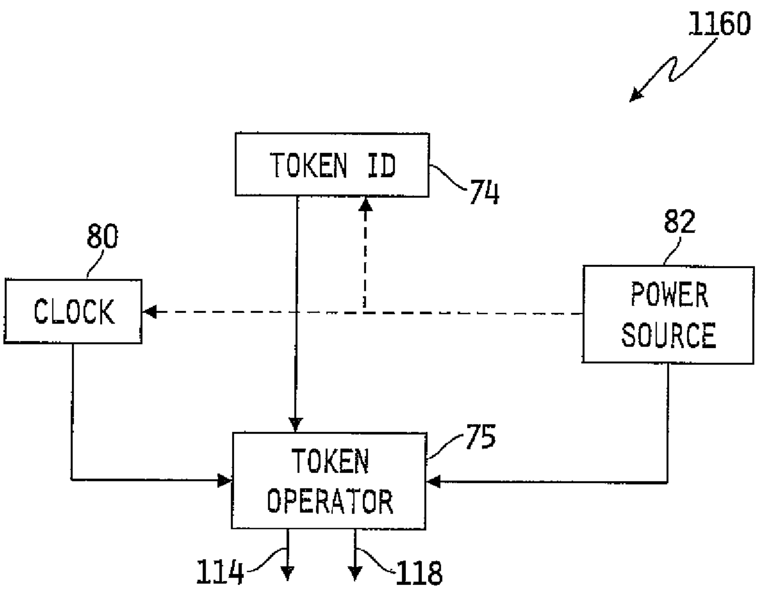

Token circuit 1158 is identical to token circuit 1156 except that token circuit 1158 includes a power source 82 as shown in FIG. 48. Token circuit 1160 is identical to token circuit 1152 except that token circuit 1158 includes a clock 80 and a power source 82 as shown in FIG. 49. The power source 82 could be used solely to power clock 80, all components of token circuit 1160, or all components of token circuit 1160 and a lock core circuit 52 through power input 118. The clock 80 could be used to provide time information to a token access history 64 of a lock core circuit 52 or to provide time information to a lock operator 60 of a lock core circuit 52 to assist lock operator 60 in determining if a token 10 should be granted access.

Figure 50:
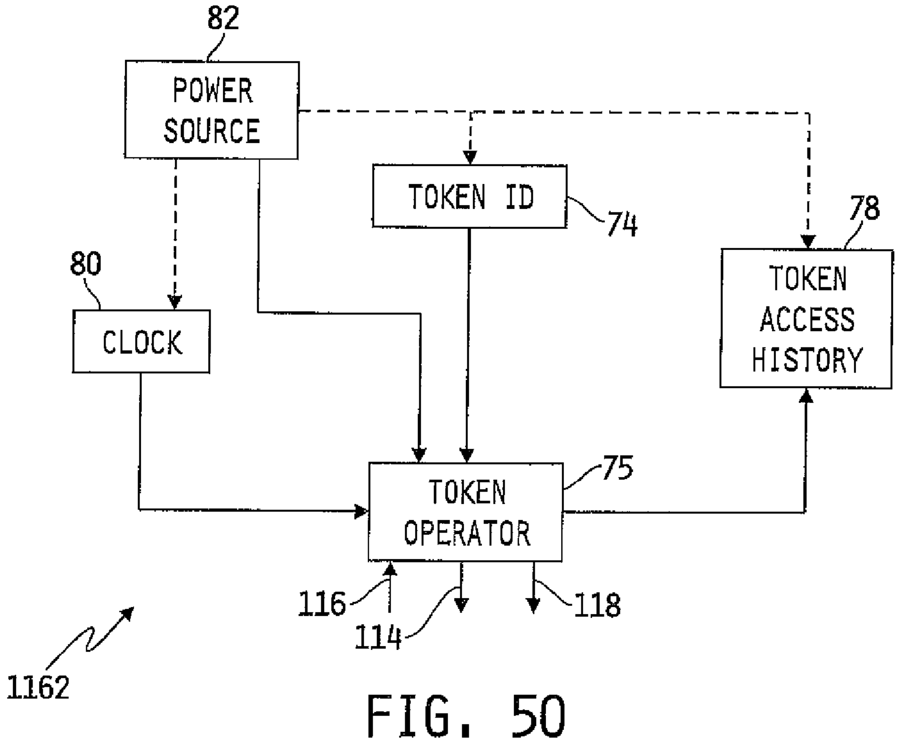

Token circuit 1162 is identical to token circuit 1160 except that token circuit 1162 includes token access history 78 as shown in FIG. 50. All of the tokens circuits 1152, 1154, 1156, 1158, 1160, 1162 can be used with lock core circuits 1120, 1122, 1124, 1126, 1128, 1130, 1132, 1134, 1136, 1138, 1140, 1142, 1144, 1146, 1148, 1150 except that one of the circuits must include a power source 68, 82 providing power to all power-consuming components. While some combinations of the circuits may provide redundant functions such as clock 66, 80 and token access history 64, 78, these redundant functions can be used to verify operations.

Figure 51:
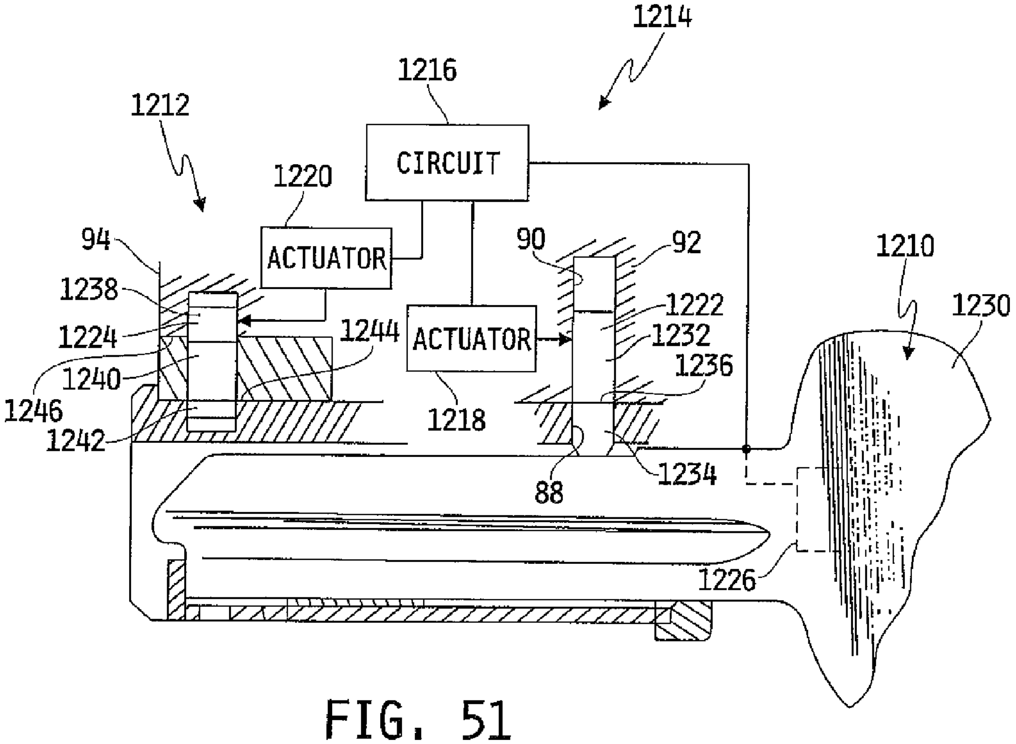
FIG. 51 is a sectional view similar to FIG. 2 of another preferred embodiment of a lock core and token positioned to lie in the lock core showing the lock core including an electrical portion, the token including an electrical portion, and the token being an "operating token" which interacts with the electrical portion of the lock core to permit rotation of a first portion of the lock core.
Figure 52:
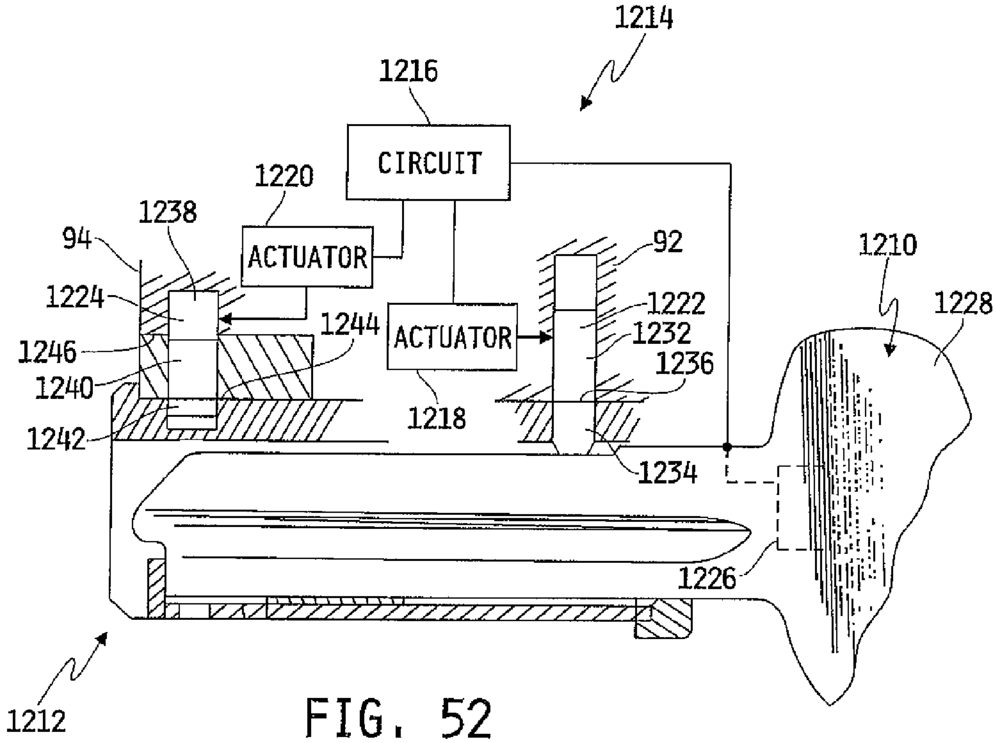
FIG. 52 is a sectional view similar to FIG. 51 showing the lock core of FIG. 51 and a "control" token positioned to lie in the lock core, the "control" token includes an electrical portion which interacts with the electrical portion of the lock core to permit rotation of a second portion of the lock core.

Another preferred embodiment of a lock core 1212 and token 1210 is shown in FIGS. 51 and 52. Lock core 1212 does not include a mechanical portion and thus token 1210 does not need to include a mechanical portion except to the extent that token 1210 must be able to rotate key plug 30. Instead, lock core 1212 includes an electrical portion 1214 having an electrical circuit 1216, first and second actuators 1218, 1220, and first and second mechanical linkages 1222, 1224. Actuators 1218, 1220 may be the same type of actuators as described above for actuator 54. In addition, mechanical linkages 1222, 1224 may be the same type of linkages described above for linkage 57. Each of actuators 1218, 1220 interact with mechanical linkages 1222, 1224 in the same manner as actuator 54 and mechanical linkage 57.

Token 1210 includes an electrical portion 1226 that interacts with electrical portion 1214 of lock core 1212 to permit rotation of key plug 30 alone or key plug 30, control sleeve 32, and control lug 34 together. Because lock core 1212 does not include a mechanical portion, electrical portion 1214 of lock core 1212 must determine if token 1210 presented to lock core 1212 should be granted access and determine if the token 1210 presented is a control token 1228 or an operating token 1230.

Before token 1210 is presented to lock core 1212, first mechanical linkage 1222 couples key plug 30 to core body 28 and second mechanical linkage 224 couples key plug 30 and control sleeve 32 to core body 28. When token 1210 is inserted into keyway 37 of lock core 1212, token 1210 engages first mechanical linkage 1222 to transfer energy from the movement of token 1210 to mechanical linkage 1222 in the same manner that token 10 transferred energy to mechanical linkage 57 as discussed above. While token 1210 engages first mechanical linkage 1222, token 210 does not engage second mechanical linkage 1224. In alternative embodiments, second mechanical linkage could also engage the token or first mechanical linkage could be similar to second mechanical linkage and not engage the token.

First mechanical linkage 1222 is the same as mechanical linkage 57 and includes first and second portions 1232, 1234 that have abutting faces positioned relative to an interface 1236 between key plug 30 and core body 28 as shown in FIG. 51. Second mechanical linkage 1224 includes three portions 1238, 1240, 1242 having abutting faces positioned relative to an interface 1244 between key plug 30 and control sleeve 32 and an interface 1246 between control sleeve 32 and core body 28. Before electrical circuit 1216 causes first actuator 1218 to move first linkage 1222, the portions 1232, 1234 of linkage 1222 are positioned so that core body 28 and key plug 30 are coupled together. Before electrical circuit 1216 causes second actuator 1220 to move second linkage 1224, the portions 1238, 1240, 1242 of mechanical linkage 1224 are positioned so that portions 1238, 1240, 1242 couple control sleeve 32 and key plug 30 to core body 28.

When a proper operating token 1230 is presented to lock core 1212, electrical portion 1214 of lock core 1212 causes both actuators 1218, 1220 to operate to move first and second linkages 1222, 1224 to a position so that control sleeve 32 and control lug 34 are coupled to core body 28 through second linkage 1224 and key plug 30 is permitted to rotate relative to core body 28 and control sleeve 32 as shown in FIG. 51. More specifically, first actuator 1218 moves first linkage 1222 in a position so that neither of portions 1232, 1234 couple key plug 30 to core body 28. Second linkage 1224 is moved to 1) position portion 1238 of second linkage 1224 in a manner to couple control sleeve 32 and core body 28 and 2) position the abutting faces of portions 1240 and 1242 at interface 1244 between key plug 30 and control sleeve 32 so that key plug 30 is rotatable relative to core body 28 and control sleeve 32. This positioning of first and second linkages 1222, 1224 permits key plug 30 to rotate relative to core body 28 and control sleeve 32.

When a proper control token 1228 is presented to lock core 1212, electrical portion 1214 of lock core 1212 causes both actuators 1218, 1220 to move mechanical linkages 1222, 1224 to a position to permit key plug 30 and control lug 34 to rotate together as shown in FIG. 52. First linkage 1222 is moved to the same position as when proper operating token 1230 is inserted permitting key plug 30 to rotate relative to core body 28. Second actuator 1220 moves second linkage 1224 to position portions 1238, 1240, 1242 so that 1) abutting faces between portions 1238 and 1240 are at interface 1246 between control sleeve 32 and core body 28 and control sleeve 32 is rotatable relative to core body 28 and 2) portion 1242 couples control sleeve 32 and key plug 30 together. This positioning of second linkage 1224 permits key plug 30 and control sleeve 32 to be rotated relative to core body 28.

The description of portions 1232, 1234 of first mechanical linkage 1222 and portions 1238, 1240, 1242 of second mechanical linkage 1224 are for illustrative purposes only to illustrate how linkages 1222, 1224 are moved to couple and uncouple key plug 30, control sleeve 32, and core body 28.

Various electrical lock core circuits 1250, 1252, 1254, 1256, 1258, 1260, 1262, 1264, 1266, 1268, 1270, 1272, 1274, 1276, 1278, and 1280 that can be used in lock core 1212 are shown in FIGS. 53-68. Lock core circuits 1250, 1252, 1254, 1256, 1258, 1260, 1262, 1264, 1266, 1268, 1270, 1272, 1274, 1276, 1278, and 1280 are identical to lock core circuits lock core circuits 1120, 1122, 1124, 1126, 1128, 1130, 1132, 1134, 1136, 1138, 1140, 1142, 1144, 1146, 1148, and 1150, respectively, of lock core 12 except that lock operator 60 communicates with two separate actuators 1218, 1220 in lock core circuits 1250, 1252, 1254, 1256, 1258, 1260, 1262, 1264, 1266, 1268, 1270, 1272, 1274, 1276, 1278, and 1280 and a single actuator 54 in lock core circuits 1120, 1122, 1124, 1126, 1128, 1130, 1132, 1134, 1136, 1138, 1140, 1142, 1144, 1146, 1148, and 1150. The electrical token lock core circuits 1152, 1154, 1156, 1158, 1160, and 1162 that can be used in token 1210 are shown in FIGS. 45-50.

Figure 69:
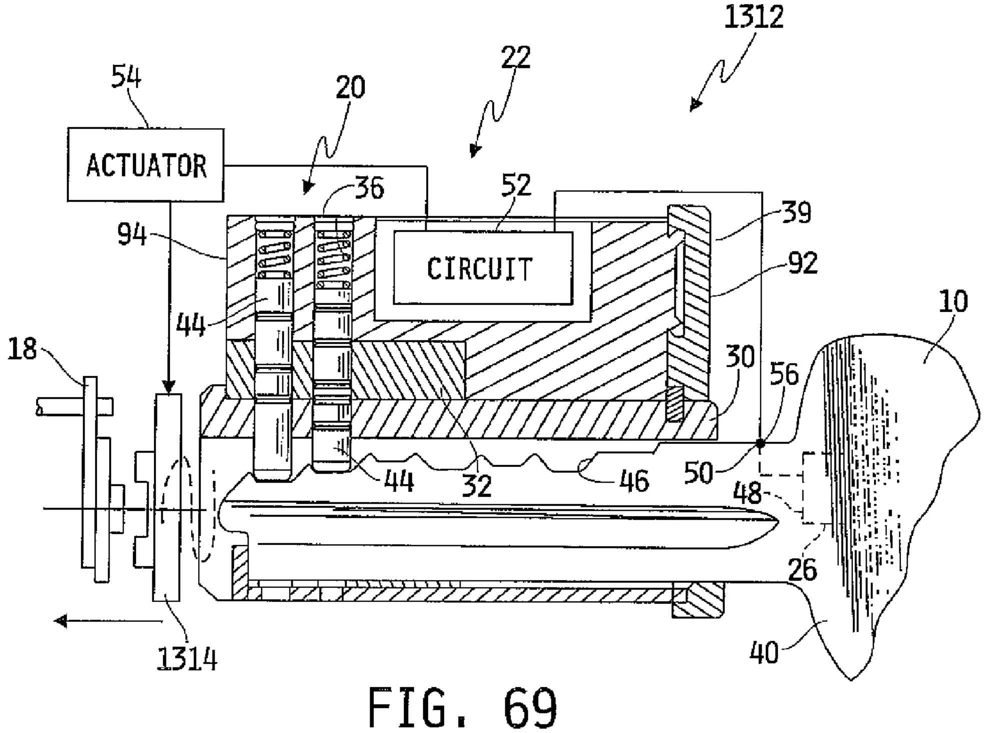
FIG. 69 is a sectional view similar to FIGS. 2 and 51 of yet another alternative embodiment of a lock core showing the lock core having an electrical portion and a mechanical portion.

Another preferred embodiment of a lock core 1312 is shown in FIG. 69. Lock core 1312 is identical to lock core 12 except that actuator 54 communicates with a clutch 1314 positioned to lie between lock core 1312 and throw member 18 instead of mechanical linkage 57. All other components of lock core 1312 are identical to lock core 12 and are numbered similarly.

The mechanical linkage 57 of lock core 12 and mechanical linkages 1222, 1224 of lock core 1212 can be referred to as brakes. The clutch 1314 and brakes 57, 1222, 1224 operate to permit key plug 30 to rotate alone or together with control sleeve 32 and control lug 34 if a proper token 10 is presented to lock core 12, 1312. However, clutch 1314 and brakes 57, 1222, 1224 permit the rotation in different manners. As discussed above in reference to actuator 54, brakes 57, 1222, 1224 do not permit key plug 30 or control lug 34 to rotate until circuit 52, 1216 permits actuator 54 to operate to move brakes 57, 1222, 1224. Clutch 1314 always permits token 10 to rotate key plug 30, but key plug 30 does not rotate throw member 18 until electrical circuit 52 permits clutch 1314 to operate. Using brakes 57, 1222, 1224 may permit a vandal to “overtorque” brakes 57, 1222, 1224 by shearing the mechanism coupling key plug 30 and core body 28. Once the mechanism is sheared, the vandal may be able to rotate the key plug 30, throw member 18, and control lug 34 and achieve unauthorized access. To prevent a vandal from achieving unauthorized access, the token could be designed to break before the actuator brake 57, 1222, 1224 is overtorqued.

Figure 70:
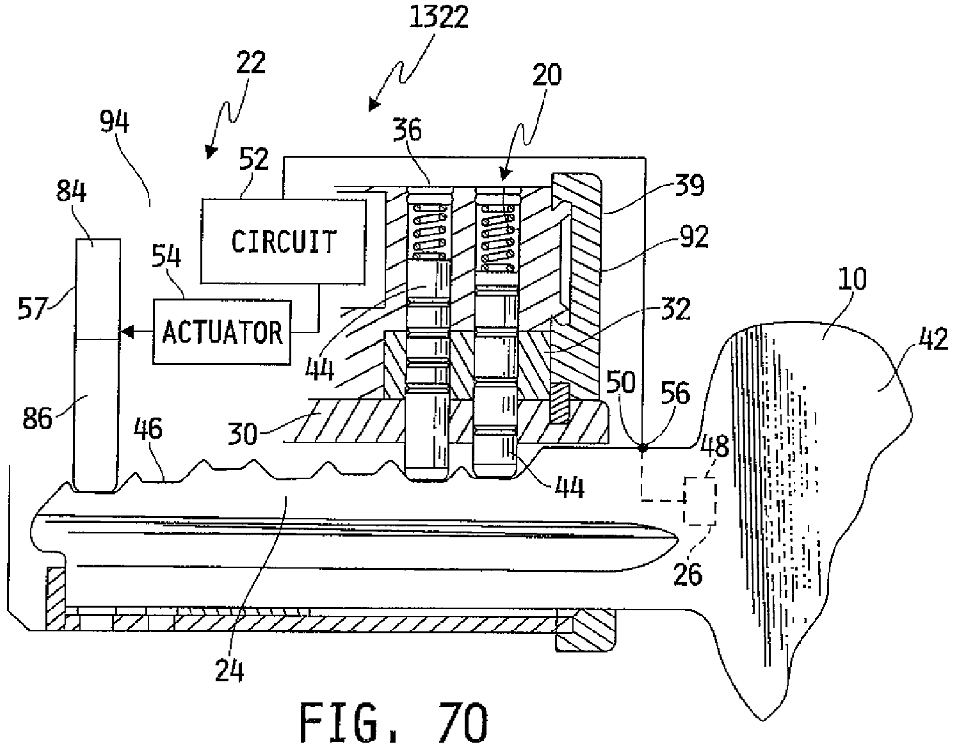
FIG. 70 is a sectional view similar to FIGS. 2, 51, and 69 of yet another alternative embodiment of a lock core showing the lock core having an electrical portion and a mechanical portion.

Another preferred embodiment of a lock core 1322 is shown in FIG. 70. Lock cores 12, 1212, 1312, and 1322 include a front side 92 and a back side 94. Lock core 1322 is identical to lock core 12 except that mechanical portion 20 of lock core 1322 is positioned to lie near front side 92 of lock core 1322 and electrical portion 22 of lock core 1322 is positioned to lie near back side 94 of lock core 1322 Basically, lock core 1322 and lock core 12 are identical except that the positions of mechanical and electrical portions 20, 22 within the lock cores are reversed. Because mechanical portion 20 moved near front side 92 of lock core 1322, control sleeve 32 is positioned to lie near the front side 92 of lock core. 1322 as opposed to near the back side 94 of lock core 12. Thus, lock core 1322 will include a control lug (not shown) coupled to control sleeve 32 that is positioned near the front side 92 of lock core 1322 compared to control lug 34 of lock core 12 that is positioned to lie near the back side 94 of lock core 12.

Because the position of the control lug of lock core 1322 is near front side 92 of lock core 1322, lock core 1322 is not interchangeable with conventional lock cores. As discussed above, lock cylinders 14 that receive the conventional lock cores include a recess 38 that receives control lug 34. This recess 38 is positioned to receive a control lug 34 that is located near back side 94 of a lock core such as in lock core 12 as shown in FIG. 1. Thus, if lock core 1322 is used, the lock cylinder that receives lock core 1322 must include a recess positioned to receive a control lug located near front side 92 of the lock core 1322.

In alternative embodiments, the lock core does not need to include a control lug or be interchangeable. For example, Schlage® produces a Primus™ lock core and Corbin-Ruswin® produces a 2000 Series™ lock core that are not interchangeable. The present invention can be incorporated into such noninterchangeable lock cores.

Figure 71:
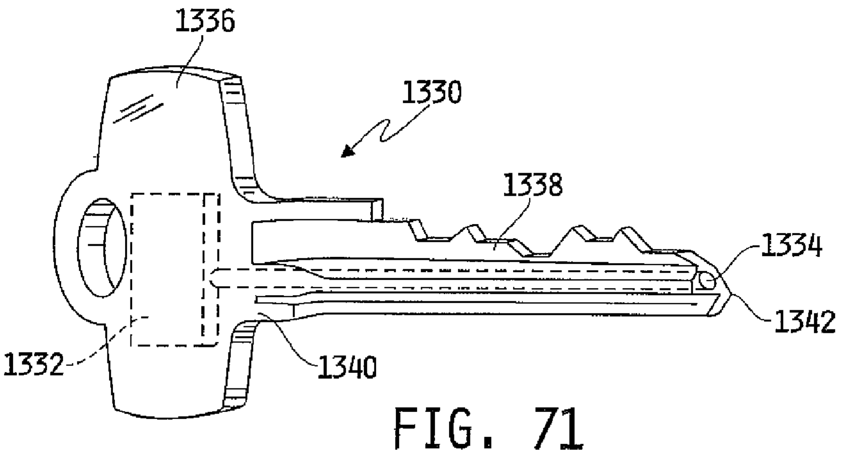
FIG. 71 is a perspective view of a token according to the present invention showing the token including a bow, a blade having a proximal end coupled to the bow and a distal end spaced apart from the bow, and an electrical portion (phantom lines) having an electrical contact positioned to lie at the distal end of the blade.

Tokens 10, 1210 can include many different types of electrical contacts 50 that communicate with electrical contacts 56 in lock cores 12, 1212, 1312, 1322. Several types of contacts and token are shown in FIGS. 71-76. A token 1330 having an electrical circuit 1332 and electrical contact 1334 is shown in FIG. 71. Token 1330 further includes a bow 1336 and a bitted blade 1338 having a proximal end 1340 coupled to bow 1336 and a distal end 1342 spaced apart from proximal end 1340. Electrical circuit 1332 is positioned to lie in bow 1336 and electrical contact 1334 is positioned to lie at distal end 1342 of bitted blade 1338.

Figure 72:
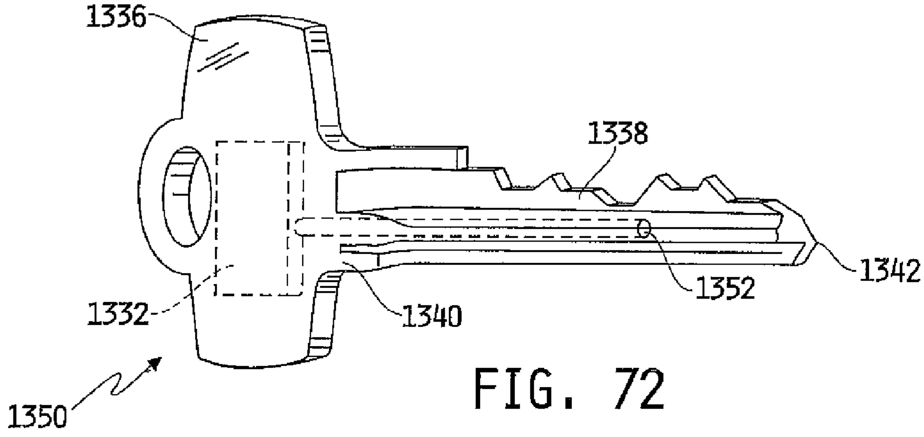
FIG. 72 is a perspective view of a token according to the present invention showing the token including an electrical portion (phantom lines) having an electrical contact positioned to lie on the blade between the proximal and distal ends of the blade.

Another embodiment of a token 1350 and electrical contact 1352 is shown in FIG. 72. All components of token 1350 except contact 1352 are identical to token 1330 and numbered similarly. Electrical contact 1352 is positioned to lie between the proximal and distal ends 1340, 1342 of bitted blade 1338 and extend through a side of bitted blade 1338.

Figure 73:
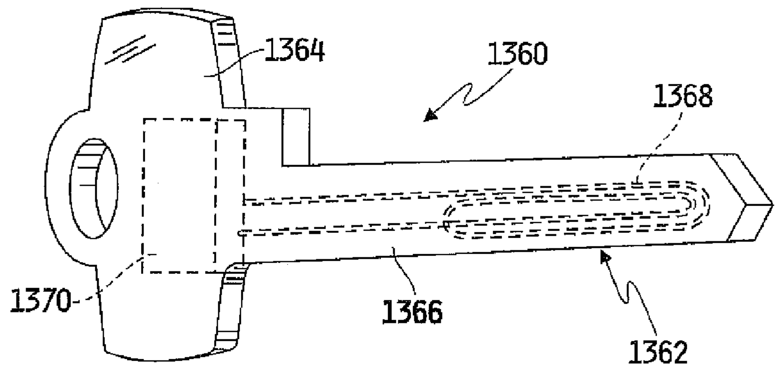
FIG. 73 is a perspective view of a token according to the present invention showing the token including an electrical portion (phantom lines) having an inductance coil positioned to lie in the blade.

A token 1360 having an electrical circuit 1370 and inductance type electrical contact 3162 is shown in FIG. 73. Token 1360 includes a bow 1364 and blade 1366 coupled to bow 1364. Inductance type electrical contact 1362 includes a coil 1368 that is positioned to lie within blade 1366 of token 1360. Token 1360 having inductance type electrical contact 1362 is used with a lock core 12, 1212, 1312, 1322 having an electrical contact 56 configured to communicate with such an inductance type electrical contact 1362.

In the tokens 1330, 1350, 1360 shown in FIGS. 71, 72, and 73, the electrical circuits 1332, 1370 are all positioned to lie in bow 1336, 1364 and electrical contacts 1334, 1352, 1362 are positioned to lie in blade 1338, 1366. In alternative embodiments, each of the electrical circuits and electrical contacts could be positioned to lie in either the blade, bow, or both. For example, both the electrical circuit and electrical contact could be positioned to lie in the bow as shown, for example, in U.S. Pat. No. 5,003,801 to Stinar which is incorporated herein by reference.

Figure 53:
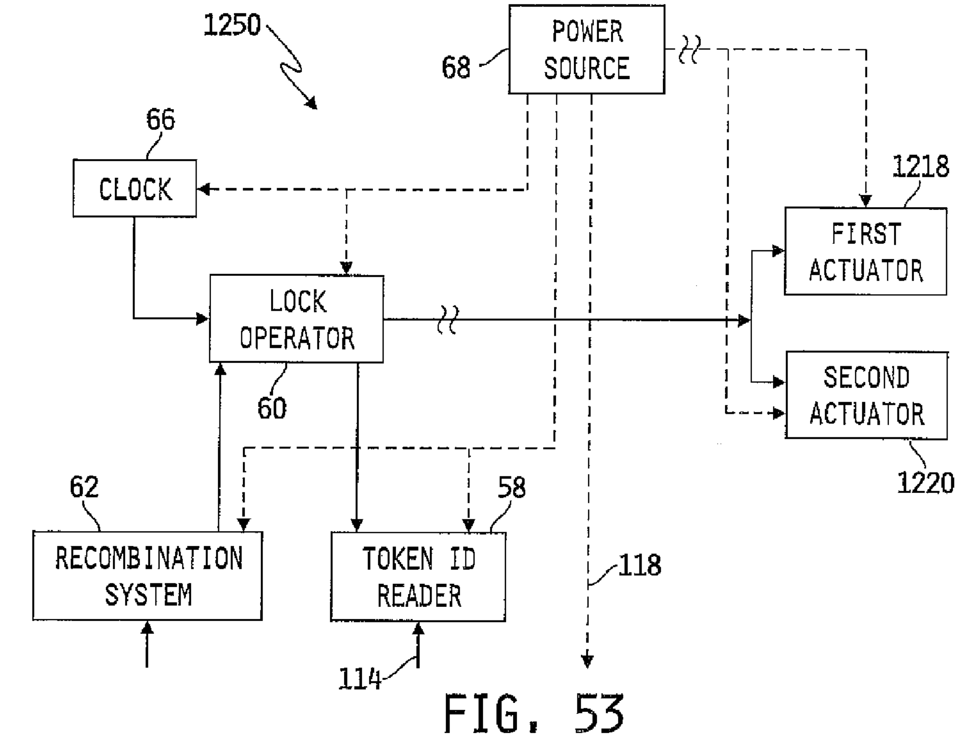
FIGS. 53-68 are flow charts showing the functional operation of the circuit of the electrical portion of the lock core shown in FIGS. 51 and 52.
Figure 54:
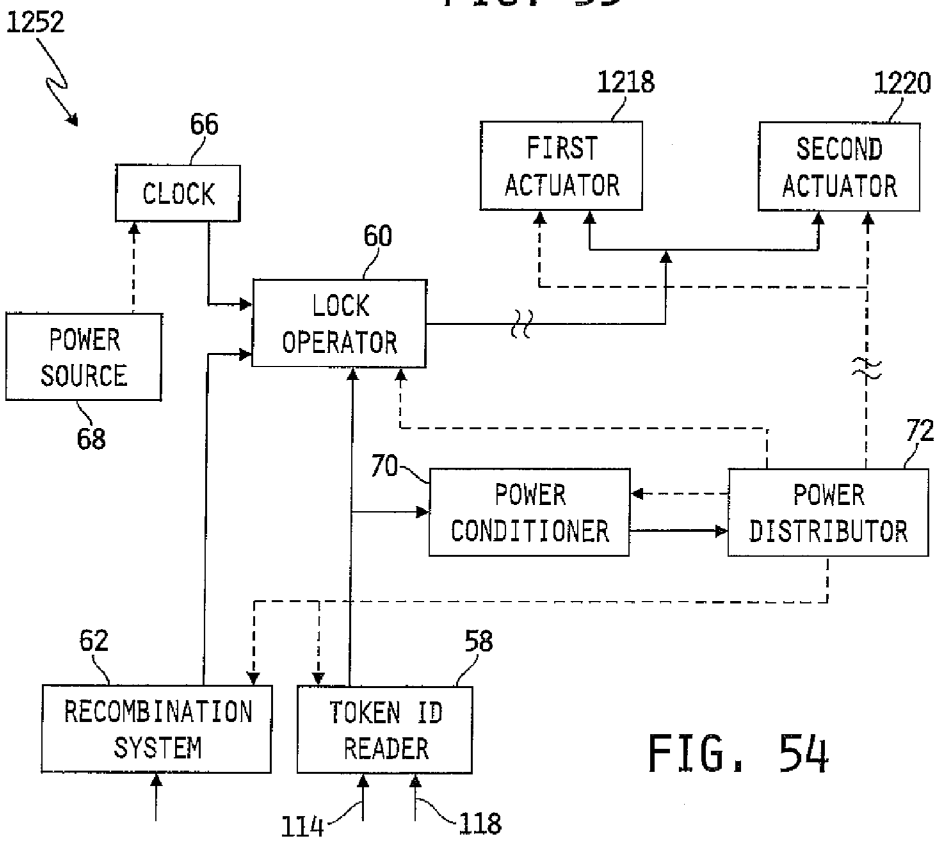
Figure 55:
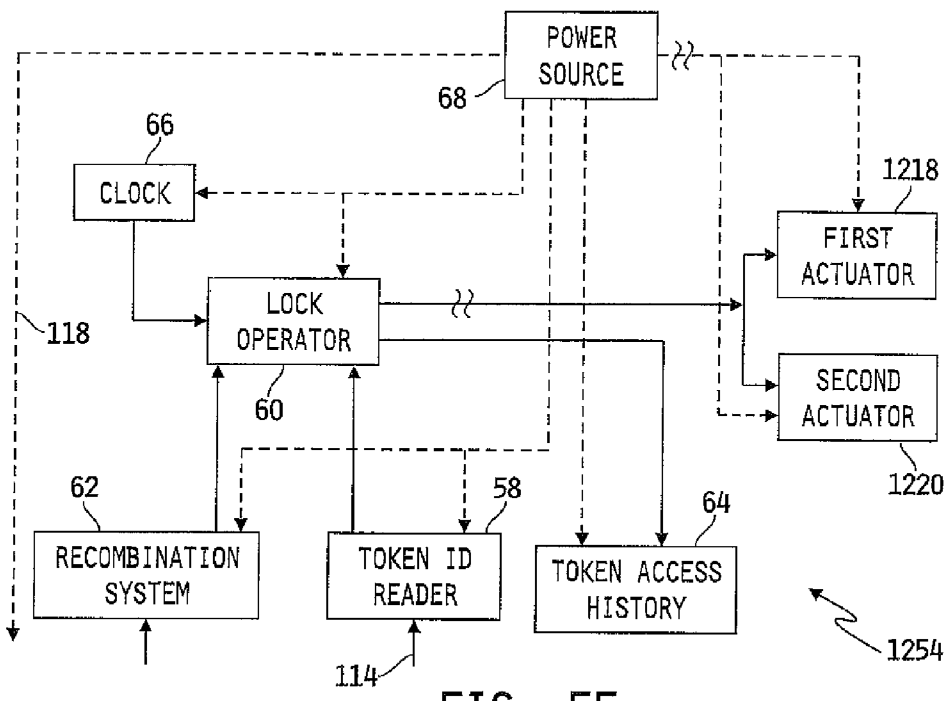
Figure 56:
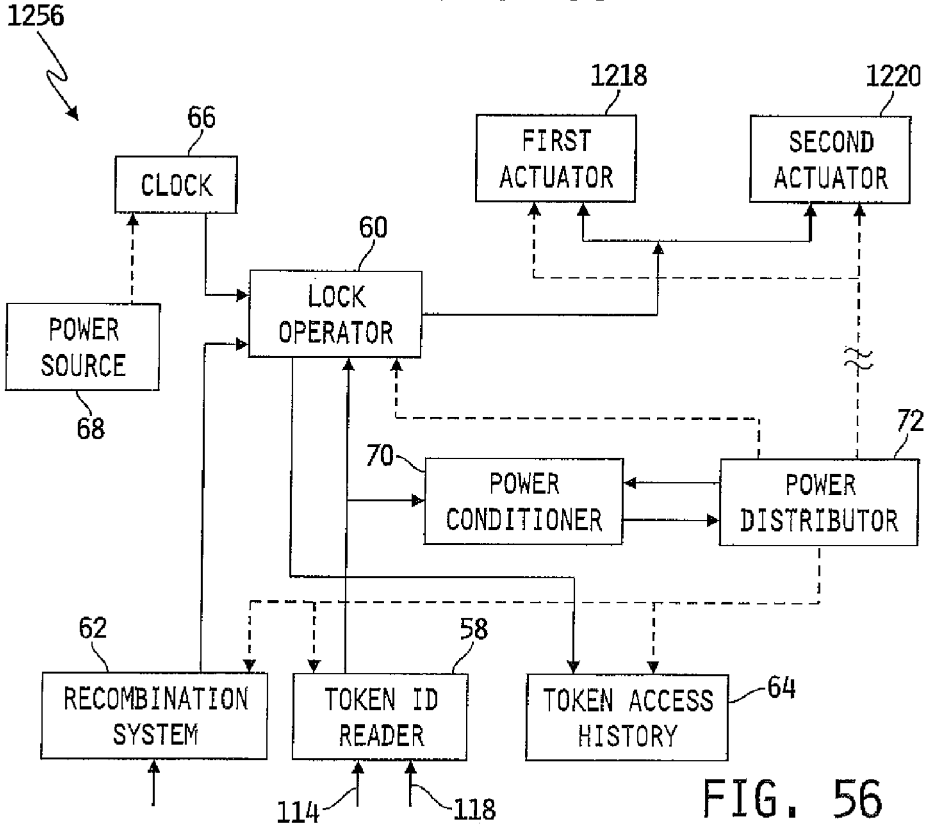
Figure 57:
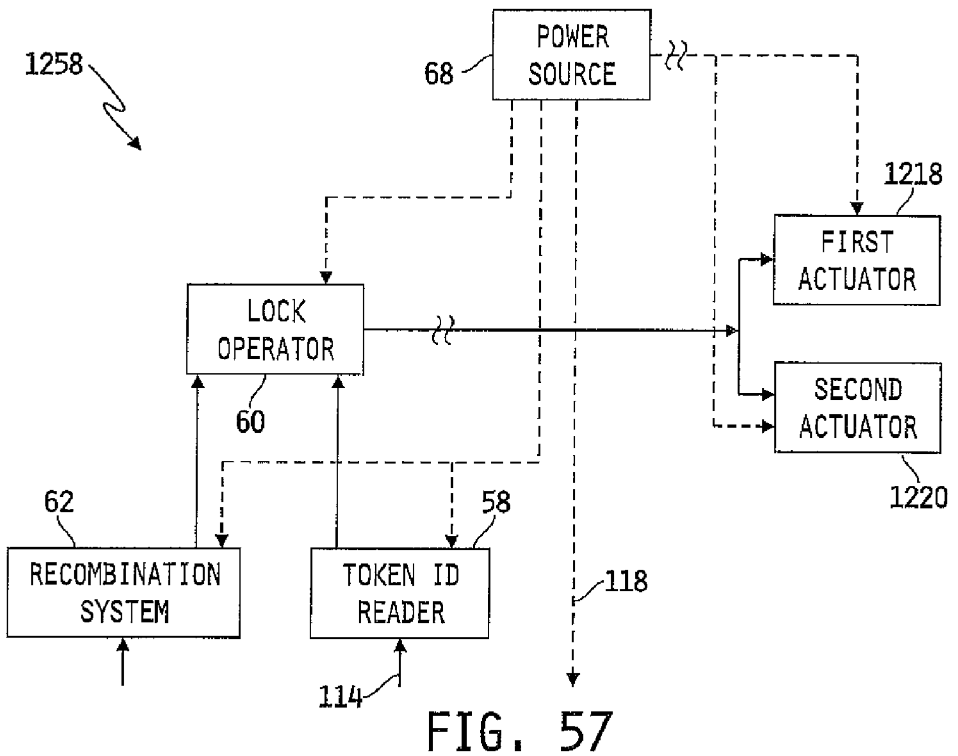
Figure 58:
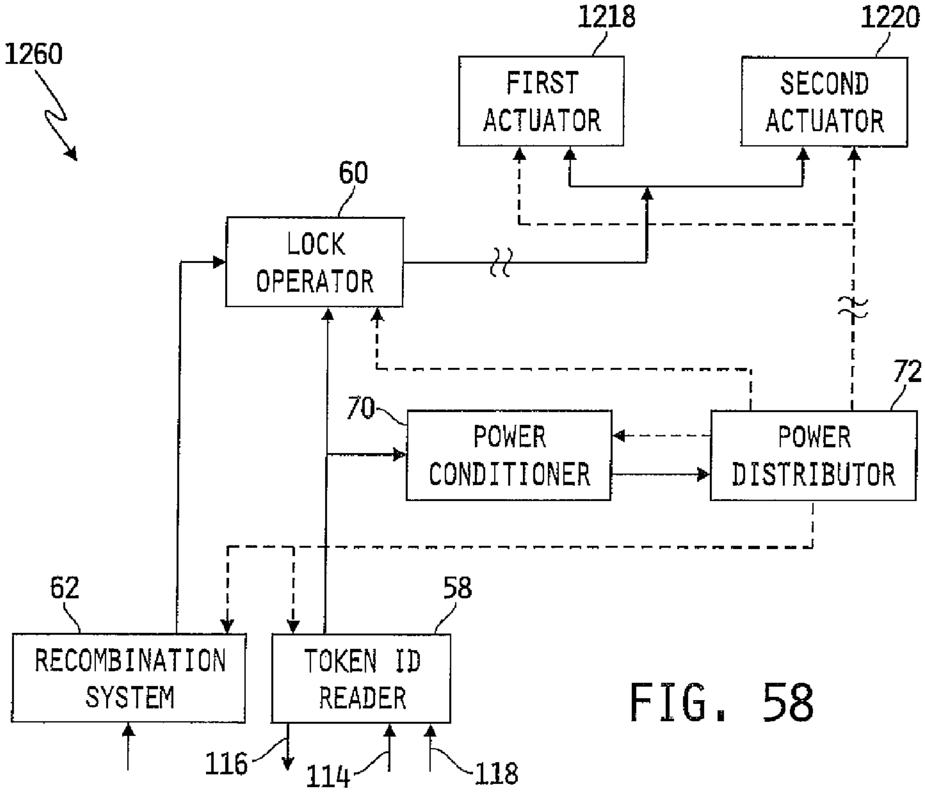
Figure 59:
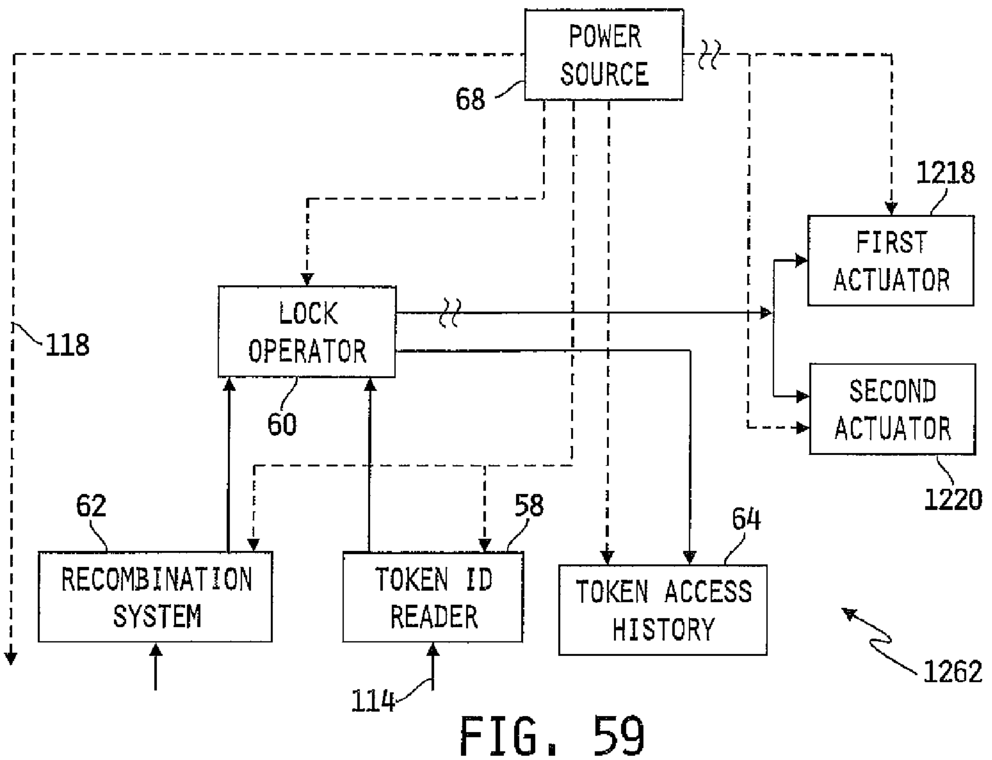
Figure 60:
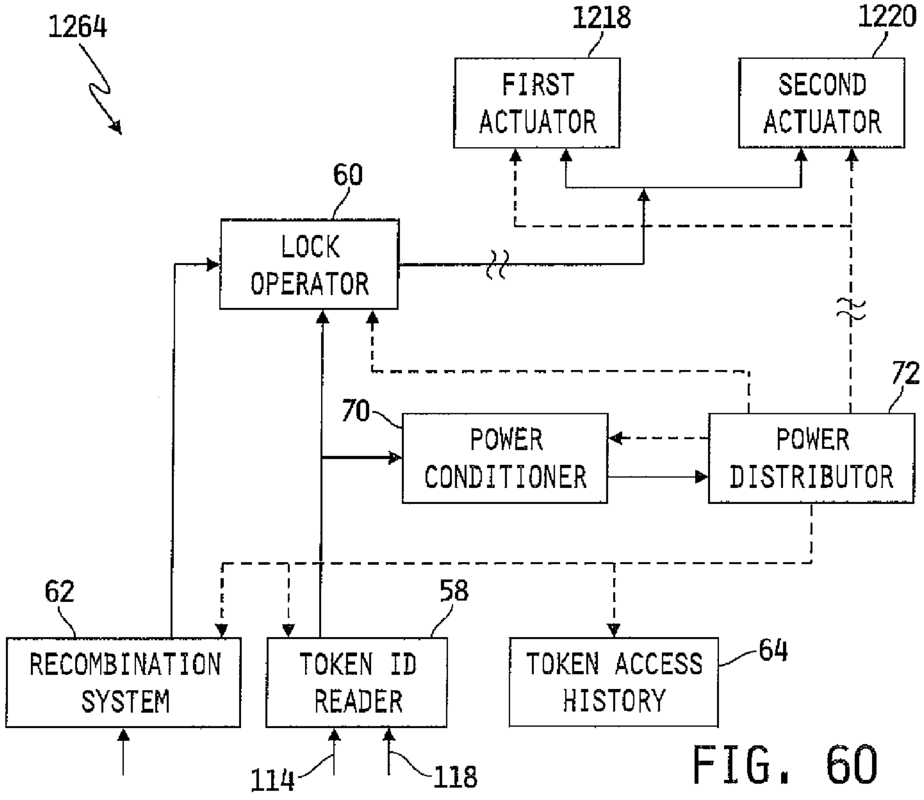
Figure 61:
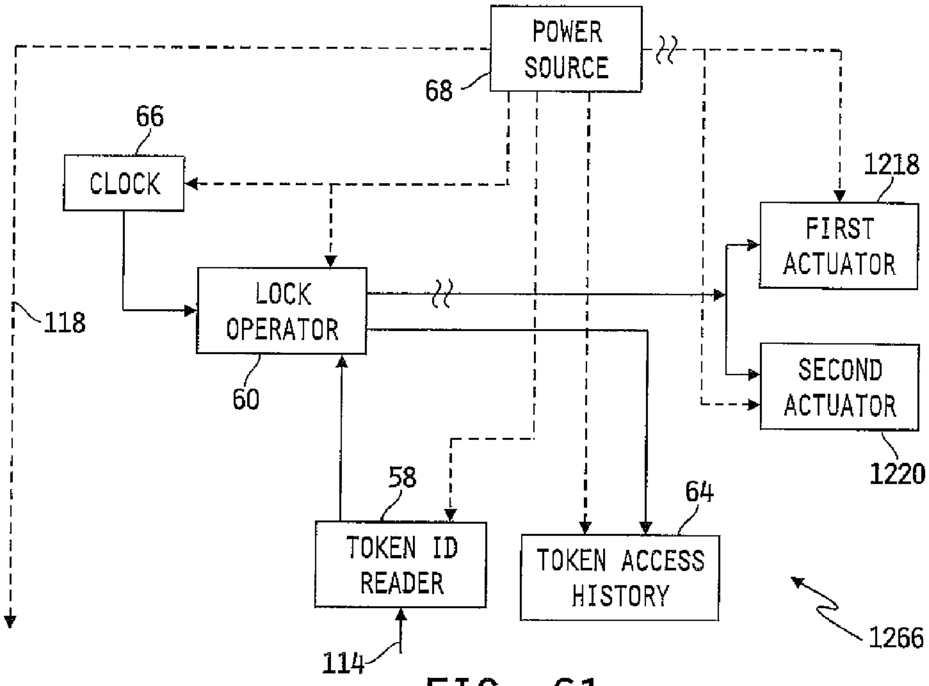
Figure 62:
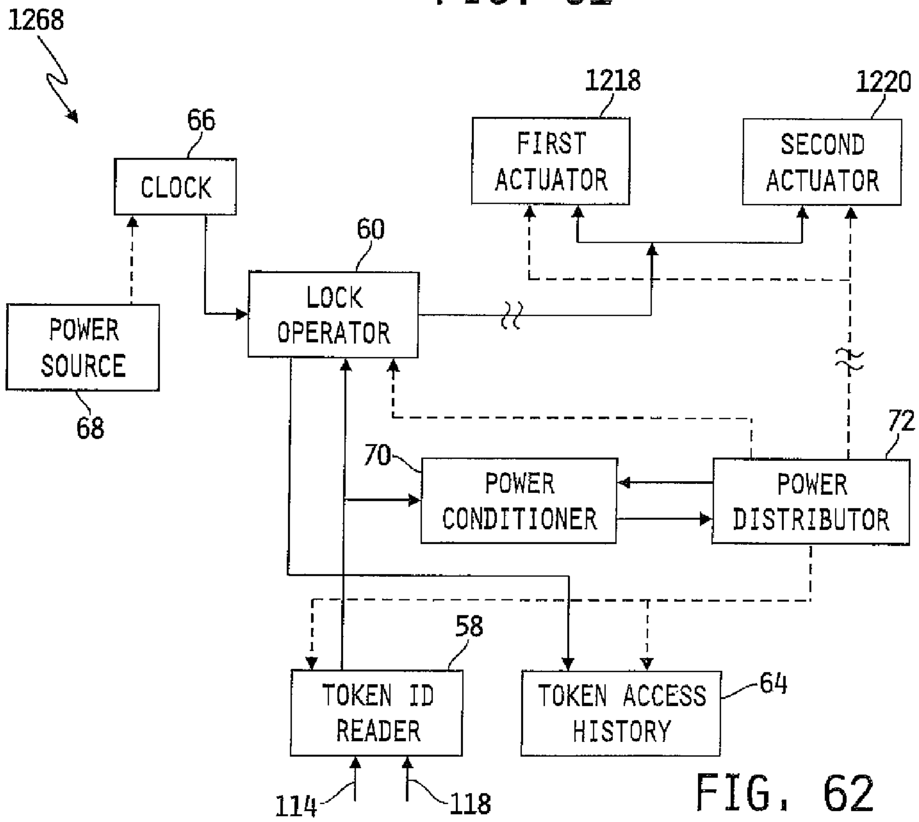
Figure 63:
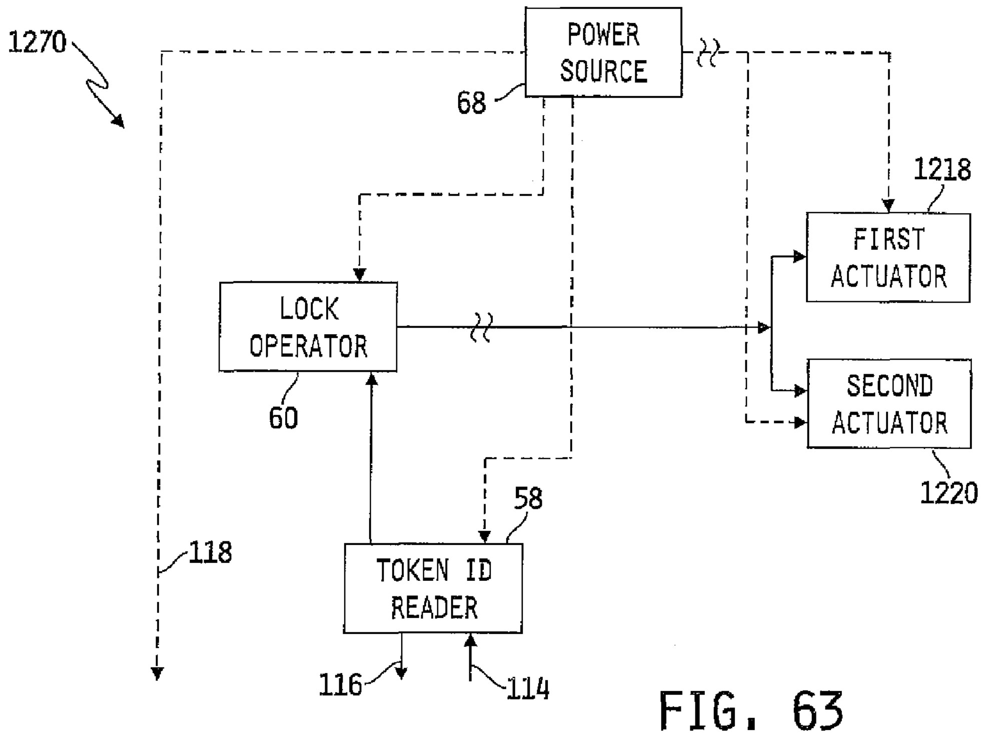
Figure 64:
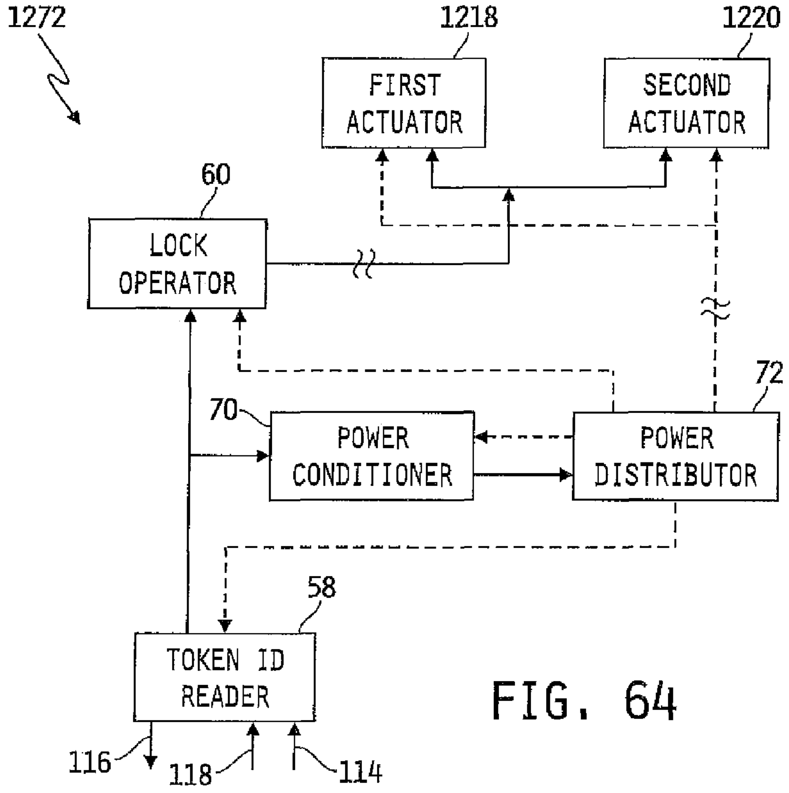
Figure 65:
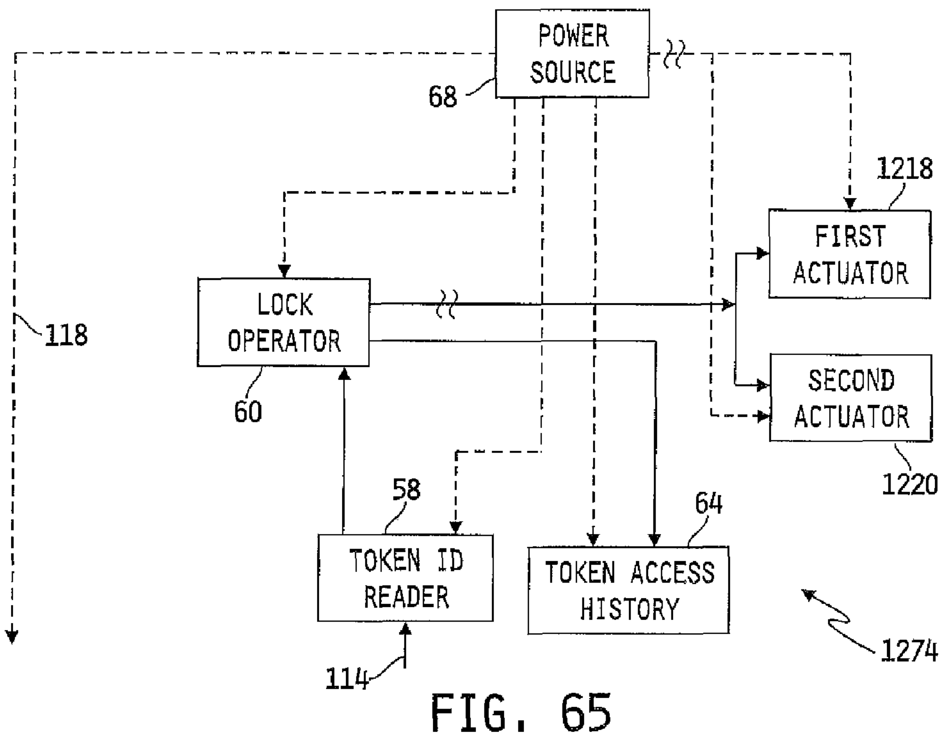
Figure 66:
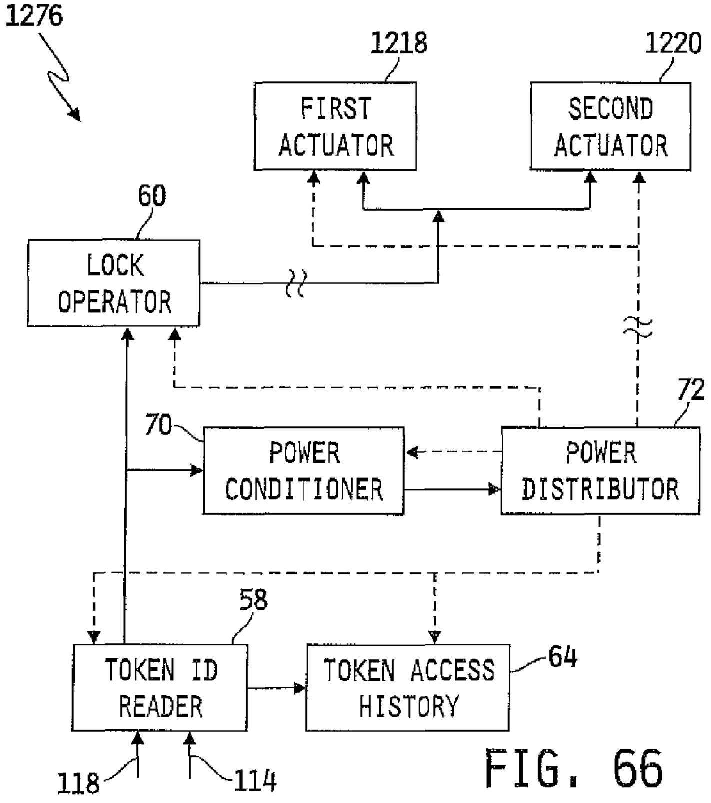
Figure 67:
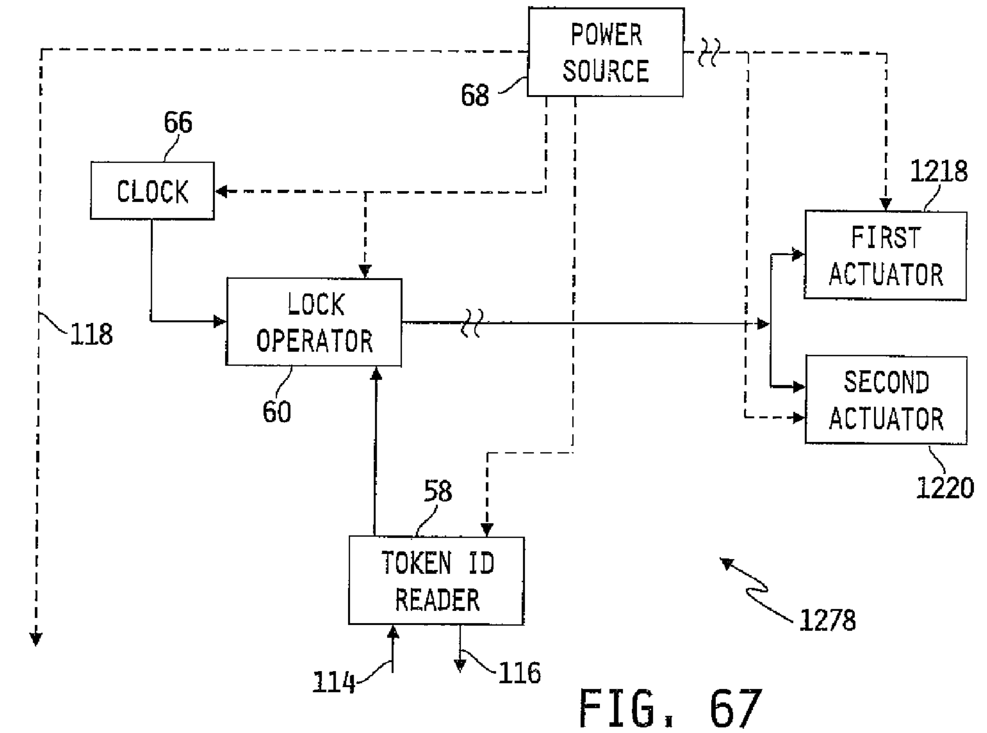
Figure 68:
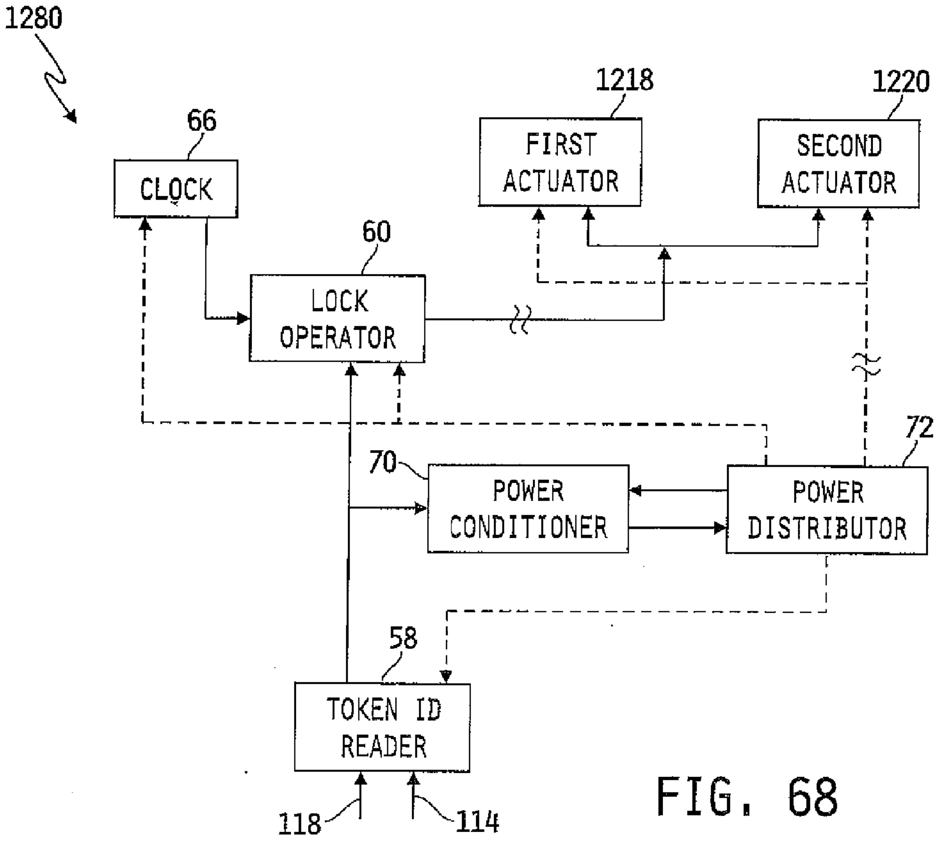

A token 1380 having a bow 1382, a bitted blade 1384 coupled to bow 1382, and a cylindrical blade 1386 appended to bow 1382 is shown in FIG. 53. Bitted blade 1384 can include an electrical contact (not shown) and be used in lock cores that include only a mechanical portion, only an electrical portion, or both mechanical and electrical portions. Cylindrical blade 1386 could be used in different types of lock cores that include only electrical portions. Cylindrical blade 1386 includes electrical contacts 1388 in the form of a plurality of strips 1390 on the outer surface of cylindrical blade 1386. The lock core that cylindrical blade 1386 communicates with may only include a single electrical contact strip and thus the plurality of strips 1390 on cylindrical blade 1386 permit cylindrical blade 3186 to be placed in the lock core in several different orientations and still communicate with the lock core.

Figure 74:
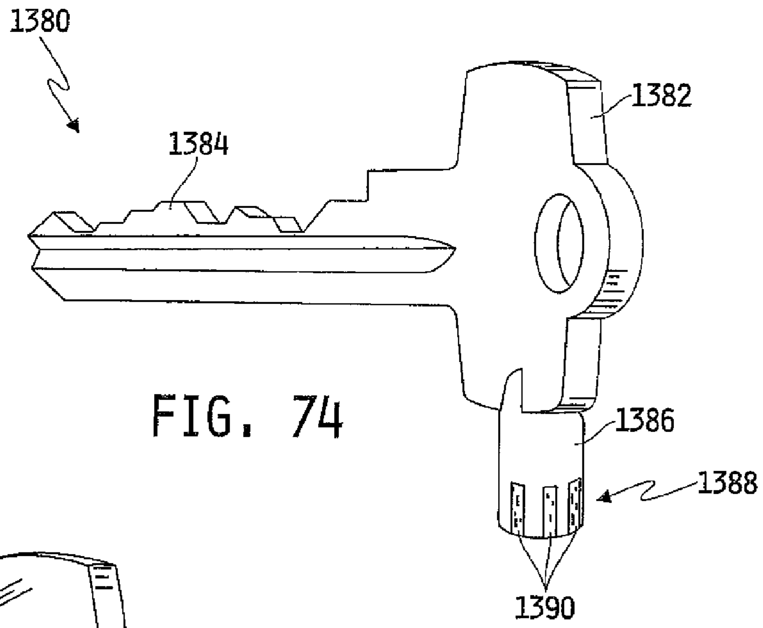
FIG. 74 is a perspective view of a token having a bow, a bitted blade coupled to the bow, and a cylindrical blade having electrical contacts coupled to the bow, the cylindrical blade extending substantially perpendicular to the bitted blade.

In the illustrated embodiment of FIG. 74, cylindrical blade 1386 extends substantially perpendicular relative to bitted blade 1384. In alternative embodiments, the cylindrical blade and bitted blade may be oriented at different angles relative to each other as long as both the cylindrical blade and bitted blade can be inserted into a lock core.

Figure 75:
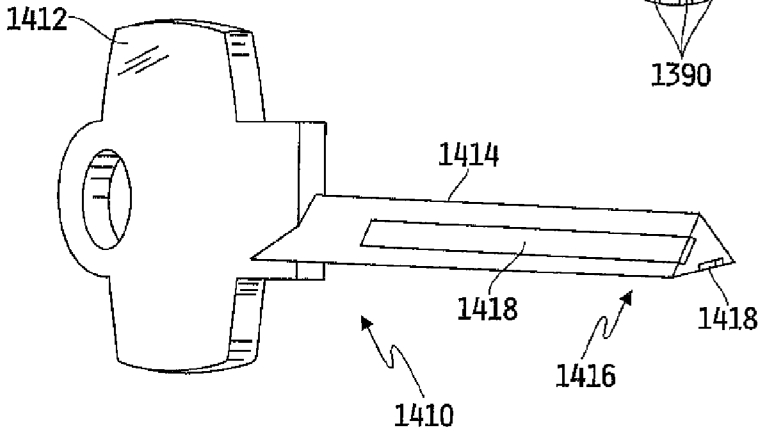
FIG. 75 is a perspective view of a token having a bow and a blade coupled to the bow, the blade having a triangular cross section to define three surfaces and electrical contacts on two of the surfaces.

Another preferred token 1410 is shown in FIG. 75. Token 1410 includes a bow 1412 and a triangular-shaped blade 1414 coupled to bow 1412. The token 1410 further includes electrical contacts 1416 in the form of elongated strips 1418 extending along two of the three sides of the triangular-shaped blade 1414.

Figure 76:
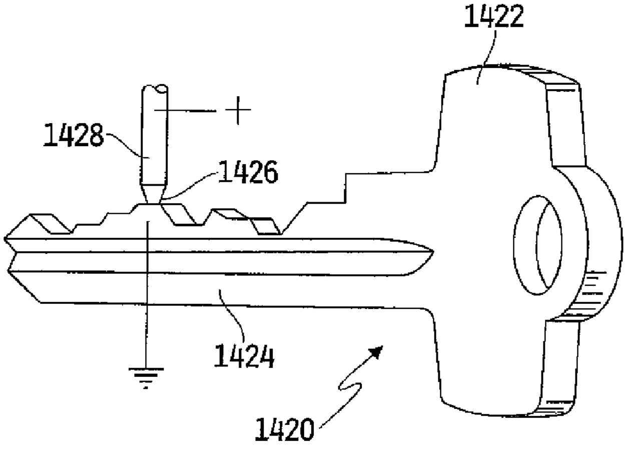
FIG. 76 is a perspective view of a key showing the key having a bitted blade and an electrical contact on the bitted blade.

Another preferred embodiment of a token 1420 is shown in FIG. 76. The token 1420 includes a bow 1422, a bitted blade 1424 coupled to the bow 1422, and an electrical contact 1426 positioned on bitted blade 1424. A portion of a lock core electrical contact 1428 that communicates with token electrical contact 1426 is also shown in FIG. 76.

The electrical contact 56 in lock core 12, 1212, 1312, 1322 that communicates with electrical contacts 1334, 1352, 1362, 1388, 1416, 1426 must be located within lock core 12, 1212, 1312, 1322 so that the electrical contacts 56, 1334, 1352, 1362, 1388, 1416, 1426 can communicate. The electrical contacts 56, 1334 can communicate through direct physical interaction, infrared, and optical techniques. More specifically, any of the following components can be used as electrical contacts 56, 1334, 1352, 1362, 1388, 1416, 1426: metallic contacts; conductive elastic contacts; capacitive coupling; inductive coupling; optical coupling; combination of metallic contacts and either optical, inductive, or capacitive coupling; combination of conductive elastic contacts and either optical, inductive, or capacitive coupling.

Another embodiment of a token is a rechargeable token. To save space in the token and lock core, the power source could be a rechargeable battery positioned to lie in the token. The rechargeable token could be recharged by placing the token in a charger when the token is not needed (i.e., when the user is sleeping at night). The token could also be recharged by being carried in a token holder that continuously charges the token. The token could fold out, slide out, snap out, etc. of the token holder.

The tokens and electrical contacts shown in FIGS. 71-76 are only exemplary of the types of tokens and electrical contacts that can be used. In general, the token includes a blade member having a cross-sectional shape that is accepted in an opening formed in a lock core. The token also includes electrical contacts that engage contacts included in the lock core. In addition, the cross-sectional shape of the blade member permits the member to rotate a portion of the lock core. In alternative embodiments, other types of tokens and electrical contacts may be used.

Figure 77:
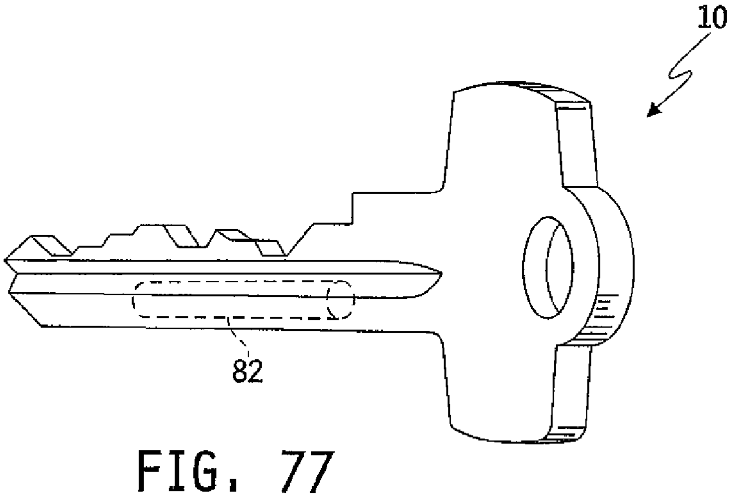
FIG. 77 is a perspective view of a token according to the present invention showing the token including a power source (phantom lines) positioned to lie in the blade of the token.
Figure 78:
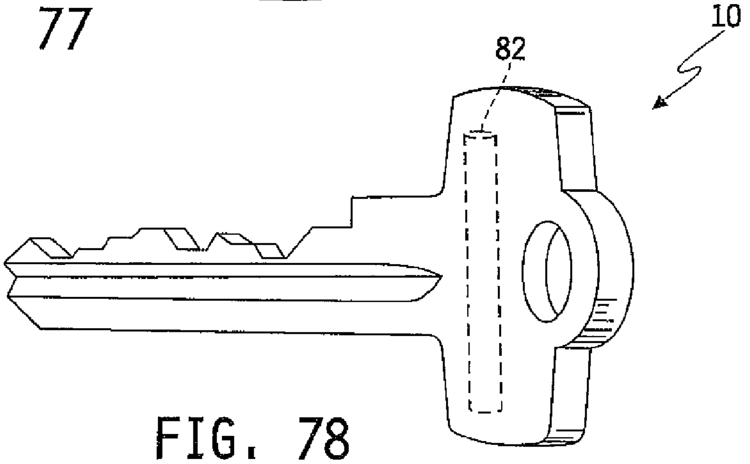
FIG. 78 is a perspective view of another token according to the present invention showing the token including a power source (phantom lines) positioned to lie in the bow of the token.
Figure 79:
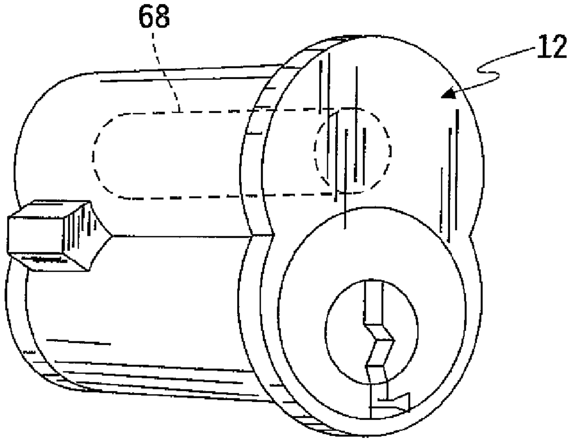
FIG. 79 is a perspective view of a lock core according to the present invention showing the lock core including a power source (phantom lines)

As discussed above, one or both of the token and lock core must include a power source 68, 82. FIGS. 77, 78, and 79 shown possible locations of a power source 68, 82 (in phantom) including the blade or bow of token 10 and lock core 12, respectively.

The present invention also includes locking systems having tokens that are empowered to perform selected functions. A conventional locking system typically includes a lock core mounted to a door, wall, box, cabinet, etc. and a token that cooperates with the lock core to permit a user access through the door or into the box, cabinet, etc. Conventional tokens include bitted keys that are “cut” to fit into selected lock cores. Once a bitted key is made, it may not readily or easily be reconfigured to fit into a different lock core.

A token 1450 is provided that can be programmed or charged to perform selected functions. Before being charged, the token 1450 is not able to perform any functions. The token 1450 may be programmed, for example, to be inserted into only selected lock cores and/or inserted into selected lock cores in a certain order. These programmable tokens 1450 may also be “read” after use to determine the lock cores in which the token 1450 was inserted and the time when the token 1450 was inserted in the lock core.

Figure 80:
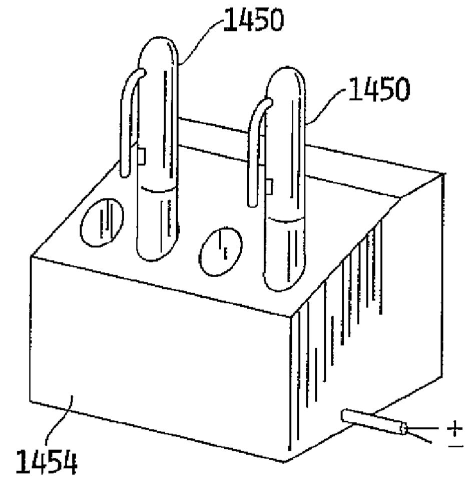
FIG. 80 is a perspective view of a power charger used to recharge power to tokens.
Figure 81:
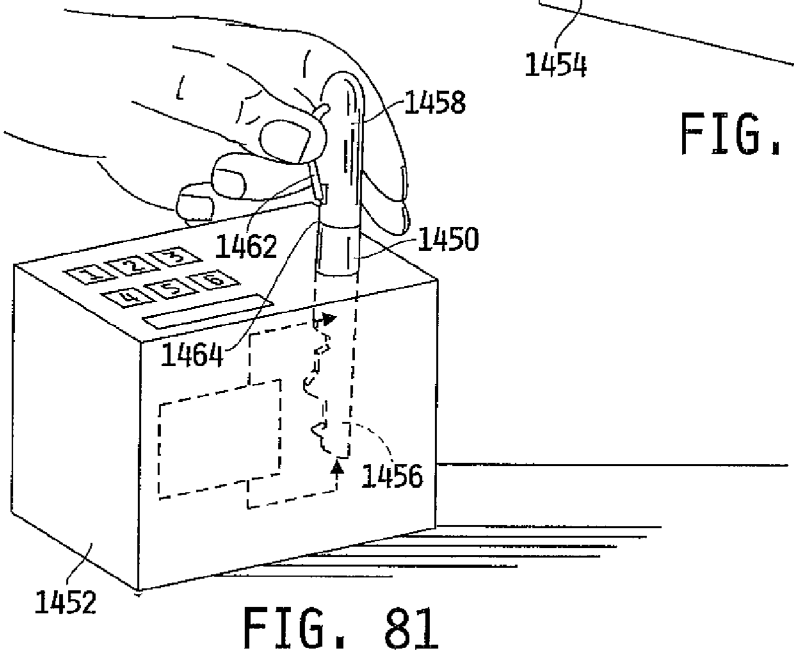
FIG. 81 is a perspective view of an information programmer used to program tokens charged by the power charger shown in FIG. 59.
Figure 82:
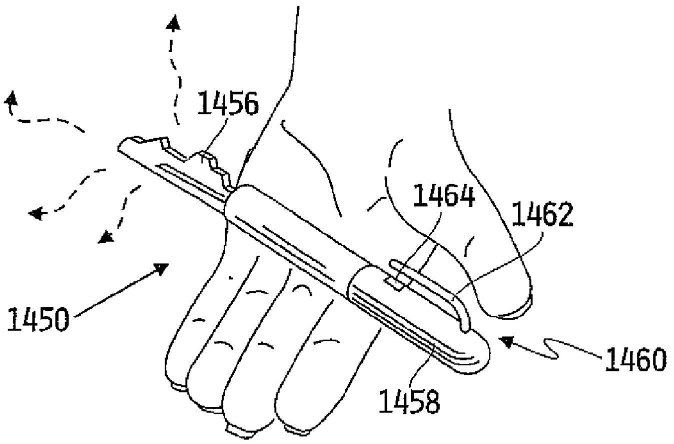
FIG. 82 is a perspective view of a user holding the token, the token including a handle having killswitch and a blade having a mechanical bitted portion and electrical contacts.

A programmable token 1450, token information programmer 1452, and token power charger 1454 are shown in FIGS. 80, 81, and 82. The programmable token 1450 is stored in token power charger 1454 until the token 1450 is needed as shown in FIG. 80. When the token 1450 is needed to perform a particular function, the token 1450 is placed in token information programmer 1452 to receive information about the functions it is to perform.

The token 1450 includes a bitted blade 1456, a handle 1458, and an electrical portion (not shown) that receives and stores the information received from token information charger 1452 and later uses that information to communicate with lock cores. The electrical portion may be any of the token electrical portions discussed above. In alternative embodiments, a bitted blade is not required and the token may operate a lock core or other locking mechanism through electrical communication alone.

The token 1450 also includes a killswitch 1460 having a lever 1462 coupled to handle 1458 and an electrical contact 1464 coupled to handle 1458 that lever 1462 can engage and disengage as shown in FIGS. 81 and 82. The token 1450 can be programmed so that a user must depress lever 1462 to engage contact 1464 once token 1450 is charged for token 1450 to be able to perform its selected functions. If the user releases lever 1462 so that lever 1462 disengages contact 1464, then token 1450 is not able to operate to perform any additional functions. This is useful in a prison or other high security application where the user of the charged token 1450 can release lever 1462 and deactivate token 1450 if the user is overcome by anyone seeking access to token 1450. In alternative embodiments, the killswitch may include different components. In alternative embodiments, a killswitch is not required.

Although the invention has been described in detail with reference to certain preferred embodiments, variations and modifications exist within the scope and spirit of the invention as described and defined in the following claims.

The invention claimed is:

1. An access control system for a facility including a plurality of access points, the system including at least one central database including recombination data;

at least one hard-wired lockset positioned to control access through at least one of the plurality of access points of the facility and hard-wired to the central database to receive the recombination data from the at least one central database;

at least one token having memory that stores the recombination data including which tokens should be granted access from the at least one hard-wired lockset; and at least one stand-alone lockset positioned to control access through at least one of the plurality of access points of the facility, the stand-alone lockset including memory that stores the recombination data received from the at least one token;

wherein the at least one hard-wired lockset includes a plurality of hard-wired locksets defining an outer perimeter and the at least one stand-alone lockset includes a plurality of stand-alone locksets positioned within the outer perimeter defined by the plurality of hard-wired locksets.

2. The access system of claim 1, wherein the at least one hard-wired lockset and the at least one stand-alone lockset include readers that receive token identification information.

3. The access system of claim 2, wherein the reader of the at least one stand-alone lockset communicates token access history information to the at least one token and the reader of the hard-wired lockset communicates token receives token access history information from the token.

4. The access system of claim 1, wherein the at least one hard-wired lockset and the at least one stand-alone lockset include a lock core with a plurality of tumbler pins and the at least one token includes a key shank having bitting that corresponds to the tumbler pins of the lock cores.

5. The access system of claim 4, wherein the at least one hard-wired lockset and the at least one stand-alone lockset include readers that receive token identification information and are positioned within the lock cores.

6. The access system of claim 1, wherein communication between the at least one hard-wired lockset and the at least one stand-alone lockset and at least one token occurs through a conductive path.

7. An access control system for a facility including a plurality of access points, the system including at least one token having memory;

at least one stand-alone lockset positioned to control access through at least one of the plurality of access points of the facility, the stand-alone lockset determining if the at least one token has access rights to the access point, the at least one stand-alone lockset including memory that records access history information, the at least one stand-alone lockset and token having communicators through which the access history information is downloaded from the memory of the at least one stand-alone lockset to the memory of the at least one token;

at least one hard-wired lockset positioned to control access through at least one of the plurality of access points of the facility, the at least one hard-wired lockset having a communicator through which the access history information is downloaded from the memory of the token; and at least one central database receiving the access history information from the at least one hard-wired lockset;

wherein the at least one hard-wired lockset includes a plurality of hard-wired locksets defining an outer perimeter and the at least one stand-alone lockset includes a plurality of stand-alone locksets positioned within the outer perimeter defined by the plurality of hard-wired locksets.

8. The access system of claim 7, wherein the at least one hard-wired lockset and the at least one stand-alone lockset include readers that receive token identification information.

9. The access system of claim 8, wherein the reader of the at least one stand-alone lockset communicates token access history information to the at least one token and the reader of the hard-wired lockset communicates token receives token access history information from the token.

10. The access system of claim 7, wherein the at least one hard-wired lockset and the at least one stand-alone lockset include a lock core with a plurality of tumbler pins and the at least one token includes a key shank having bitting that corresponds to the tumbler pins of the lock cores.

11. The access system of claim 10, wherein the at least one hard-wired lockset and the at least one stand-alone lockset include readers that receive token identification information and are positioned within the lock cores.

12. The access system of claim 7, wherein communication between the at least one hard-wired lockset and the at least one stand-alone lockset and at least one token occurs through a conductive path.

13. The access system of claim 7, wherein the at least one hard-wired lockset includes a plurality of hard-wired locksets defining an outer perimeter and the at least one stand-alone lockset includes a plurality of stand-alone locksets positioned within the outer perimeter defined by the plurality of hard-wired locksets.

14. The access system of claim 1, wherein the at least one hard-wired lockset includes a plurality of hard-wired locksets in communication with the central database.

15. The access system of claim 7, wherein the at least one hard-wired lockset includes a plurality of hard-wired locksets in communication with the central database.

* * * * *